(12) United States Patent
Takasaka et al.

(10) Patent No.: US 9,270,076 B2
(45) Date of Patent: Feb. 23, 2016

(54) OPTICAL AMPLIFIER, OPTICAL AMPLIFYING SYSTEM, WAVELENGTH CONVERTER, OPTICAL AMPLIFICATION METHOD, AND OPTICAL COMMUNICATION SYSTEM

(71) Applicant: Furukawa Electric Co., Ltd., Tokyo (JP)

(72) Inventors: Shigehiro Takasaka, Tokyo (JP); Yu Mimura, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/018,225

(22) Filed: Sep. 4, 2013

(65) Prior Publication Data
US 2014/0043674 A1 Feb. 13, 2014

Related U.S. Application Data

(63) Continuation-in-part of application No. PCT/JP2012/055596, filed on Mar. 5, 2012.

(60) Provisional application No. 61/449,304, filed on Mar. 4, 2011, provisional application No. 61/529,659, filed on Aug. 31, 2011.

(51) Int. Cl.
*H01S 3/10* (2006.01)
*G02F 1/39* (2006.01)
(Continued)

(52) U.S. Cl.
CPC .......... *H01S 3/10023* (2013.01); *H04B 10/294* (2013.01); *G02F 1/395* (2013.01);
(Continued)

(58) Field of Classification Search
CPC G02F 1/395; G02F 2001/392; H01S 3/10023
See application file for complete search history.

(56) References Cited

U.S. PATENT DOCUMENTS 6,427,040 B1 * 7/2002 Ahuja et al. .................... 385/37
6,587,260 B2 7/2003 Kikuchi et al.
(Continued)

FOREIGN PATENT DOCUMENTS

CN 1365456 A 8/2002
CN 1711500 A 12/2005
(Continued)

OTHER PUBLICATIONS

International Search Report mailed Apr. 10, 2012 for PCT/JP2012/055596 filed on Mar. 5, 2012 with English Translation.
(Continued)

*Primary Examiner* — Eric Bolda
(74) *Attorney, Agent, or Firm* — Oblon, McClelland, Maier & Neustadt, L.L.P.

(57) ABSTRACT

An optical amplifier includes an optical gain fiber into which signal light and pump light are input and at least one relative phase shifter is inserted. Preferably, the relative phase shifter is inserted so that the relative phase in the lengthwise direction of the optical gain fiber falls within a predetermined range containing $0.5\pi$. Preferably, the optical gain fiber is a highly non-linear optical fiber having a non-linearity constant of at least 10/W/km. Preferably, the dispersion of the optical gain fiber is within the range from −1 ps/nm/km to 1 ps/nm/km in an amplification band. Preferably, the absolute value of the dispersion slope of the optical gain fiber at a zero dispersion wavelength is no greater than $0.05$ ps/nm$^2$/km.

48 Claims, 67 Drawing Sheets

(51) Int. Cl.
*H01S 3/067* (2006.01)
*H04B 10/294* (2013.01)
*H01S 3/30* (2006.01)

(52) U.S. Cl.
CPC ....... *G02F2201/04* (2013.01); *G02F 2201/307* (2013.01); *G02F 2203/50* (2013.01); *G02F 2203/585* (2013.01); *H01S 3/06725* (2013.01); *H01S 3/06754* (2013.01); *H01S 3/302* (2013.01); *H01S 2301/04* (2013.01)

(56) References Cited

U.S. PATENT DOCUMENTS

| | | | |
|---|---|---|---|
| 7,321,461 | B2 | 1/2008 | Kakui |
| 7,483,203 | B2* | 1/2009 | McKinstrie ......... H01S 3/06758 359/333 |
| 7,940,454 | B2 | 5/2011 | Watanabe |
| 8,041,169 | B2 | 10/2011 | Watanabe |
| 8,243,363 | B2* | 8/2012 | Watanabe .................. 359/337.5 |
| 2002/0057880 | A1* | 5/2002 | Hirano et al. ................. 385/127 |
| 2002/0145796 | A1 | 10/2002 | Kikuchi et al. |
| 2004/0196533 | A1 | 10/2004 | Bayart et al. |
| 2005/0100267 | A1* | 5/2005 | Yoo et al. .......................... 385/16 |
| 2005/0213907 | A1* | 9/2005 | Hiroishi et al. ............... 385/123 |
| 2008/0130101 | A1* | 6/2008 | Kakui ......................... 359/341.3 |
| 2009/0190207 | A1* | 7/2009 | Watanabe .................. 359/341.3 |

FOREIGN PATENT DOCUMENTS

| | | |
|---|---|---|
| EP | 1 249 901 A2 | 10/2002 |
| EP | 2 083 320 A1 | 7/2009 |
| EP | 2 148 242 A1 | 1/2010 |
| JP | 2002-303896 A | 10/2002 |
| JP | 2004-163831 A | 6/2004 |
| JP | 2008-089781 A | 4/2008 |
| JP | 2009-177641 A | 8/2009 |
| JP | 2010-026308 A | 2/2010 |

OTHER PUBLICATIONS

International Written Opinion mailed Apr. 10, 2012 for PCT/JP2012/055596 filed on Mar. 5, 2012.

Zhi Tong et al., "Phase-Sensitive Amplified DWDM DQPSK Signals Using Free-Running Lasers with 6-dB Link SNR Improvement over EDFA-based Systems", Photonics Laboratory, Department of Microtechnology and Nanoscience, Chalmers University of Technology, Gothenburg, Sweden, 2010.

Peter A. Andrekson et al., "Phase-Sensitive Fiber-Optic Parametric Amplifiers and Their Applications", Department of Microtechnology and Nanoscience, Chalmers University of Technology, Gothenburg, Sweden, 2010, ECOC 2010, Sep. 19-23, 2010, Torino, Italy.

Extended European Search Report issued on Nov. 27, 2014 in Application No. 12754607.5.

Carl Lundstrom, et al., "Experimental Comparison of Gain and Saturation Characteristics of a Parametric Amplifier in Phase-sensitive and Phase-insensitive Mode", $35^{th}$ European conference on optical communication, 2009, ECOC 2009, XP031546551, Sep. 20, 2009, pp. 1-2.

Michel E. Marhic, et al. "High-Nonlinearity Fiber Optical Parametric Amplifier with Periodic Dispersion Compensation", Journal of lightwave technology, vol. 17, No. 2, XP011029346, Feb. 1, 1999, pp. 210-215.

Shigehiro Takasaka, et al., "Flat and Broad Amplification by Quasi-Phase-Matched Fiber Optical Parametric Amplifier", Optical Fiber Communication conference and exposition (OFC/NFOEC Technical Digest, 2012 and the national fiber optic engineers conference, IEEE, XP032340556, Mar. 4, 2012, pp. 1-3.

Office Action issued Aug. 5, 2015 in Chinese Patent Application No. 201280011798.9 (with English translation).

* cited by examiner

FIG.14

|  | untis | value |
|---|---|---|
| Pump wavelength | nm | 1565 |
| Pump power | mW | 1500 |
| Signal power | mW | 0.01 |
| Zero dispersion wavelength | nm | 1565 |
| Dispersion slope | ps/nm$^2$/km | 0.02 |
| Nonlinear coefficient | 1/W/km | 12 |
| Fiber Length | m | 200 |
| Fiber loss | dB | 0.8 |
| Phase shifter point | m | 100 |
| Relative phase shift value | Radian | 0.66π |

FIG.19

|  | untis | value |
|---|---|---|
| Pump wavelength | nm | 1565 |
| Pump power | mW | 1500 |
| Signal power | mW | 0.01 |
| Zero dispersion wavelength | nm | 1565 |
| Dispersion slope | ps/nm$^2$/km | 0.02 |
| Nonlinear coefficient | 1/W/km | 12 |
| Fiber Length | m | 200 |
| Fiber loss | dB | 0.8 |
| Phase shifter set up period | m | 50 |
| Relative phase shift value | Radian | 0.58π |

FIG.28

|  | untis | value |
|---|---|---|
| Pump wavelength | nm | 1565 |
| Pump power | mW | 1500 |
| Signal power | mW | 0.01 |
| Zero dispersion wavelength | nm | 1565 |
| Dispersion slope | ps/nm$^2$/km | 0.05 |
| Nonlinear coefficient | 1/W/km | 12 |
| Fiber Length | m | 200 |
| Fiber loss | dB | 0.8 |
| Phase shifter set up period | m | 50 |
| Relative phase shift value | Radian | 0.58π |

FIG.35

|  | untis | value |
|---|---|---|
| Pump wavelength | nm | 1565 |
| Pump power | mW | 1500 |
| Signal power | mW | 0.01 |
| Dispersion @1550nm | ps/nm/km | 0.04 |
| Dispersion slope @1550nm | ps/nm$^2$/km | 0.0008 |
| Differential of dispersion slope @1550nm | ps/nm$^3$/km | -0.0002 |
| Nonlinear coefficient | 1/W/km | 12 |
| Fiber Length | m | 300 |
| Fiber loss | dB | 0.8 |
| Phase shifter period | m | 50 |
| Phase shift value | Radian | 0.52π |

WITHOUT FBG

WITH FBG

OPTICAL AMPLIFIER, OPTICAL AMPLIFYING SYSTEM, WAVELENGTH CONVERTER, OPTICAL AMPLIFICATION METHOD, AND OPTICAL COMMUNICATION SYSTEM

CROSS-REFERENCE TO RELATED APPLICATION

This application is a continuation-in-part of PCT International Application No. PCT/JP2012/055596 filed on Mar. 5, 2012 which claims the benefit of priority from U.S. Provisional Patent Application No. 61/449,304 filed on Mar. 4, 2011 and No. 61/529,659 filed on Aug. 31, 2011, the entire contents of which are incorporated herein by reference.

BACKGROUND OF THE INVENTION

1. Field of the Invention

The present invention relates to an optical amplifier, an optical amplifying system, a wavelength converter, an optical amplification method, and an optical communication system using the same.

2. Description of the Related Art

In optical communication, optical amplifiers have become indispensable. In current optical communication systems, as optical amplifiers or optical amplifying systems for optical communication band, erbium-doped fiber amplifiers (EDFA), Raman amplifiers, or Raman amplifying systems have been put into practice.

On the other hand, an optical parametric amplifier (OPA), as disclosed in Japanese Patent Application Laid-open No. 2008-89781, which makes use of nonlinear effect in an optical fiber for optical amplification, has not been put into practice. One major reason for not having been made into practice is considered because amplification band is narrow or a gain spectrum is not flat. It should be noted that an OPA is used also as a wavelength converter. In addition, as an optical amplifier making use of nonlinear effect in an optical fiber, there is a phase-sensitive optical amplifier (PSA).

SUMMARY OF THE INVENTION

It is an object of the present invention to at least partially solve the problems in the conventional technology.

In accordance with one aspect of the present invention, an optical amplifier includes an optical gain fiber into which signal light and pump light are inputted and at least one relative phase shifter is inserted.

In accordance with another aspect of the present invention, an optical amplifying system includes an optical amplifier according to the present invention.

In accordance with still another aspect of the present invention, an optical communication system includes an optical amplifier according to the present invention.

In accordance with still another aspect of the present invention, a wavelength converter includes an optical amplifier according to the present invention.

In accordance with still another aspect of the present invention, an optical amplification method includes performing optical amplification by using an optical gain fiber into which signal light and pumping light are inputted and at least one relative phase shifter is inserted.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 14 is a view showing conditions of simulation;

FIG. 19 is a view showing conditions of simulation;

FIG. 28 is a view showing conditions of simulation;

FIG. 35 is a view showing conditions of simulation;

FIG. 69B is a view showing a 0.3 dB band of gain spectrum corresponding to length of a fiber that is, the number of stages of pairs of a optical gain fiber and a relative phase shifter, when the number of stages of pairs of the optical gain fiber and the relative phase shifter increases;

FIG. 70 is a view showing an example of phase and reflection characteristics of a reflection type all-pass filter using a dielectric multilayer film filter; and FIG. 71 is a view showing an example of a configuration of an all-pass filter.

DETAILED DESCRIPTION OF THE PREFERRED EMBODIMENT

Figure 1:
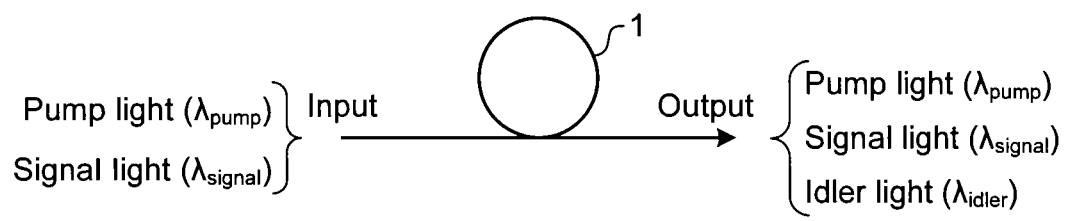
FIG. 1 is a view showing light inputted into an optical fiber and lights outputted.

Embodiments of an optical amplifier, an optical amplifying system, a wavelength converter, an optical amplification method, and an optical communication system according to the invention will be explained below in detail referring to the drawings. The embodiments do not limit the present invention. In each drawing, if deemed appropriate, identical or equivalent elements are given same reference numerals.

For a method of flattening a gain spectrum of an OPA, there is a method of using two pump lights. Herein, wavelengths of two pump lights are set at two wavelengths at a shorter wavelength side and a longer wavelength side respectively both of which are almost symmetrical with respect to zero-dispersion wavelength of an optical fiber which conducts amplification. However, in some cases, a configuration using two pump lights is not a practically useful configuration because cost increases. Therefore, although the present description mainly argues about an OPA using only one pump light, the present invention is not limited to this.

A typical gain spectrum of an OPA using only one pump light has a shape in which gain is the minimum at a pump light wavelength and has the maximum value at both wavelengths at a longer wavelength side and a shorter wavelength side each of which is distant from the pump light wavelength by several nanometers to several tens of nanometers. As is different from a gain spectrum of an EDFA or a Raman amplifier, flatness of the gain spectrum of the above described OPA is low and of no practical use.

In order to render an OPA or a PSA a practically useful optical amplifier, it is preferable that at least a gain spectrum has flatness so that difference between the maximum gain and the minimum gain in a wavelength band which is to be amplified is within 1 dB.

According to the embodiments described below, there is an effect of increasing flatness of gain spectrum.

Hereinafter, an OPA refers to next condition. FIG. 1 is a view showing, in an OPA, light inputted into an optical fiber and light outputted. Pump light and signal light which is light to be amplified are inputted into an optical fiber 1 which is a gain medium. In the optical fiber 1, idler light is generated by nonlinear effect of the pump light and the signal light. Wavelength $\lambda$idler [nm] of this idler light has the following relation with wavelength $\lambda$pump [nm] of the pump light and $\lambda$signal [nm] of the signal light.

$$1/\lambda\text{idler}=2/\lambda\text{pump}-1/\lambda\text{signal}$$

Figure 2:
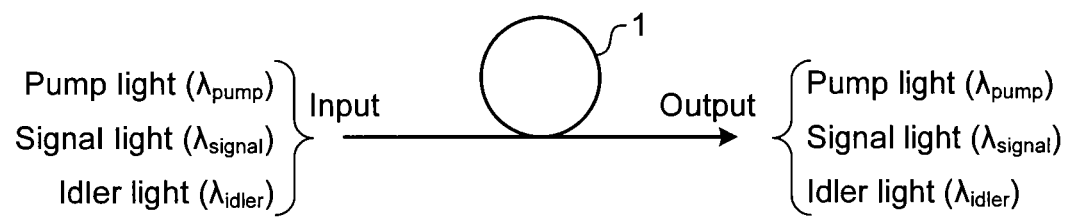
FIG. 2 is a view showing light inputted into an optical fiber and light outputted.

Also, a PSA in the present description refers to next conditions. FIG. 2 is a view showing, in a PSA, light inputted into an optical fiber and light outputted. In addition to the pump light and the signal light, idler light having 1/10 to 10 times of power relative to the signal light is inputted into the optical fiber 1. At an output of the optical fiber 1, the pump light, amplified signal light, and amplified idler light are outputted. Similarly to the idler light of the above described OPA, wavelength of this idler light is determined by a following relation.

$$1/\lambda\text{idler}=2/\lambda\text{pump}-1/\lambda\text{signal}$$

Figure 3:
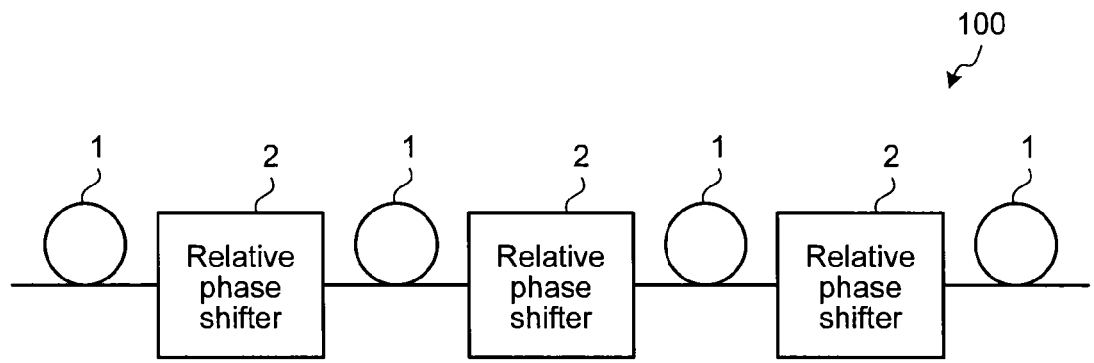
FIG. 3 is a view of a configuration of inserting relative phase shifters into an optical fiber which is a gain medium.

In order to flatten and broaden a gain spectrum waveform of the OPA and the PSA in a wavelength region, relative phase shifters shifting relative phase are inserted into the optical fiber which is a gain medium at one or greater numbers of locations. FIG. 3 is a view of a configuration of inserting relative phase shifters 2 into the optical fiber 1, for amplification use, which is a gain medium. Herein relative phase $\phi$ rel is a quantity described by the following equation by using phase $\phi$ signal [radian] of the signal light, phase $\phi$ idler [radian] of the idler light, and phase $\phi$ pump [radian] of the pump light.

$$\phi\text{rel}=\Delta k+\phi\text{signal}+\phi\text{idler}-2\phi\text{pump[radian]}$$

The relative phase shifter 2 shifts the relative phase $\phi$ rel by an adequate value in accordance with power of inputted pump light or dispersion characteristics etc. of the optical fiber. The length or the dispersion of the optical fiber 1 is set appropriately in accordance with necessary gain spectrum waveform. Herein it is defined as $\Delta k=k$ signal$+k$ idler$-2$ kpump. ksignal, kidler, and kpump are wave number of each light.

By disposing the relative phase shifter 2, flatness of gain spectrum, which may not be obtainable in case of not inserting the relative phase shifter into the optical fiber 1, is realized. Also, simultaneously, lower noise figure (NF) can be obtained than in a case where there is not a relative phase shifter.

In the following, an example of a configuration of an optical fiber amplifier is shown at first, and then, an effect of having inserted the relative phase shifter is described.

Figure 4:
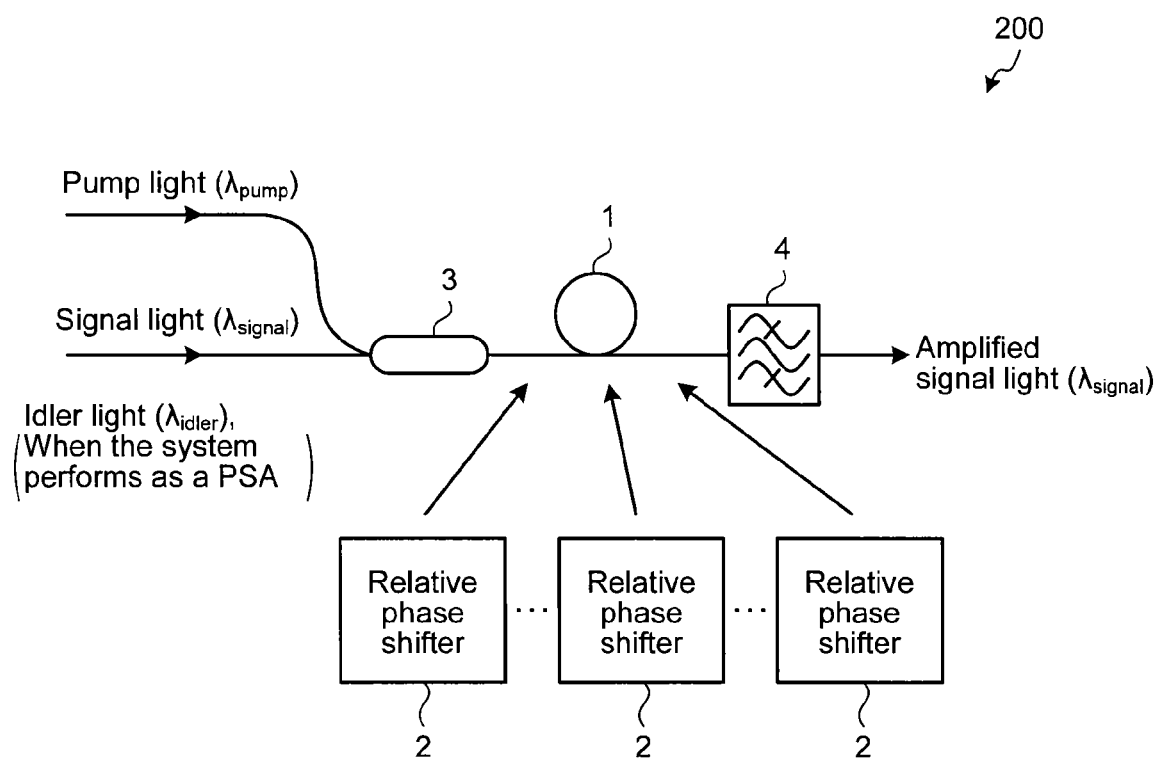
FIG. 4 is a view showing a configuration of an optical amplifier.

A configuration of an optical fiber amplifier, which operates as an OPA or a PSA, is shown in FIG. 4. For example, as shown in FIG. 3, the relative phase shifters 2 can be inserted into the optical fiber 1 of this optical fiber amplifier 200. When operating as an OPA, the pump light and the signal light are coupled by an optical coupler 3. When operating as a PSA, the pump light, the signal light, and the idler light are coupled by the optical coupler 3. Each coupled light is inputted into the optical fiber 1. The signal light is amplified by the nonlinear effect in the optical fiber 1. Amplified signal light is extracted from light outputted from the optical fiber 1 by an optical bandpass filter 4 transmitting the signal light therethrough selectively, a function as an optical amplifier is realized.

Herein the optical coupler 3 may be a WDM coupler or a C/L coupler. Also, the optical bandpass filter 4 can be replaced with a WDM coupler or a C/L coupler.

Furthermore, if nonlinear constant of the optical fiber 1 is equal to or greater than 10 [1/W/km] which is a value measured by Cross Phase Modulation (XPM) method, fiber length necessary for OPA or PSA operation becomes shorter than 1 km, and packaging becomes easy. With regard to the wavelength dispersion characteristics of the optical fiber 1, if zero dispersion is within the range of ±10 nm of the pump light wavelength $\lambda$pump [nm] and if an absolute value of the dispersion slope is equal to or smaller than 0.05 [ps/nm$^2$/km], amplification band is broadened, and a function as an amplifier is enhanced. Alternatively, if wavelength dispersion of the optical fiber 1 is within the range of 0.0 [ps/nm/km]±1.0 [ps/nm/km] in a wavelength band to be amplified, amplification band is broadened, and a function as an optical amplifier is enhanced similarly to the case where the optical fiber 1 has the above described wavelength dispersion characteristics.

In case that the optical fiber is a non-polarization maintaining optical fiber, it is preferable to adjust, before inputting the pumping light and the signal light into the present optical fiber amplifier, these light by using a polarization control device so that a polarization of the pump light coincide with a polarization of the signal light.

Figure 5:
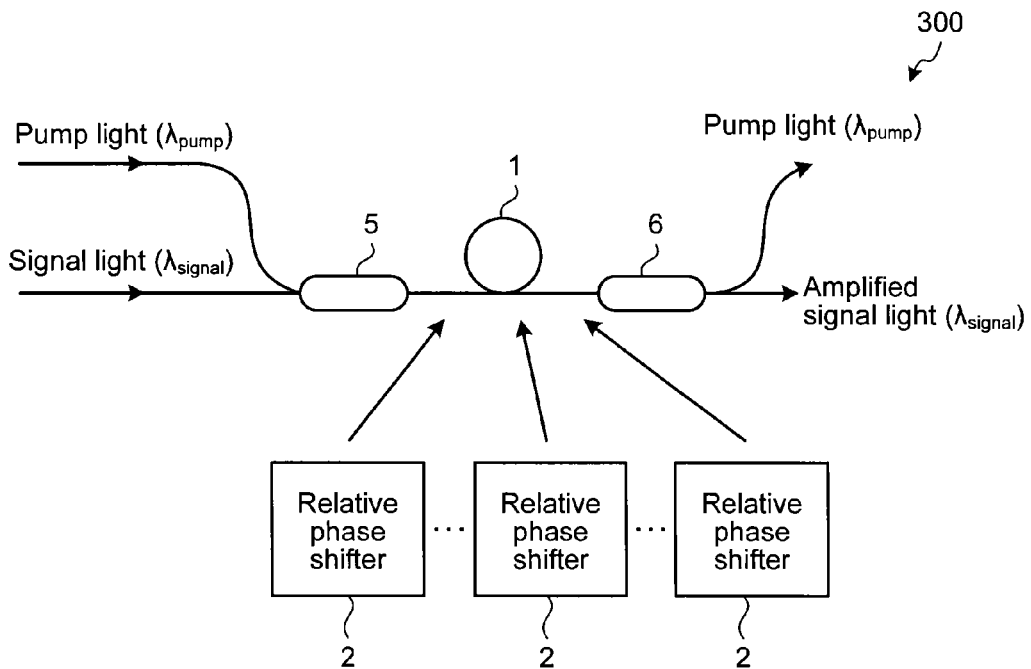
FIG. 5 is a view showing another configuration of an optical amplifier.

FIG. 5 shows an example of configuration of an optical fiber amplifier as another configuration of an optical amplifier which is an OPA amplifying the entire C-band in optical communication. For example, as shown in FIG. 3, the relative phase shifters 2 can be inserted into the optical fiber 1 of this optical fiber amplifier 300. C-band has a wavelength region of 1530 nm to 1565 nm. By setting the wavelength of the pump light at a wavelength longer than 1565 nm, the signal light of C-band and the pump light not within C-band can be coupled, with lowered loss, by using an optical coupler 5, which is a C/L coupler. Herein L-band refers to a region of wavelength range of 1565 nm to 1620 nm, and the C/L coupler has a function of coupling both of bands by making use of a lowpass filter or a high-pass filter. The signal light is amplified by nonlinear effect in the optical fiber 1. Light outputted from the optical fiber 1 is separated to the pump light and the signal light by an optical coupler 6 which is a C/L coupler. The separated signal light is outputted as amplified signal light. When operating an OPA, the pump light power is set at equal to or greater than 10 times the signal light power in many cases. Therefore, in some cases, the pump light leaking from a C-band port due to cross talk of the C/L coupler is not ignorable. In this case, the power of pump light transmitting from a C-band transmission port can be reduced to a significant degree by coupling a plurality of C/L couplers or bandpass filters for C-band use in series at an output side.

Figure 6:
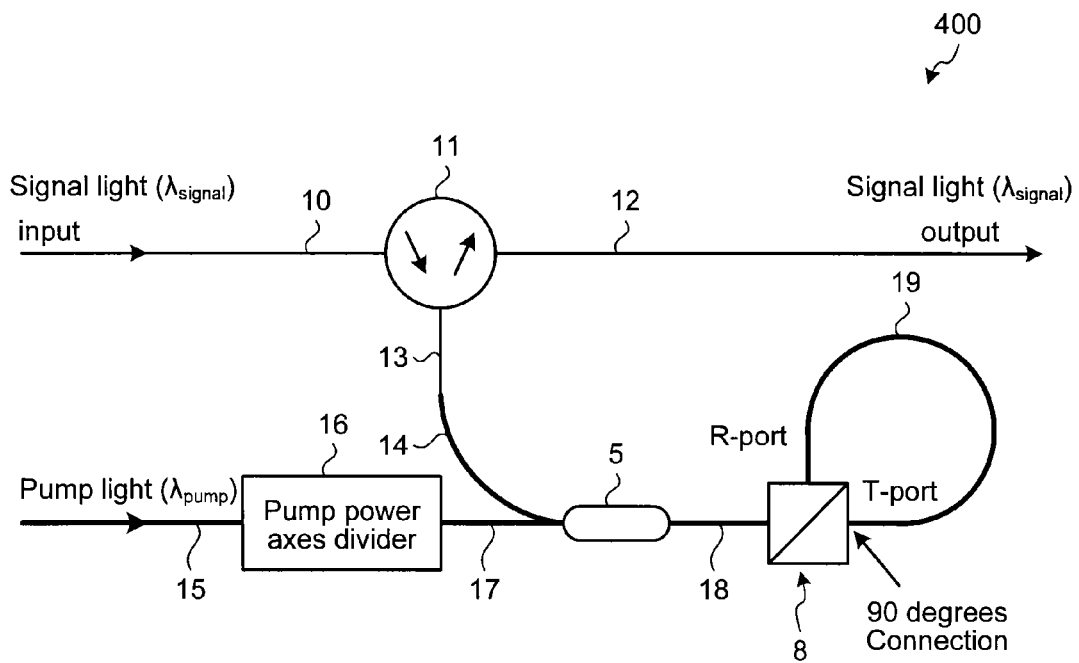
FIG. 6 is a view of a configuration of an optical amplifier realizing polarization independent optical amplification.

FIG. 6 is a view of a configuration of an optical amplifier realizing polarization independent optical amplification. According to an optical fiber amplifier 400 in the configuration of FIG. 6, optical amplification not depending on polarization of signal light can be realized. Optical fibers described by thick line in FIG. 6 indicate that they are polarization-maintaining fibers. As explained later, in an optical fiber gain portion 19, a relative phase shifter is inserted into an optical fiber which is a gain medium. Signal light having arbitrary polarization passes via an optical fiber 10, from an optical circulator 11, through optical fibers 13 and 14, and is inputted into a C-band port of the optical coupler 5 which is a C/L coupler. On the other hand, the pump light is inputted from an optical fiber 15, passes through a pump power axes divider 16 which divides the power of the pump light to two polarization axes of an optical fiber 17, and after that, inputted into an L-band port of the optical coupler 5 which is a C/L coupler. The pump power axes divider 16 can be realized by using a polarization beam splitter (PBS). Herein separation ratio for dividing pump power to two axes by the pump power axes divider 16 is set so that dependence, on polarization, of amplification characteristics of outputted signal light becomes the minimum. When polarization-division ratio of the PBS is 1:1 and the optical fiber gain portion 19 has centrosymmetry, this rate is 1:1.

After being coupled, the pump light and the signal light propagate in the optical fiber 18, and undergoes polarization separation in a polarization beam coupler (PBC) 8. One polarization of the coupled lights transmits therethrough and is input from a T-port, the other one polarization of the coupled lights is reflected and is input from an R-port, into one of polarization axes of the optical fiber gain portion 19. Herein, one of the T-port and the R-port is coupled with the optical fiber gain portion 19 so that its polarization axis is offset by 90 degrees. According to this, each polarization component of the coupled light propagates in one of the two polarization axes of the optical fiber gain portion 19 so that propagation directions are opposite to each other. After that, in the optical fiber gain portion 19, the signal light undergoes optical parametric amplification. The lights having propagated in the optical fiber gain portion 19 is inputted into the PBC 8 again, propagates in the optical fiber 18, and is inputted into the optical coupler 5 again. Herein, the pump light and the idler light generated in the optical fiber 19 are outputted to the L-band port, and the signal light is outputted from the C-band port. The signal light propagates in the optical fibers 14 and 13 in this order, and after that, passes through the optical circulator 11, and then, is outputted from the optical fiber 12.

Herein, although the optical fiber 14 is of polarization-maintaining type, the optical fiber 14 may be of non-polarization maintaining type. Also, as the optical coupler 5, even if a polarization-maintaining coupler, a WDM coupler, or an arrayed waveguide grating (AWG) is used in place of the C/L coupler, similar effect can be obtained. In this case, an optical filter which is transmissive for only amplified light must be inserted into an output port of the optical circulator 11. In this optical fiber amplifier 400, the PBC 8 operates also as a polarization beam splitter (PBS).

Figure 7:
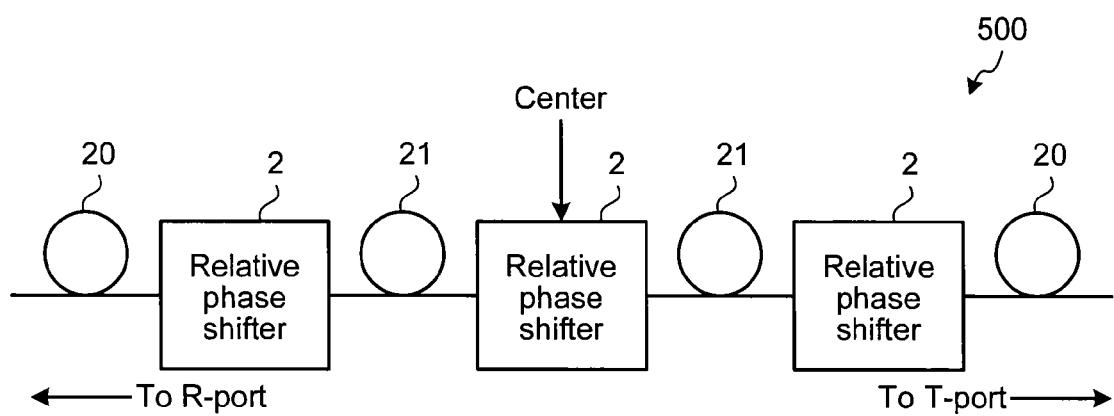
FIG. 7 is a view of a configuration in which relative phase shifters are inserted into an optical gain fiber in which there is a relative phase shifter in the center of the fiber.

With regard to insertion position and phase-shift value of the relative phase shifter in the optical fiber gain portion 19, a preferable form is as follows. In FIG. 7, in an optical fiber gain portion 500 (which is equivalent to the optical fiber gain portion 19), the optical fiber is divided into optical fibers 20, 20, 21, 21, among which intervals relative phase shifters 2 are disposed. In addition, the optical fiber gain portion 500 is symmetric with respect to the center of the optical fiber gain portion 500 so that both signal light propagating from an In-side (for example, R-port side) and signal light propagating from an Out-side (for example, T-Port side) will receive a same effect. FIG. 7 shows a case where the relative phase shifters 2 are disposed symmetrically with respect to the center in the lengthwise direction of the optical fiber gain portion 500. Although an example of inserting the relative phase shifters in three pieces is shown, one or a plurality of pieces in odd number may be inserted. Optical fibers disposed symmetrically with respect to the center (a pair of optical fibers 20 and a pair of optical fibers 21) have a same wavelength dispersion and a same nonlinear constant, and each relative phase shifter 2 gives a same phase-shift value. Also, the optical fibers 20 or the optical fibers 21 may be in a same length.

Figure 8:
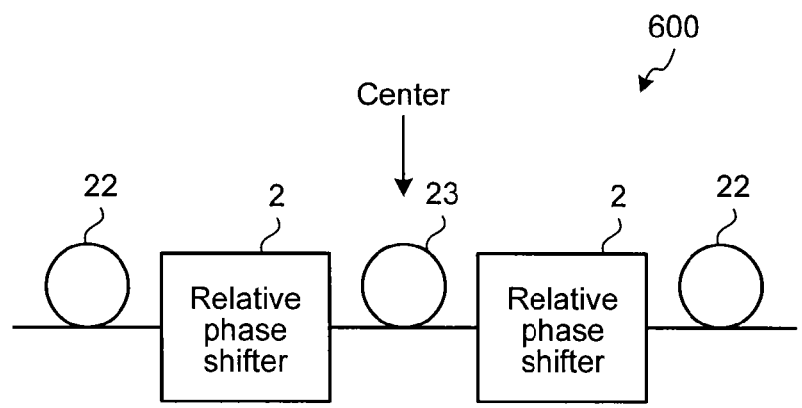
FIG. 8 is a view of a configuration in which relative phase shifters are inserted into an optical gain fiber to satisfy centrosymmetry in case of inserting an even number of relative phase shifters.

Although, in FIG. 7, the center of the configuration is the relative phase shifter, the optical fiber may be at the center. In that case, the number of the relative phase shifters to be inserted is in an even number. Characteristics of the optical fibers or the relative phase shifters disposed symmetrically with respect to the center are the same. In FIG. 8, in an optical fiber gain portion 600, an optical fiber is divided into optical fibers 22 and 23, among which intervals the relative phase shifters 2 are disposed. As shown in FIG. 8, when the relative phase shifters 2 to be inserted are in an even number, the center of components is the optical fiber (in FIG. 8, the optical fiber 23).

Figure 9:
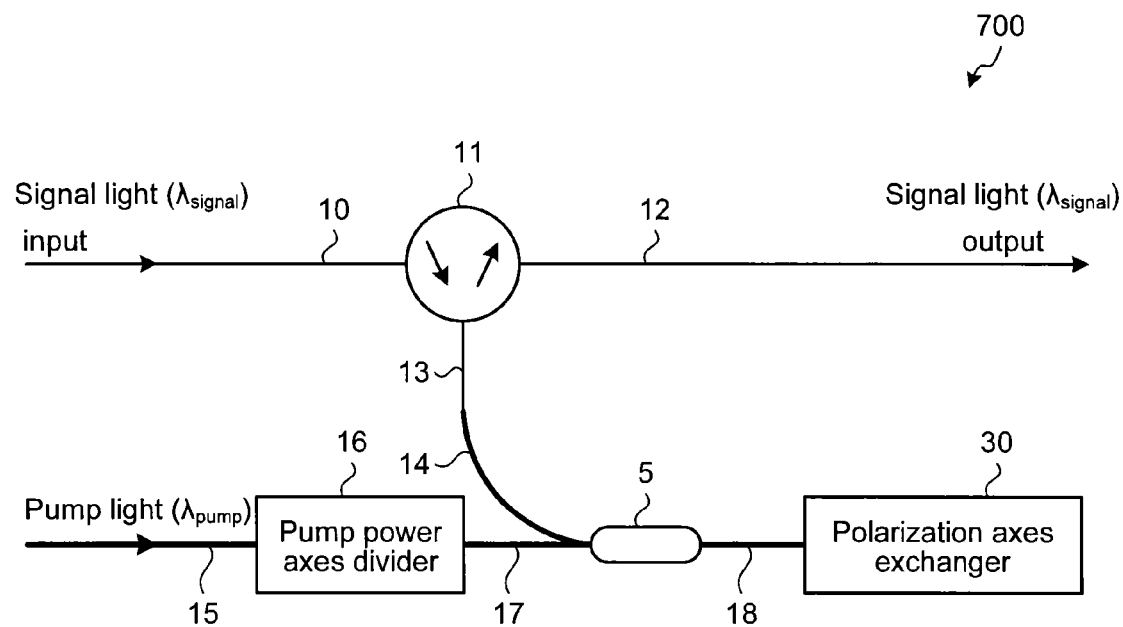
FIG. 9 is a view of another configuration of an optical amplifier realizing polarization independent optical amplification.

FIG. 9 is another configuration realizing a polarization independent optical fiber amplifier (herein an OPA). An optical fiber amplifier 700 of FIG. 9 has replaced the PBC 8 and a subsequent stage section of FIG. 6 with a polarization axes exchanger 30. The optical fiber 18 is a fiber performing amplification using nonlinear effect. A relative phase shifter is inserted into the optical fiber 18 of this optical fiber amplifier 700. After propagating in one of polarization axes of the optical fiber 18, a polarization axis of the propagated light is converted by the polarization axes exchanger to the other one of polarization axes, reflected, and propagates in the opposite direction in the other one of the polarization axes of the optical fiber 18. According to this, the components of each polarization axis propagating in the optical fiber 18 is compensated in polarization-dependent differential group delay, polarization independent operation is realized. As the polarization axes exchanger 30, there is a Faraday rotator mirror (FRM).

Herein, in a section of the optical fiber 18, relative phase shifters or optical fibers are disposed symmetrically with respect to the center in the form shown in FIG. 7 or FIG. 8. According to this, dispersion or nonlinear effect which signal light directed to the polarization axes exchanger 30 and signal light propagating in the opposite direction receive become identical, polarization independent operation is realized.

Next, a preferable configuration for a relative phase shifter is shown.

Characteristics desirable for a relative phase shifter is that loss is as low as possible at any one of pumping wavelength, idler light wavelength, and signal light wavelength, and the relative phase shifter gives a predetermined value of relative phase shift value φ rel. For example, in a state in which there is substantially no loss at the pumping wavelength, the idler light wavelength, and the signal light wavelength, phase may not be shifted at the idler light wavelength and the signal light wavelength, and a phase-shift value may be given only at the pumping wavelength.

For example, if difference between zero dispersion wavelength of an optical fiber as a gain medium and a Bragg wavelength of a fiber Bragg grating (FBG) is within 10 nm, this FBG functions as a relative phase shifter which can satisfy the above conditions if the pumping wavelength is set in the vicinity of the zero dispersion wavelength (λ0±2 nm).

There is a method of using an optical fiber as a relative phase shifter. Phase-shift value can be adjusted based on fiber length. In order to give only the effect of phase-shifting, it is desirable that the nonlinear constant of this optical fiber is smaller than half that of the optical gain fiber. The optical fiber realizes phase-shifting by giving dispersion to all inputted light.

There is a method of using a dielectric multilayer film filter as a relative phase shifter. Relative phase is shifted by functions of a band-pass filter, a band elimination filter, an all-pass filter, a low-pass filter, and a high-pass filter etc. In case that the filter is an all-pass filter, those having characteristics that shift the phase of reflection or transmissive light within a wavelength range of ±10 nm of pumping wavelength can be applied. Filters having characteristics that phase-shift only the wavelength range in the vicinity of the wavelength of the pump light and do not shift the phase of a signal in wavelength outside the range are preferable.

In case where the dielectric multilayer film filter is a transmissive filter, it can be disposed in an opposed collimator optical system. When being disposed, the phase-shift value can be adjusted by adjusting an angle relative to an optical axis. In case that the dielectric multilayer film filter is a reflective filter, it can be disposed in a dual collimator optical system 800. According to this, as shown in FIG. 10, light outputted from an optical fiber 31 and from a lens 33 at one side is reflected at a dielectric multilayer film filter 35, and inputted into another side of lens 34, light of which relative phase is shifted is outputted to an optical fiber 32.

Figure 10:
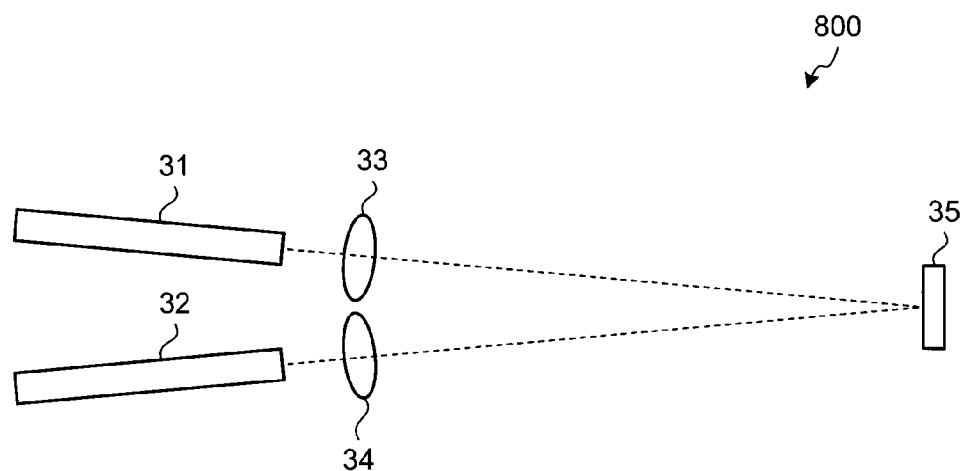
FIG. 10 is a view of a configuration of a relative phase shifter using a dielectric multilayer film filter.

It should be noted that, although FIG. 10 shows a configuration of combining the lenses 33 and 34 with the optical fibers 31 and 32 respectively, it is not limited to this, and a similar optical system may be configured by arranging the optical fibers 31 and 32 in parallel and disposing one lens. In this case, by using a dual-core fiber ferrule etc. in which the optical fibers 31 and 32 are inserted and fixed to a hole having a diameter that is identical with the total of outer diameters of the optical fibers 31 and 32, they can be disposed in parallel accurately. According to this, an optical system can be configured with a simpler configuration, and incident angle for the dielectric multilayer film filter can be given without variation and accurately. Therefore, in case of using dielectric multilayer film filters as a plurality of phase shifters to be inserted into a gain medium, wavelength characteristics of phase-shift value among the plurality of phase shifters can be made uniform.

In order to be packaged in the optical amplifier, it is desirable to apply a device in which a dielectric multilayer film filter, an optical fiber, and a lens are assembled. In this case, it is desirable that the optical fiber used in this device may not give dispersion and nonlinear effect to signal light. That is, it is desirable that, in the optical fiber used in this device, nonlinear constant is equal to or smaller than 5 [1/W/km] and dispersion is within a range from −1 to 1 [ps/nm/km] in a wavelength range of the optical signal to be amplified and wavelength range of the idler light to be generated corresponding to the wavelength of the pump light and the signal light.

Figure 11A:
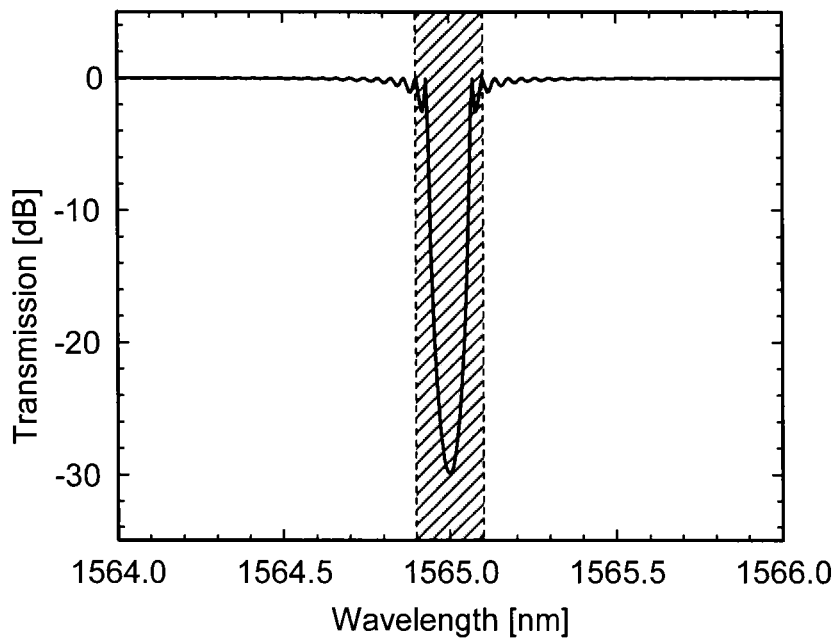
FIG. 11A is a typical transmission spectrum characteristic of an FBG.
Figure 11B:
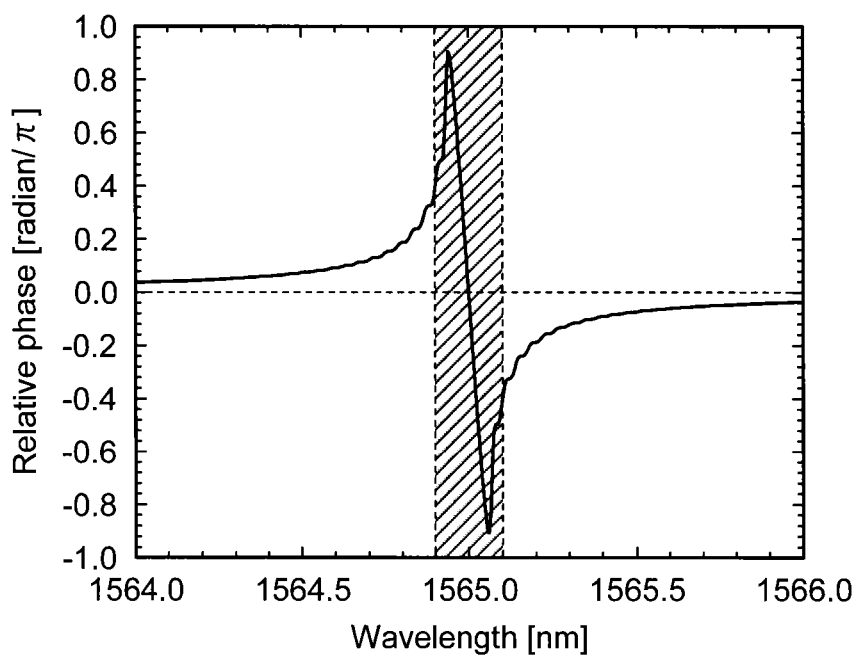
FIG. 11B is a typical phase characteristic of transmissive light of an FBG.

There is a method of using a fiber Bragg grating (FBG) as a relative phase shifter. FIGS. 11A and 11B are a typical transmission spectrum of a fiber Bragg grating and phase-shift value of transmissive light respectively. Bragg wavelength is 1565.0 [nm]. Since reflectance of the fiber Bragg grating is high in the vicinity of 1565 [nm], there is very little transmissive light. On the other hand, in FIG. 11A and FIG. 11B, there is very little reflectance in the wavelength outside a region surrounded by a dotted line, light transmits with very little loss (FIG. 11A). In this wavelength range, while there is very little reflectance, phase-shift value of transmissive light is greater than wavelength which is far away from Bragg wavelength (FIG. 11B). When Bragg wavelength is set so that wavelength of the pump light is within the wavelength region in which the phase of this transmissive light is shifted, the relative phase is shifted by shifting the phase of the pump light. That is, the fiber Bragg grating can be used as a relative phase shifter. Herein, wavelength indicated in hatching is wavelength at which transmission loss becomes 3 dB.

Phase-shift value of a fiber Bragg grating increases with the decreasing transmittance at Bragg wavelength. Then, by applying one having adequate transmittance of light at Bragg wavelength and adequate transmissive line width, adequate relative phase shift value can be obtained for obtaining flat gain characteristics. Since, if transmissive line width is broadened, a range capable of phase-shifting is broadened, it is preferable since tolerance of pumping wavelength increases. However, since there is a relation of trade-off between the phase-shift value and the range capable of phase-shifting, it is desirable to set separately based on necessary phase-shift value.

Figure 12:
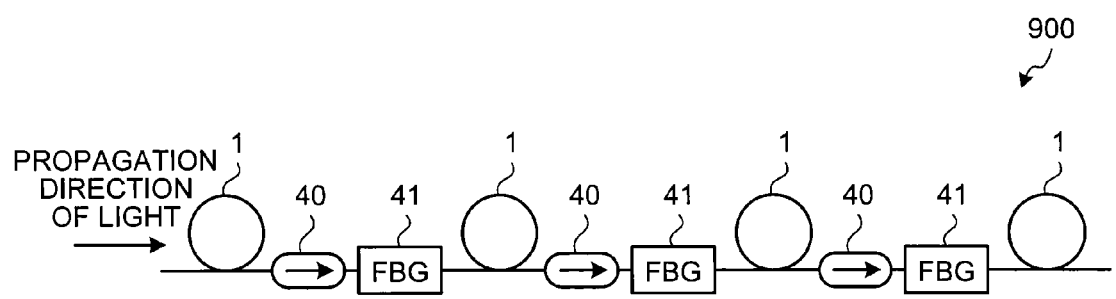
FIG. 12 is a view of a configuration of disposing an isolator at a stage prior to an FBG in case of using a plurality of FBGs as relative phase shifters.
Figure 13:
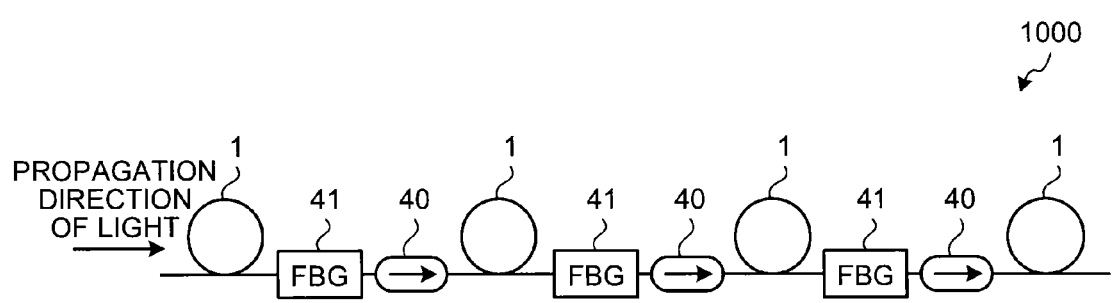
FIG. 13 is a view of a configuration of disposing an isolator at a stage subsequent to an FBG in case of using a plurality of FBGs as relative phase shifters.

Since reflective light is generated when applying a fiber Bragg grating as a relative phase shifter, in order to prevent reflection, it is desirable to insert an optical isolator at a stage prior to an FBG. In FIG. 12, in an optical fiber gain portion 900, an optical isolator 40 is inserted into a stage prior to an FBG 41 with respect to the propagation direction of light in the optical fiber 1. In case of disposing a plurality of FBGs in an optical fiber for amplification use, in order to stop the propagation of light reflected from the FBG at a subsequent stage, an isolator may be inserted at a stage subsequent to an FBG, or may be inserted into both of them. In FIG. 13, in an optical fiber gain portion 1000, the optical isolator 40 is inserted into a stage subsequent to an FBG 41 with respect to the propagation direction of light in the optical fiber 1. It should be noted that, in case of herein using an optical isolator module as an optical isolator, it is preferable that the optical fiber constituting an optical isolator module to be used will not give dispersion and nonlinear effect to signal light. That is, in a wavelength range of the signal light to be amplified and a wavelength range of the idler light to be generated in correspondence with a wavelength of the pump light and the signal light, it is preferable that nonlinear constant of an optical fiber constituting an optical isolator module is small, i.e. equal to or smaller than 5 [1/W/km] and dispersion is small, i.e. within a range from −1 [ps/nm/km] to 1 [ps/nm/km]. Herein a spatial coupling system may be provided directly (without providing a fusion spliced portion) to an optical fiber for amplification use, and furthermore, an FBG may be written in the optical gain fiber directly. By doing this, there is not a fusion spliced portion, and loss can be lowered.

Bragg wavelength of a fiber Bragg grating fluctuates to a significant degree based on environmental temperature. This is because period of refractive index variation written in an optical fiber fluctuates together with thermal expansion, or extension and contraction, of the optical fiber. When Bragg wavelength fluctuates, since phase-shift value of pump light fluctuates, optical parametric amplification characteristics fluctuate. In order to stabilize amplification characteristics, it is effective to restrain Bragg wavelength from being fluctuating based on temperature. For that purpose, it is preferable to use a device packaged so that the dependence of a fiber Bragg grating on temperature is relaxed.

On the other hand, it is possible to utilize fluctuation of Bragg wavelength together with extension and contraction of fiber length of the fiber Bragg grating. It is preferable to integrate a fiber Bragg grating in a device in which a fiber Bragg grating is stretchable and shortenable so that it is possible to adjust phase-shift value at which parametric gain characteristics become the flattest by adjusting temperature of a fiber Bragg grating.

There is a method of using a planar light wave circuit (PLC) as a relative phase shifter.

For example, an optical circuit in a PLC is configured by a circuit separating pump light from light other than that, a circuit shifting phase, and a circuit coupling the pump light and the light other than that. A relative phase shifter can adjust phase-shift value by changing the length of an optical path of the circuit shifting the phase by thermo optical effect.

In order to restrain phase-shift value or wavelength from changing based on temperature, it is desirable to make a PLC contact with a temperature control element such as a Peltier element or a heater etc. and control the temperature control element so that the temperature of the PLC becomes constant while measuring the temperature of the PLC by a temperature sensor such as a thermistor or a thermocouple etc.

Temperature control using a temperature element and a temperature sensor consumes electric power. In order to reduce electric power consumption, it is a further desirable form to athermalize the PLC by providing the PLC with a mechanism operating in an opposite manner to fluctuation by heat.

There is a method of using a phase adjuster using a spatial optical system grating and a liquid crystal on silicon (LCOS) as a relative phase shifter. It is possible to give an arbitrary value of phase shift to each wavelength of signal light and adjustment is easy. In this state, by increasing or decreasing the voltage applied to the LCOS so that wavelength characteristics of gain become flat, phase-shift value of light of each wavelength is increased or decreased.

As a relative phase shifter, there is a method of shifting a phase by combining above described each device as the relative phase shifter.

Next, an effect of inserting a relative phase shifter into an optical gain fiber will be explained by using simulation.

In order to simulate propagation of light, differential equations are used as follows.

$$\frac{dE_p}{dz} = -\frac{\alpha}{2}E_p + i\gamma[(|E_p|^2 + 2|E_s|^2 + 2|E_i|^2)E_p + 2E_p^* E_s E_i \exp(i\Delta kz)] \quad (1a)$$

$$\frac{dE_s}{dz} = -\frac{\alpha}{2}E_s + i\gamma[(2|E_p|^2 + |E_s|^2 + 2|E_i|^2)E_s + E_p^2 E_i^* \exp(-i\Delta kz)] \quad (1b)$$

$$\frac{dE_i}{dz} = -\frac{\alpha}{2}E_i + i\gamma[(2|E_p|^2 + 2|E_s|^2 + |E_i|^2)E_i + E_p^2 E_s^* \exp(-i\Delta kz)] \quad (1c)$$

Herein Ep, Es, and Ei are complex amplitudes for pump light, signal light, and idler light, respectively. In addition, z [km] is propagation distance in an optical fiber, α is loss coefficient of an optical fiber, and γ [1/W/km] is nonlinear constant of an optical fiber. Δk[1/km] is a constant indicating phase matching, and defined as $$\Delta k = 2\pi(ns/\lambda s + ni/\lambda i - 2(np/\lambda p)).$$

np, ns, and ni are refractive indices of an optical fiber for amplification use at pump light wavelength, signal light wavelength, and idler light wavelength, respectively.

Figure 15A:
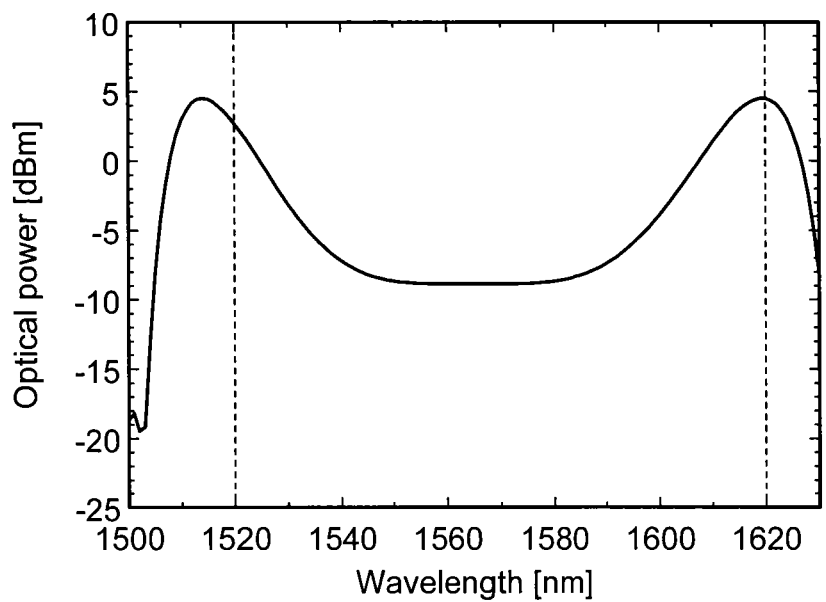
FIG. 15A is a spectrum of outputted signal light power in case where there is not a relative phase shifter.
Figure 15B:
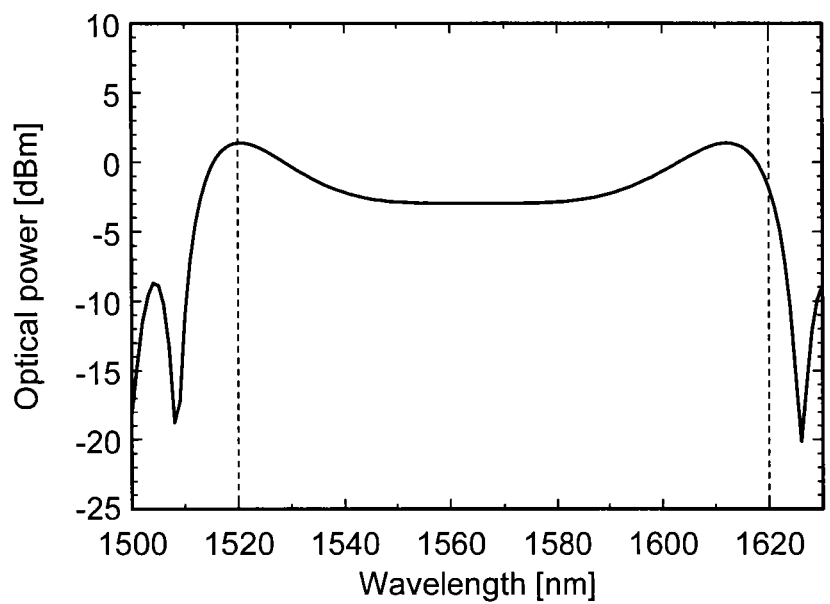
FIG. 15B is a spectrum of outputted signal light power in case where there is a relative phase shifter.

As a simulation of an OPA, we consider a system in which a relative phase shifter is inserted in the middle of (a 200 meter length of) an optical fiber for amplification use. FIG. 14 shows conditions of simulation (pump light wavelength, pump light power, signal light power, zero-dispersion wavelength, dispersion slope, nonlinear constant, fiber length and loss of an optical gain fiber, disposition position of relative phase shifters, and relative phase shift value). Results of simulations of optical propagation are shown as follows in a case of inserting, and not inserting, a relative phase shifter into the configuration shown in FIG. 1 under the condition shown in FIG. 14. FIGS. 15A and 15B are spectra of signal light power when there is not a relative phase shifter, and when there is a relative phase shifter respectively. As compared with when there is not a relative phase shifter (FIG. 15A), when there is a relative phase shifter (FIG. 15B), difference between optical power at a wavelength of 1565 nm and the maximum power of the spectrum decreased from 13 dB to 4.2 dB, and a flatter spectrum was obtained in a wavelength range of 1520 nm to 1620 nm.

From this result, it is apparent that a relative phase shifter is effective for obtaining flatness of gain of signal light power.

Figure 16A:
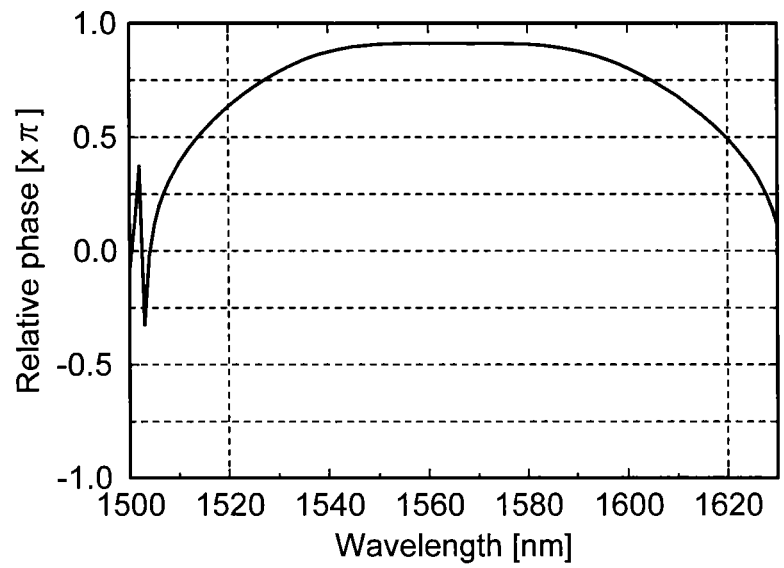
FIG. 16A is a relative phase spectrum of outputted signal light in case where there is not a relative phase shifter.
Figure 16B:
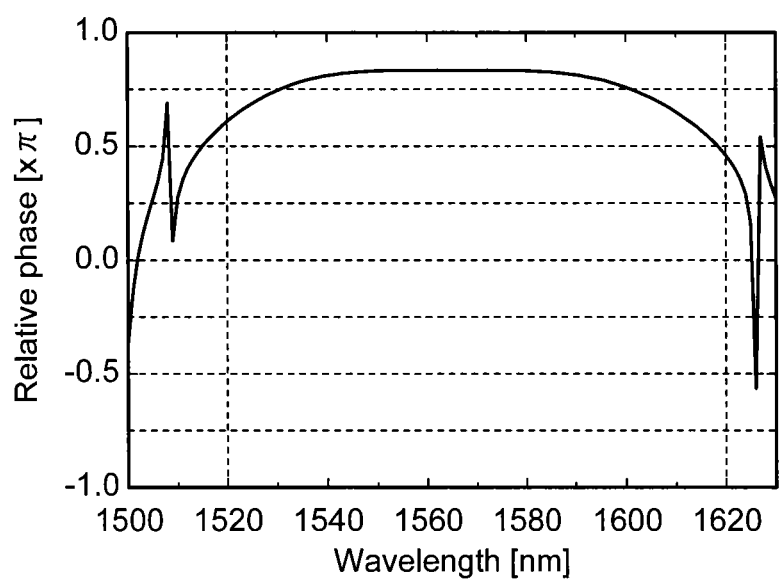
FIG. 16B is a relative phase spectrum of outputted signal light in case where there is a relative phase shifter.

FIGS. 16A and 16B show relative phases in fiber output when there is not a relative phase shifter and when there is a relative phase shifter respectively. It is found that, in the range of wavelengths of 1520 nm to 1620 nm in which flatness of signal spectrum is obtained, the case where there is a relative phase shifter (FIG. 16A) is closer to π/2 which is the relative phase indicating phase matching.

Figure 17A:
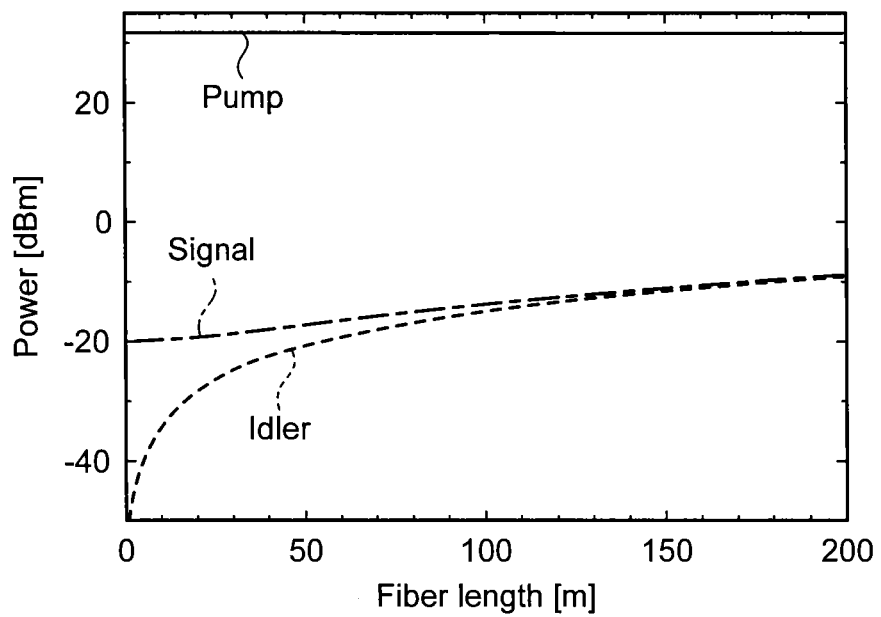
FIG. 17A is an optical power fluctuation waveform chart in case where there is not a relative phase shifter.
Figure 17B:
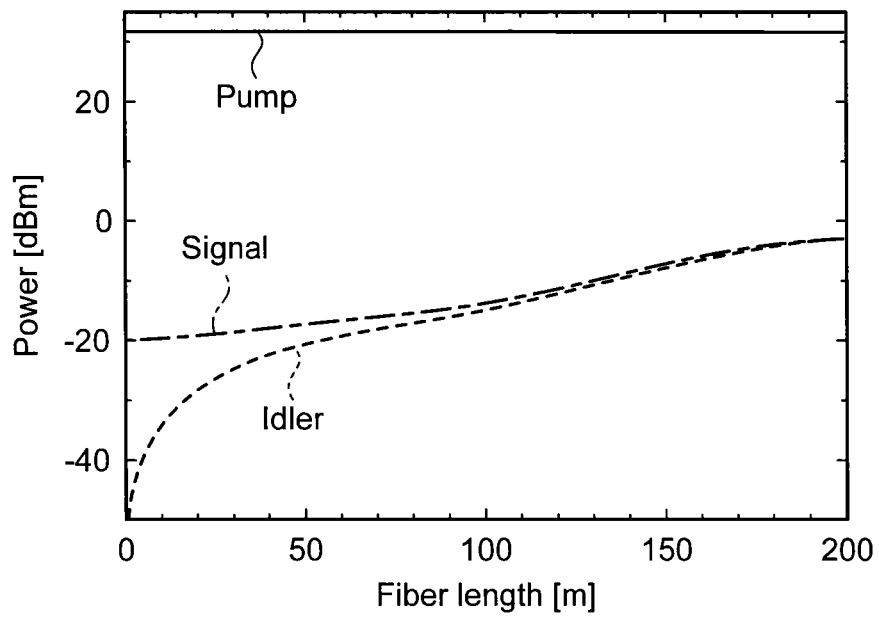
FIG. 17B is an optical power fluctuation waveform chart in case where there is a relative phase shifter.

FIGS. 17A and 17B show change in power of each light in the lengthwise direction of a fiber when there is not a relative phase shifter and when there is a relative phase shifter respectively. Herein wavelength λs of signal light was set at 1560 nm. Since a relative phase shifter is disposed at a 100 meter point of fiber length when there is the relative phase shifter, it is found that increasing ratios of signal light and idler light change from that point. It is found, from this, that a relative phase shifter contributes to increasing gain ratios of signal light and idler light.

Figure 18A:
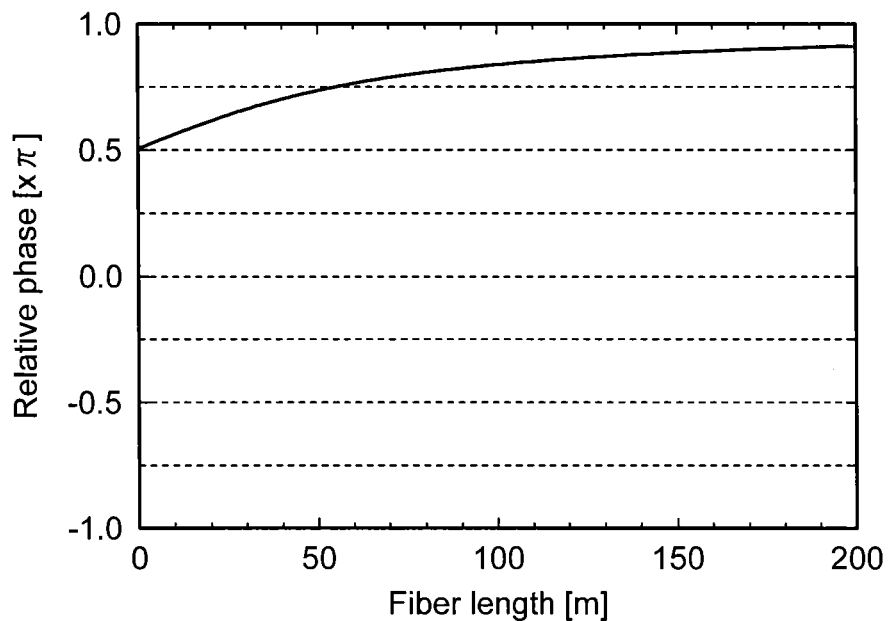
FIG. 18A is a fluctuation waveform chart of relative phase of signal light in case where there is not a relative phase shifter.
Figure 18B:
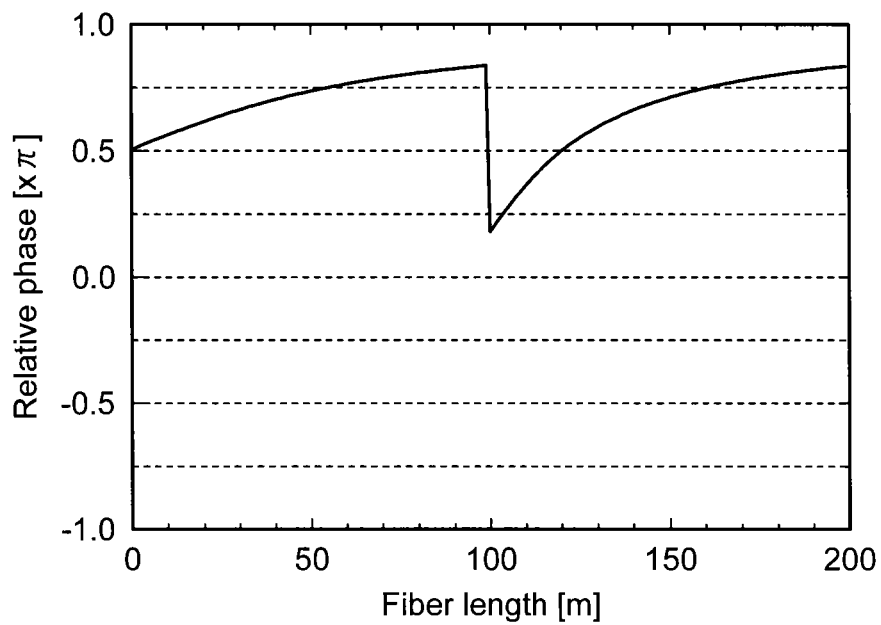
FIG. 18B is a fluctuation waveform chart of relative phase of signal light in case where there is a relative phase shifter.

FIGS. 18A and 18B show change in relative phase in the lengthwise direction of a fiber when there is not a relative phase shifter and when there is a relative phase shifter respectively. Herein wavelength λs of signal light was set at 1560 nm. It is found that, when there is not a relative phase shifter (FIG. 18A), after beginning with π/2 and after increasing uniformly, relative phase converges in the vicinity of 0.9π. On the other hand, when there is a relative phase shifter (FIG. 18B), after beginning with π/2, although relative phase increases gradually, and is shifted by −0.66π by the relative phase shifter at the 100 meter point of the fiber length, reaching approximately 0.83π. The relative phase increases gradually from that point, and is outputted again almost when reaching approximately 0.83π.

In general, when relative phase becomes closer to relative phase π/2 at which phase matching is obtained, the gain ratio of the OPA gain is higher. After propagating 100 meter in the fiber, in the case where there is a relative phase shifter passes a relative phase region in which gain becomes high. In FIG.

17B, from the aspect of relative phase, it was explained successfully that gain ratio increases at and after 100 meter of propagation of the fiber.

Figure 20A:
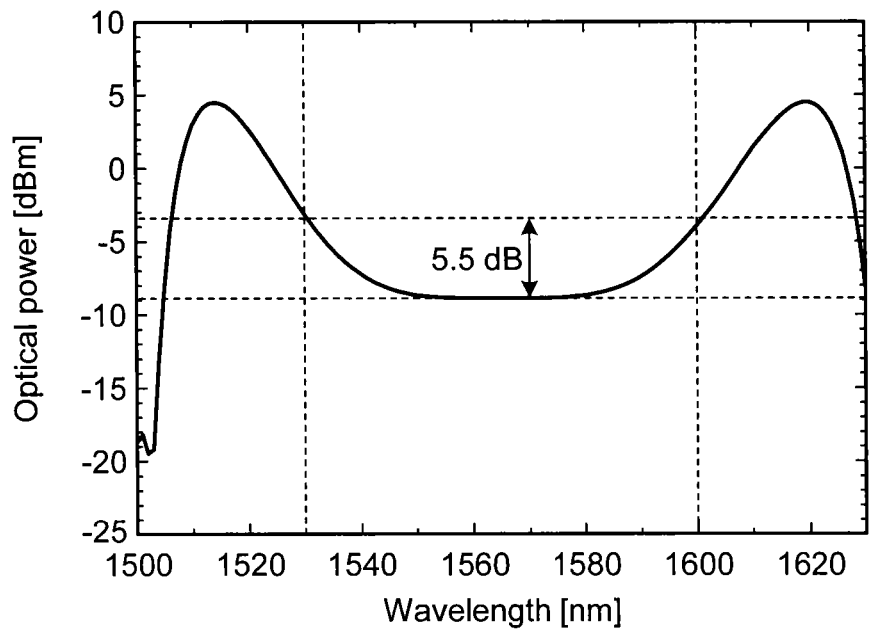
FIG. 20A is a spectrum of outputted signal light power in case where there is not a relative phase shifter.
Figure 20B:
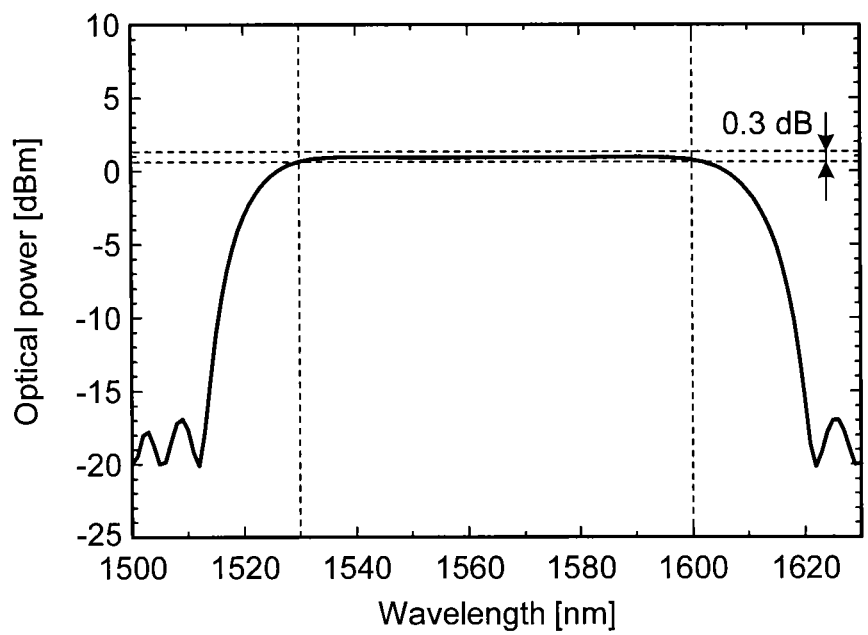
FIG. 20B is a spectrum of outputted signal light power in case where there is a relative phase shifter.

As a simulation of an OPA, we consider a system in which a relative phase shifter is inserted at a period of 50 meter in (a 200 meter length of) an optical fiber for amplification use. Results of simulations of propagation of signal light in the configuration shown in FIG. 1 under the condition shown in FIG. 19 are shown as follows. FIGS. 20A and 20B are spectra of signal light power when there is not a relative phase shifter and when there is a relative phase shifter respectively. It is found that, when there is not a relative phase shifter, power in the vicinity of pump light wavelength is low and power at wavelength which is distant from the pump light wavelength by approximately 50 nm becomes high. On the other hand, it is found that, when there is a relative phase shifter, signal light power shows 0.3 dB of flatness within a range of wavelengths 1530 nm to 1600 nm. From this result, it is apparent that a relative phase shifter is effective for obtaining flatness of gain of signal light power.

Figure 21A:
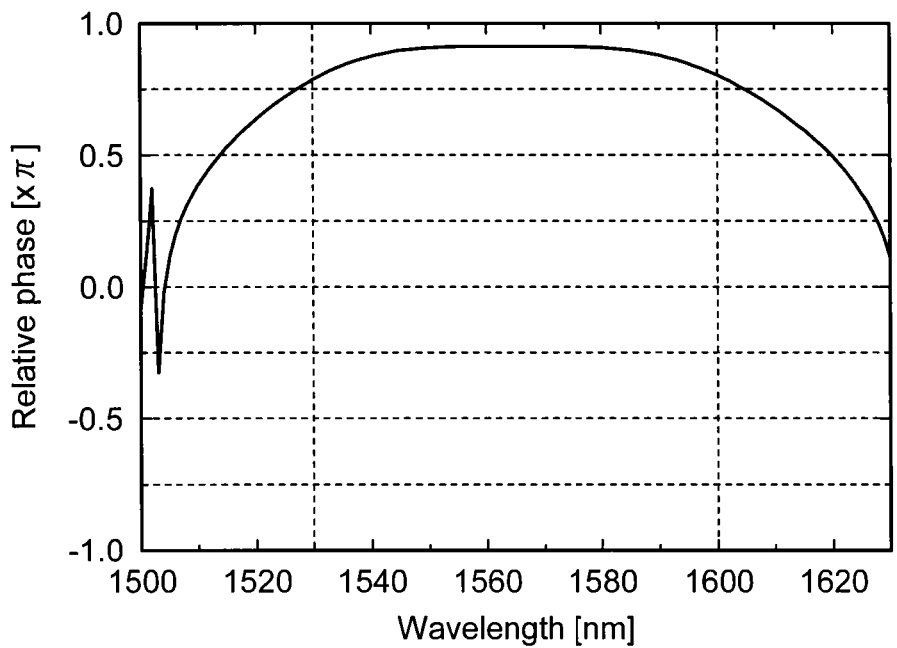
FIG. 21A is a relative phase spectrum of outputted signal light in case where there is not a relative phase shifter.
Figure 21B:
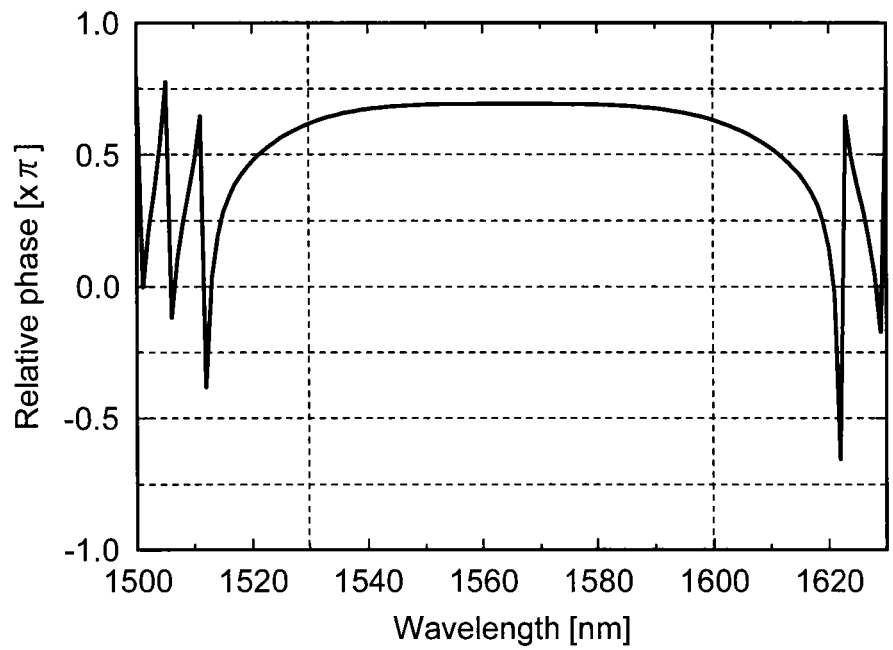
FIG. 21B is a relative phase spectrum of outputted signal light in case where there is a relative phase shifter.

FIGS. 21A and 21B show relative phases in fiber output when there is not a relative phase shifter and when there is a relative phase shifter respectively. It is found that, when there is not a relative phase shifter, relative phase is equal to or greater than $0.75\pi$, and the relative phase fluctuates to a significant degree based on wavelength within a range of wavelengths 1530 nm to 1600 nm. On the other hand, it is found that, when there is a relative phase shifter, relative phase exists within a narrow range of $0.08\pi$ width from $0.61\pi$ to $0.69\pi$, and dependence on wavelength is small.

Figure 22A:
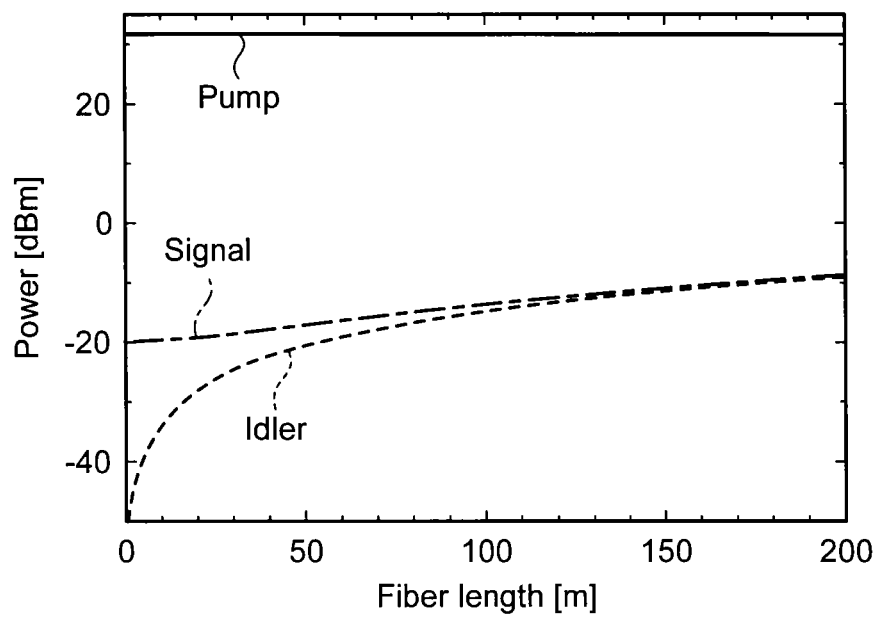
FIG. 22A is an optical power fluctuation waveform chart in case where there is not a relative phase shifter.
Figure 22B:
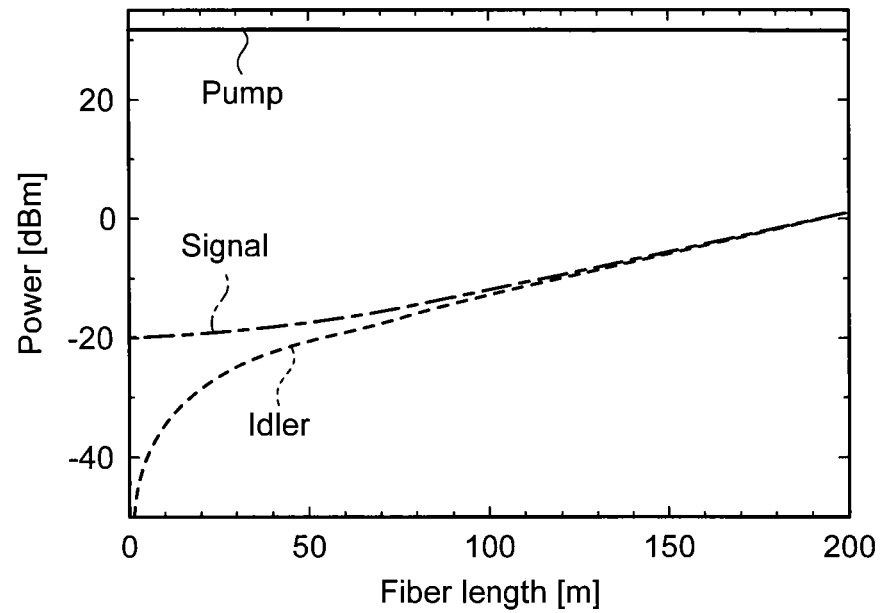
FIG. 22B is an optical power fluctuation waveform chart in case where there is a relative phase shifter.

FIGS. 22A and 22B show change in power of each light in the lengthwise direction of a fiber when there is not a relative phase shifter and when there is a relative phase shifter respectively. Herein wavelength $\lambda s$ of signal light was set at 1560 nm. Power of signal light in fiber output is −9.3 dBm when there is not a relative phase shifter, and in contrast, it is 0.89 dBm when there is a relative phase shifter, and there is a difference of approximately 10.1 dB. It is also found, similarly from this, that the relative phase shifter contributes to increasing gain ratios of signal light and idler light.

Figure 23A:
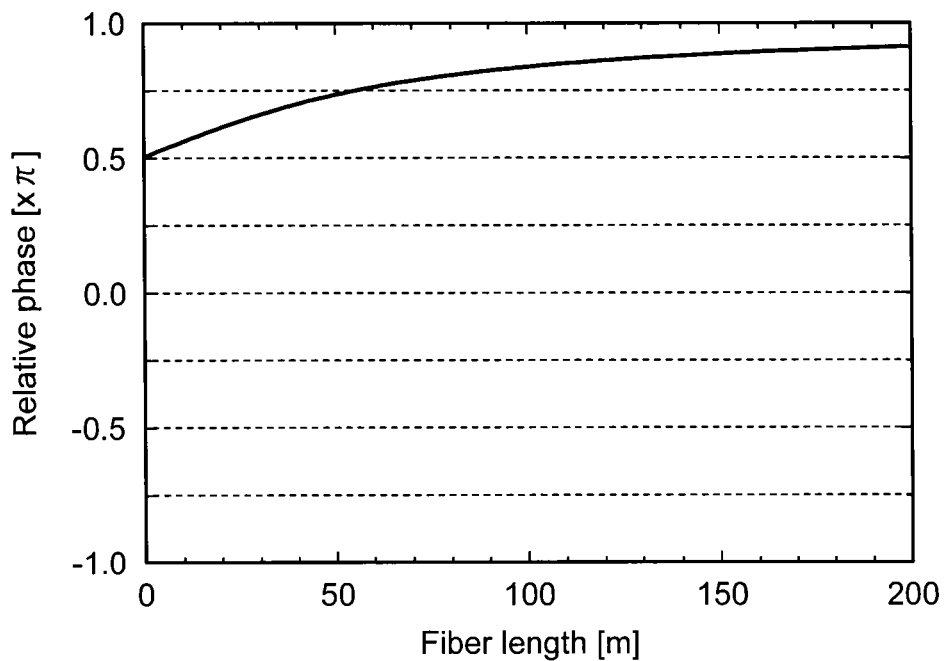
FIG. 23A is a fluctuation waveform chart of relative phase of signal light in case where there is not a relative phase shifter.
Figure 23B:
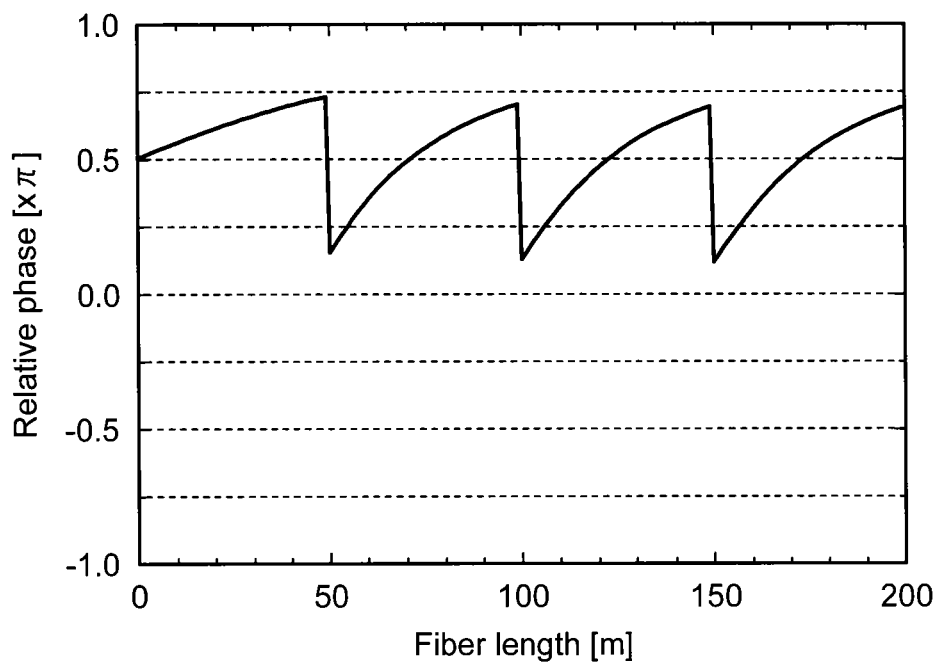
FIG. 23B is a fluctuation waveform chart of relative phase of signal light in case where there is a relative phase shifter.

FIGS. 23A and 23B show change in relative phase in the lengthwise direction of a fiber when there is not a relative phase shifter and when there is a relative phase shifter respectively. Herein wavelength $\lambda s$ of signal light was set at 1560 nm. When there is a relative phase shifter, although the relative phase, after beginning with $\pi/2$, increases gradually, is shifted to approximately $0.25\pi$ by the relative phase shifter at a 50 meter point of fiber length, reaching at approximately $0.75\pi$. The relative phase increases gradually from that point and repeats periodically to be shifted again to approximately $0.25\pi$ by the relative phase shifter at 100 meter and 150 meter of fiber length having reached approximately $0.75\pi$ respectively. In this manner, a fact that the relative phase shifter vibrates the relative phase with respect to the relative phase $\pi/2$ at which power gain was high came to a difference of gain in FIG. 22. This is, the signal light is considered to propagate under dynamically phase matched condition. That is, it can be in a quasi-phase matching state. Phase matching condition is relaxed by inserting a relative phase shifter, and as a result of that, gain of signal light is flattened.

Figure 24A:
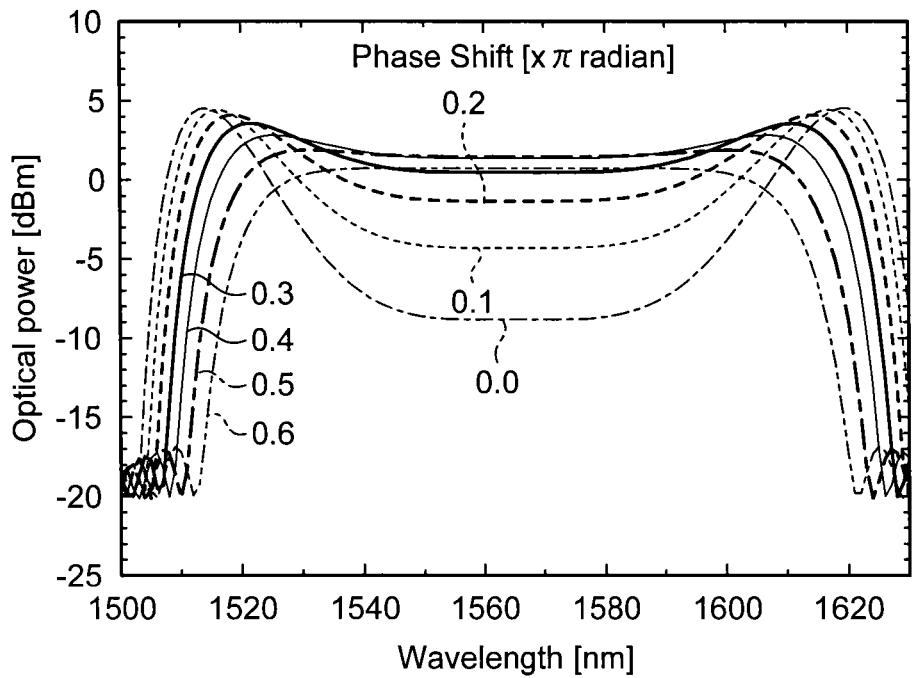
FIG. 24A is a view showing dependence of a spectrum of outputted signal light power on relative phase shift.
Figure 24B:
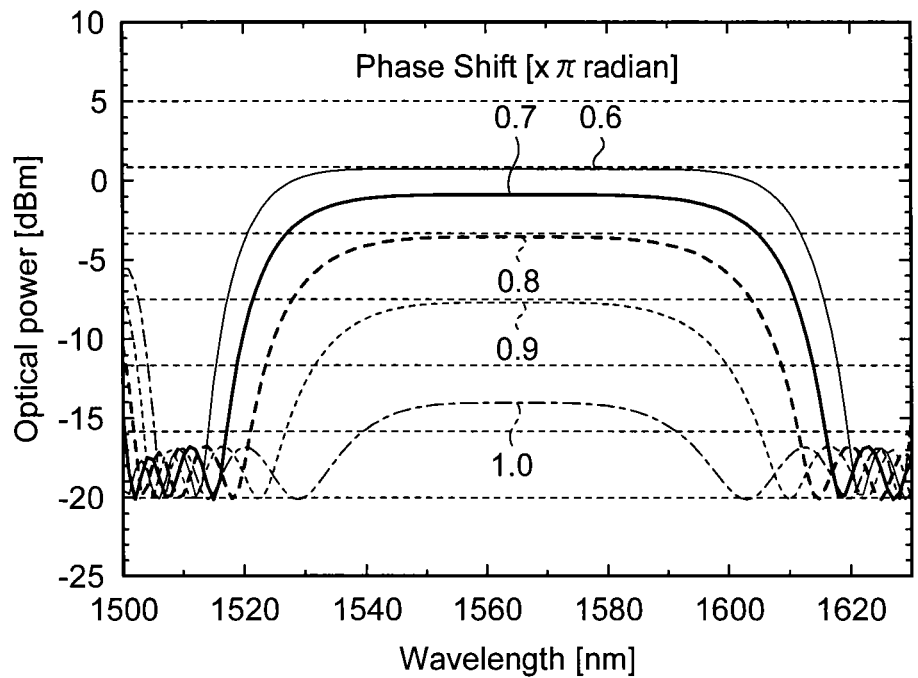
FIG. 24B is a view showing dependence of a spectrum of outputted signal light power on relative phase shift.

Among conditions of FIG. 19, relative phase shift value by the relative phase shifter is adjusted so that a gain spectrum becomes the flattest in case of inserting a relative phase shifter at a period of 50 meters in an optical fiber for amplification use. On the other hand, in FIG. 24, relative phase shift value is changed while the conditions of FIG. 19 are maintained. FIG. 24A shows a gain spectrum of signal light of which relative phase shift value is changed from $0.0\pi$ to $0.6\pi$, and FIG. 24B shows a spectrum of signal light power of which relative phase shift value is changed from $0.6\pi$ to $1.0\pi$. Along with the relative phase shift value increasing from $0.0\pi$ to $0.6\pi$, the flatness of the spectrum of the signal light power increases. In this state, along with increase in the relative phase shift value, a 3 dB amplification band of amplification band decreases from 120 nm to approximately 80 nm. On the other hand, it is found that, along with the phase shift value keeping increasing from the relative phase shift value of $0.6\pi$, although the flatness is maintained, a wavelength band at which the spectrum is flat becomes narrower. That is, it is found that, there is the optimum phase-shift value which satisfies the flatness of the spectrum of power of signal light and maximizes the operative wavelength band.

Figure 25A:
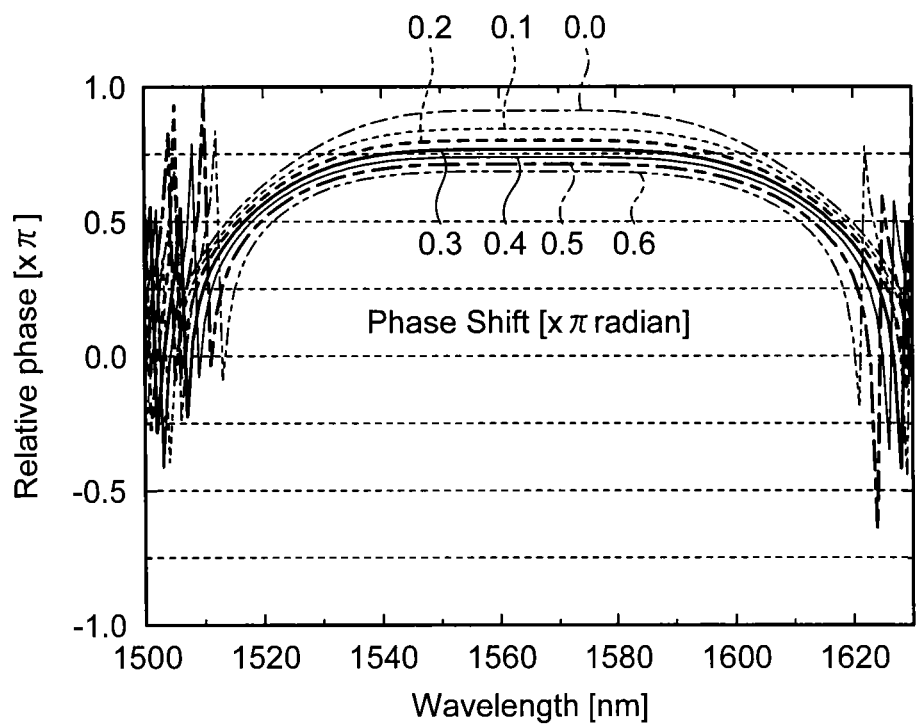
FIG. 25A is a view showing dependence of a relative phase spectrum of an outputted signal on relative phase shift.
Figure 25B:
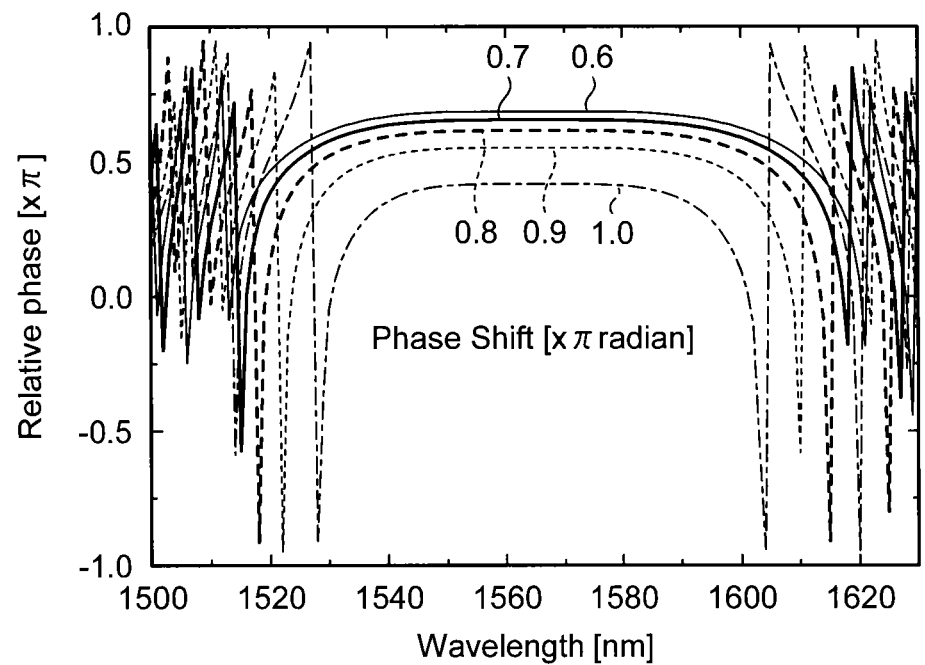
FIG. 25B is a view showing dependence of a relative phase spectrum of an outputted signal on relative phase shift.

FIG. 25A shows output relative phase spectrum of signal light of which relative phase shift value is changed from $0.0\pi$ to $0.6\pi$, and FIG. 25B shows output relative phase spectrum of signal light of which relative phase shift value is changed from $0.6\pi$ to $1.0\pi$. From comparisons of FIGS. 24A and 24B, it is found that there is a correlation between flatness of relative phase and flatness of a gain spectrum. That is, in FIG. 25A, as relative phase increases from $0.0\pi$, there are increase of flatness of relative phase and wavelength band. In FIG. 25B, it is found that, as relative phase increases from $0.6\pi$, a wavelength region in which relative phase is flat becomes narrower.

Figure 26A:
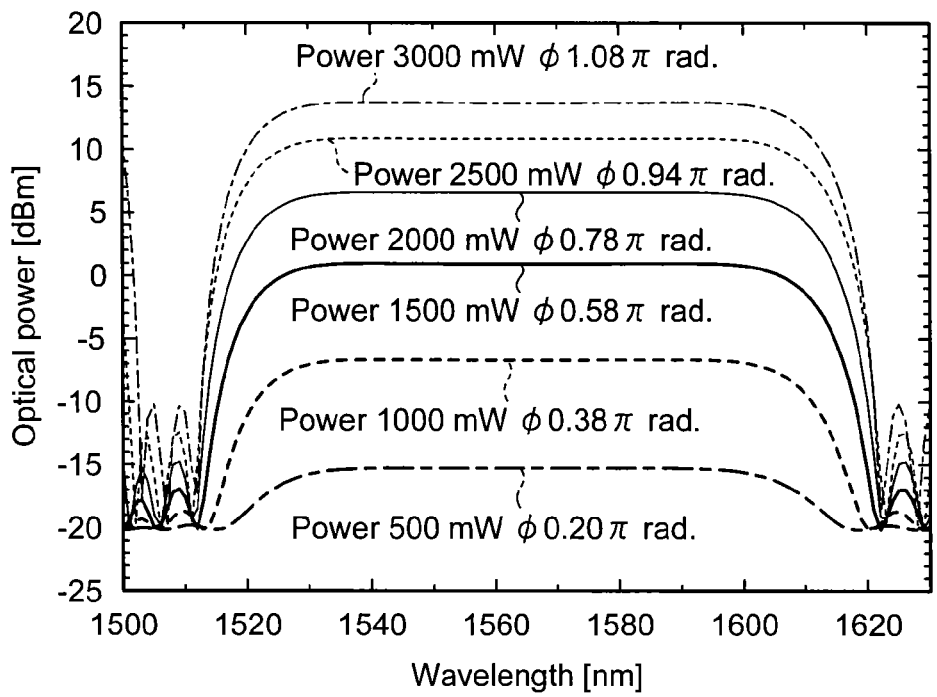
FIG. 26A is a view showing dependence of a spectrum of outputted signal light power on pump power.
Figure 26B:
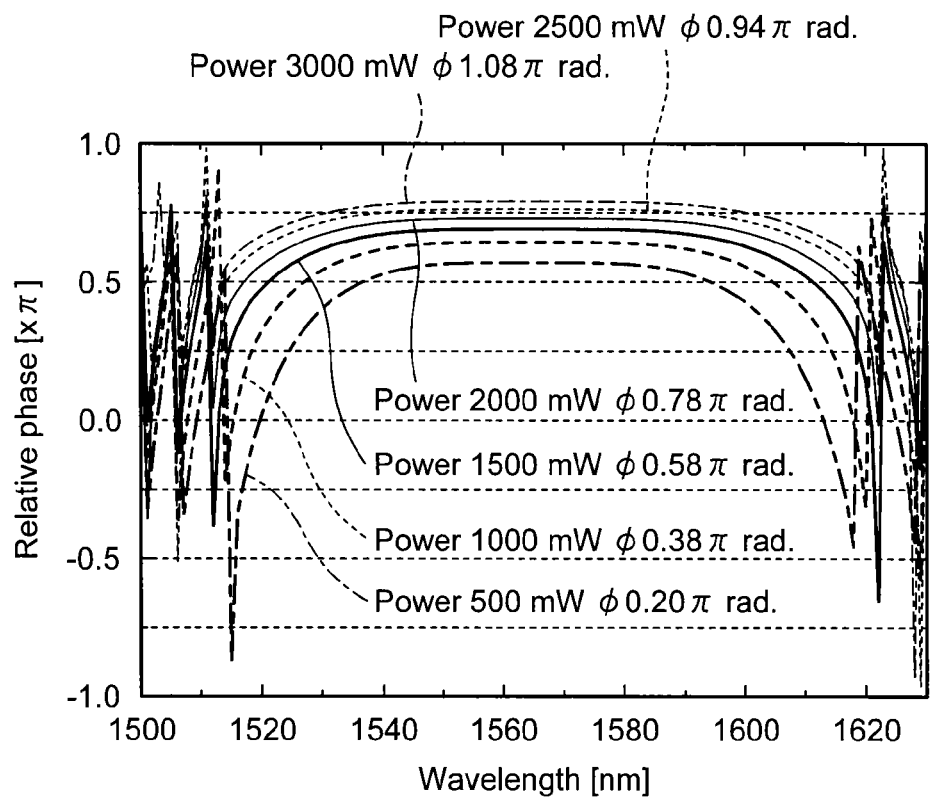
FIG. 26B is a view showing dependence of a relative phase spectrum on pump power.

FIGS. 26A and 26B are spectrum of signal light power and relative phase spectrum in fiber output respectively when power of pump light is changed under conditions of FIG. 19. It should be noted that, relative phase shift value (shown as $\phi$ in the drawings) is adjusted so that a spectrum of signal light power is flat and wavelength band becomes the maximum in each pump light power. From FIG. 26A, it is found that, along with increase in pump power, 1) output power of signal light increases, 2) optimum relative phase shift value increases, and 3) a wavelength region in which spectrum is flat does not change. From FIG. 26B, it is found that relative phase of output of signal light increases gradually along with increase in pump power. This is because, since change rate of nonlinear phase shift in the lengthwise direction of a fiber increases along with increase in pump power, phase-shift value which is necessary for its compensation increases.

Figure 27A:
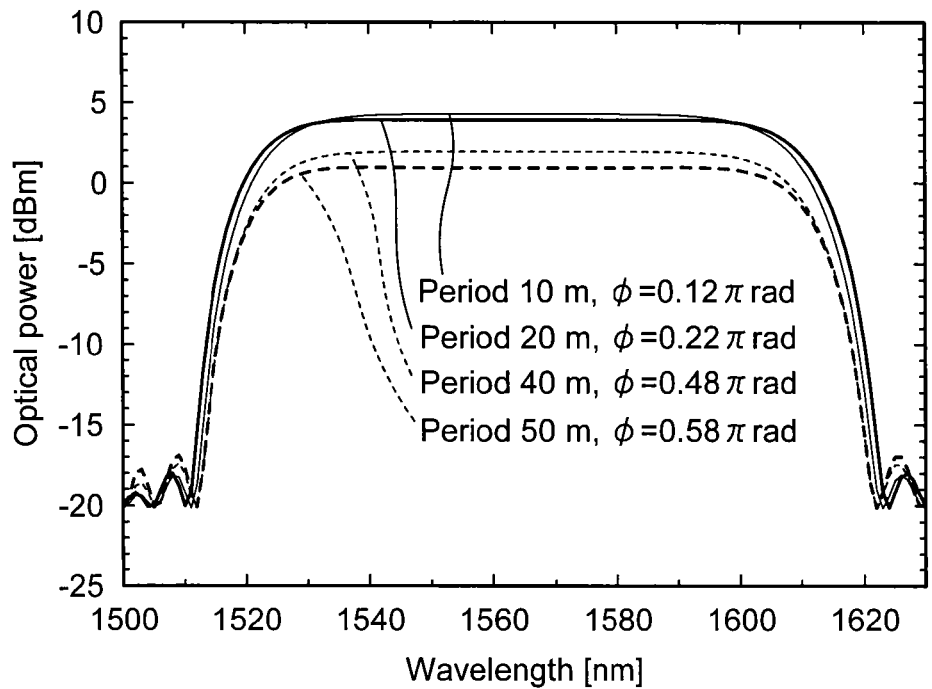
FIG. 27A is a view showing dependence of a spectrum of outputted signal light power on a period at which relative phase shifters are disposed.
Figure 27B:
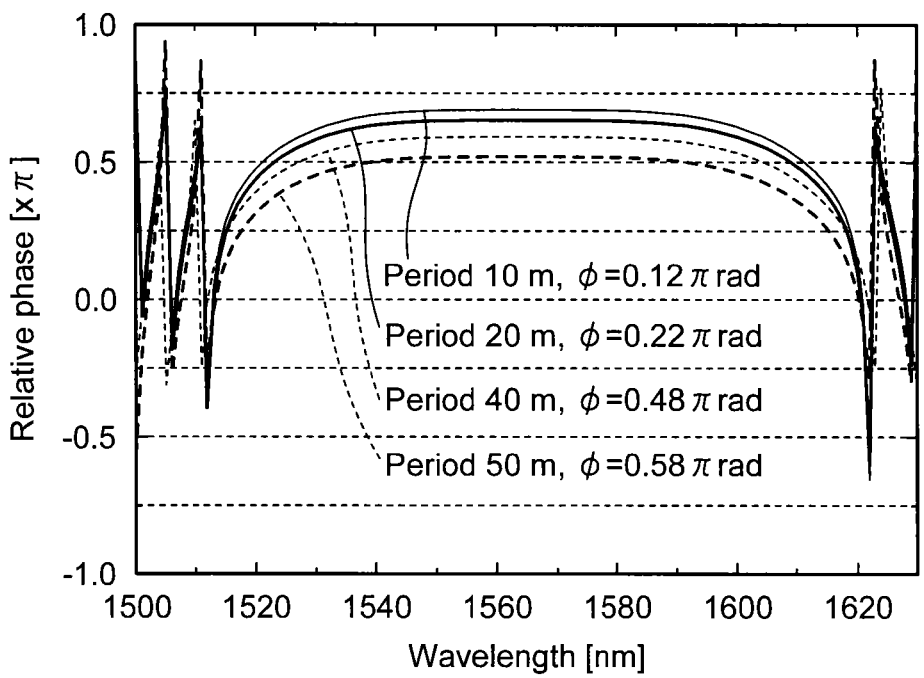
FIG. 27B is a view showing dependence of a relative phase spectrum on a period at which relative phase shifters are disposed.

Dependence of relative phase shifter on disposition period is explained. FIGS. 27A and 27B are a spectrum of signal light power and a relative phase spectrum respectively when disposition period of relative phase shifter is changed. It should be noted that, in each disposition period, relative phase shift value (shown as $\phi$ in the drawings) was adjusted so that a spectrum of signal light power is flat and a flat wavelength region becomes the maximum. From FIG. 27A, it is found that, as disposition period is made shorter, a flat wavelength range does not change substantially, and output power increases. It became apparent that shortening the disposition period causes the gain of signal light to increase. From FIG. 27B, it is found that, if disposition period is made shorter, of a relative phase spectrum of outputted signal light, 1) a flat wavelength region does not change substantially, and 2) it approaches $0.5\pi$ gradually which is relative phase indicating phase matching. The fact that the gain of signal light is higher with the shorter disposition period can be explained by a fact that a relative phase $0.5\pi$ which is a phase at which gain becomes the highest becomes closer. Therefore, it is preferable that a relative phase shifter is inserted in the lengthwise direction of an optical gain fiber so that relative phase falls within a predetermined range including $0.5\pi$.

While zero-dispersion wavelength of an optical gain fiber is maintained at 1565 nm, dispersion slope is increased to 0.05 [ps/nm²/km], which is greater than 0.02 [ps/nm²/km] and is the condition of FIG. 19, and both of them are compared to show influence of dispersion slope. Simulation condition in this case is shown in FIG. 28.

Figure 29A:
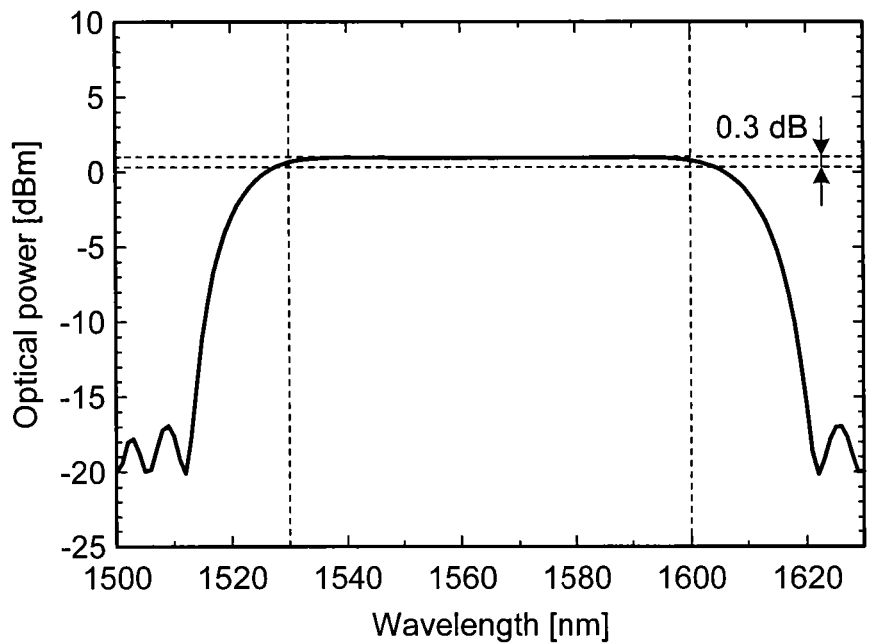
FIG. 29A is a spectrum of outputted signal light power when dispersion slope is 0.02 [ps/nm$^2$/km]
Figure 29B:
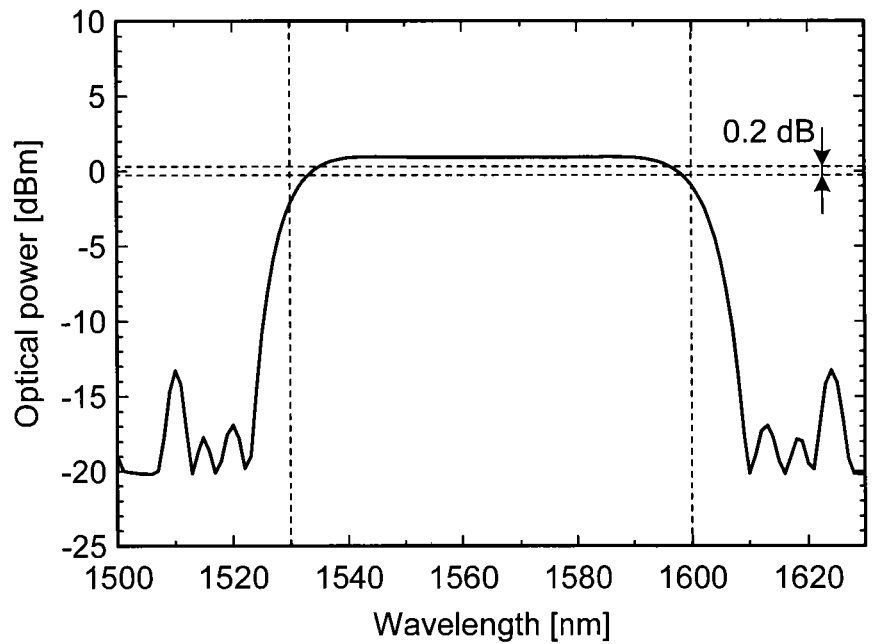
FIG. 29B is a spectrum of outputted signal light power when dispersion slope is 0.05 [ps/nm$^2$/km]

FIGS. 29A and 29B are spectrum of output signal light power when dispersion slope is 0.02 [ps/nm²/km] and spectrum of output signal light power when dispersion slope is 0.05 [ps/nm²/km] respectively. It is found that, even if dispersion slope increases, although a flat spectrum can be obtained, a wavelength range of flat spectrum becomes narrow.

Figure 30A:
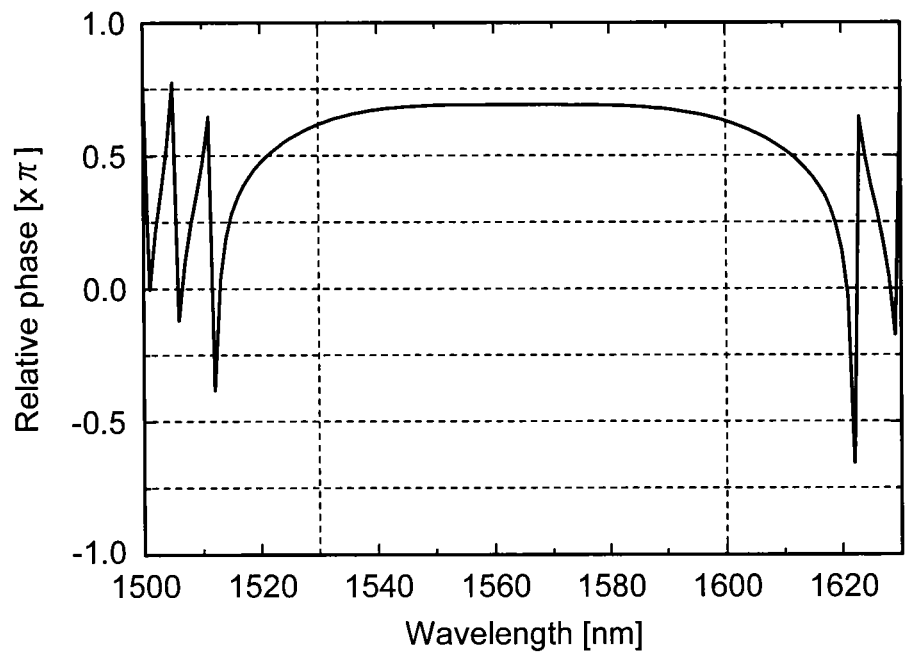
FIG. 30A is a relative phase spectrum of outputted signal light when dispersion slope is 0.02 [ps/nm$^2$/km]
Figure 30B:
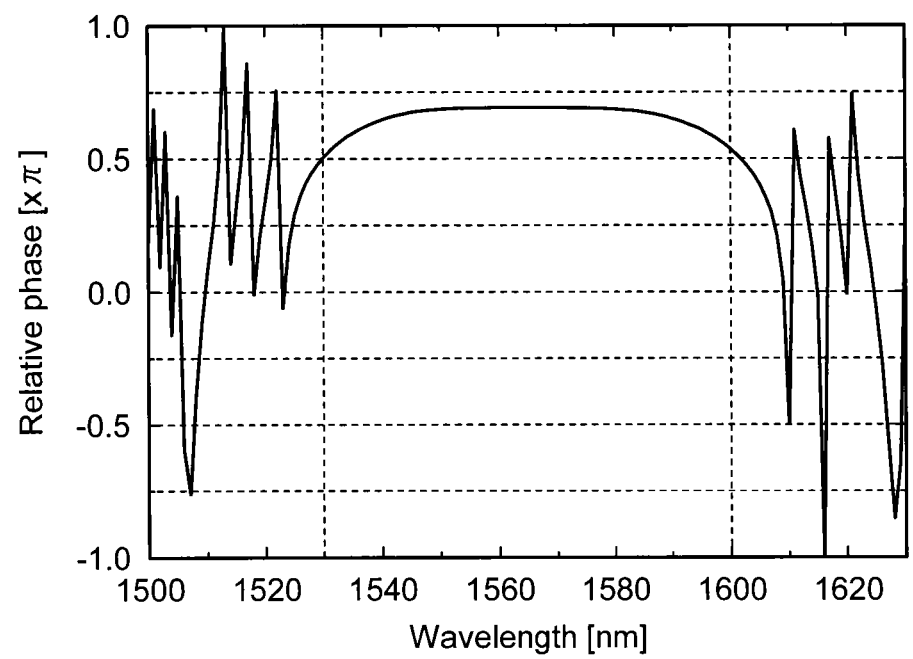
FIG. 30B is a relative phase spectrum of outputted signal light when dispersion slope is 0.05 [ps/nm$^2$/km]

FIGS. 30A and 30B are relative phase spectrum of output signal light when dispersion slope is 0.02 [ps/nm²/km], and relative phase spectrum of output signal light when dispersion slope is 0.05 [ps/nm²/km] respectively. Both relative phases have the same value of 0.69π at a wavelength of 1565 nm. However, it is found that a wavelength range having a flat relative phase spectrum becomes narrow if dispersion slope increases. This corresponds to that a wavelength range of flat optical power spectrum of FIG. 29 becomes narrow.

Figure 31A:
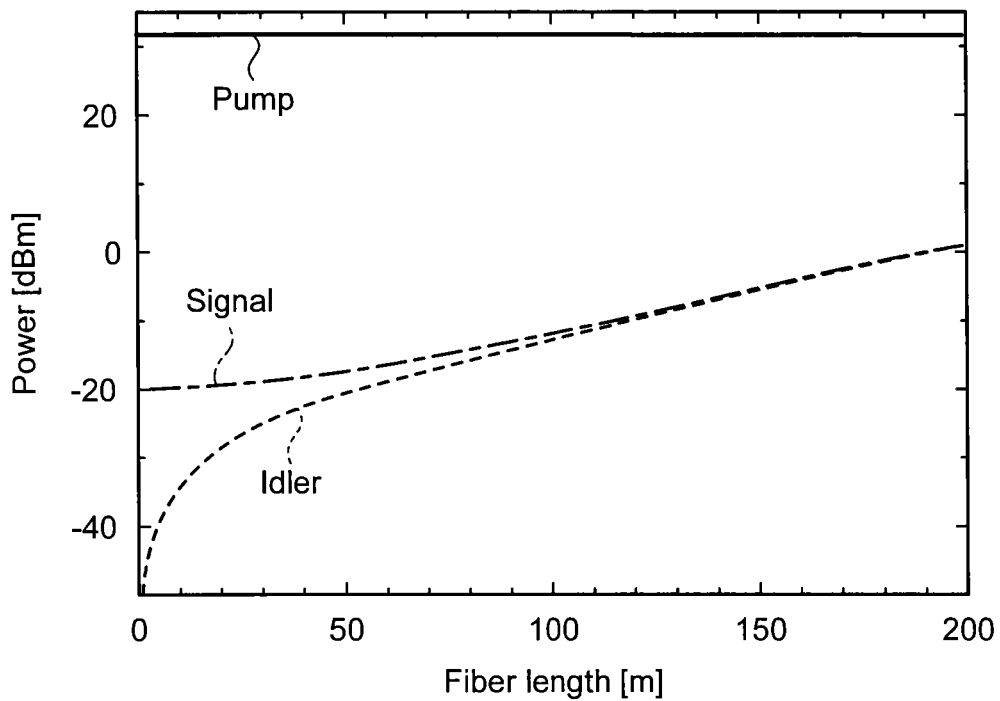
FIG. 31A is an optical power fluctuation waveform chart when dispersion slope is 0.02 [ps/nm$^2$/km]
Figure 31B:
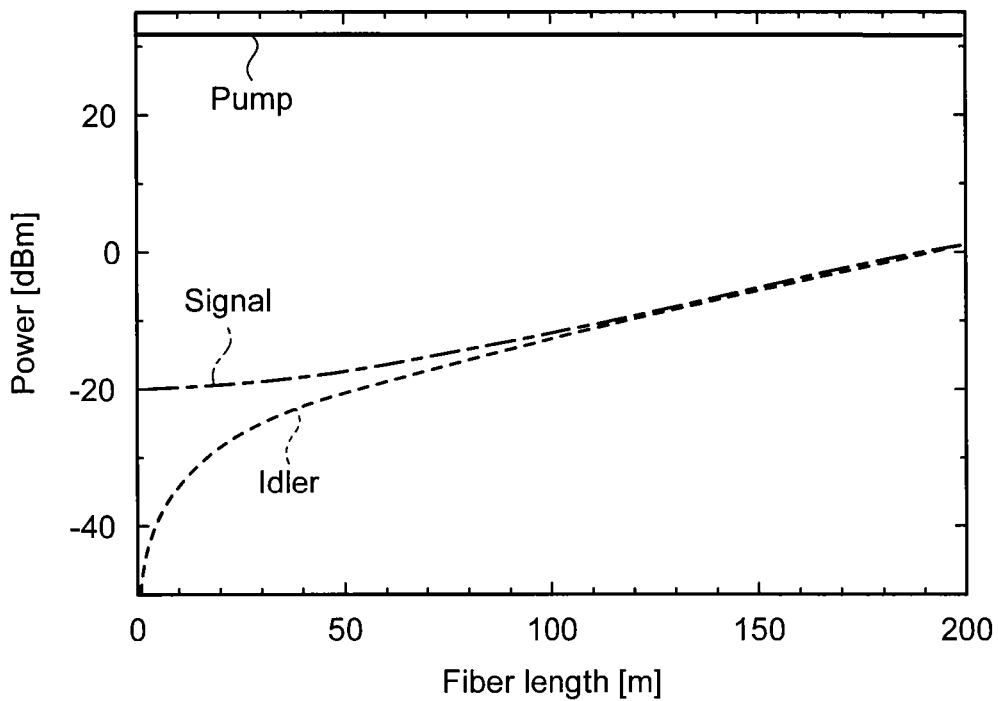
FIG. 31B is an optical power fluctuation waveform chart when dispersion slope is 0.05 [ps/nm$^2$/km]

FIGS. 31A and 31B are change in optical power in the lengthwise direction when dispersion slope is 0.02 [ps/nm²/km], and change in optical power in the lengthwise direction when dispersion slope is 0.05 [ps/nm²/km] respectively. Herein wavelength λs of signal light was set at 1560 nm. It is found that, output power of signal light is 0.89 [dBm] when dispersion slope is 0.02 [ps/nm²/km] and output power of signal light is 0.92 [dBm] when dispersion slope is 0.05 [ps/nm²/km], and thus, both values are almost the same. It is found that, within a wavelength range having flat spectrum, difference of dispersion slope exerts very little influence on gain of signal light.

Figure 32A:
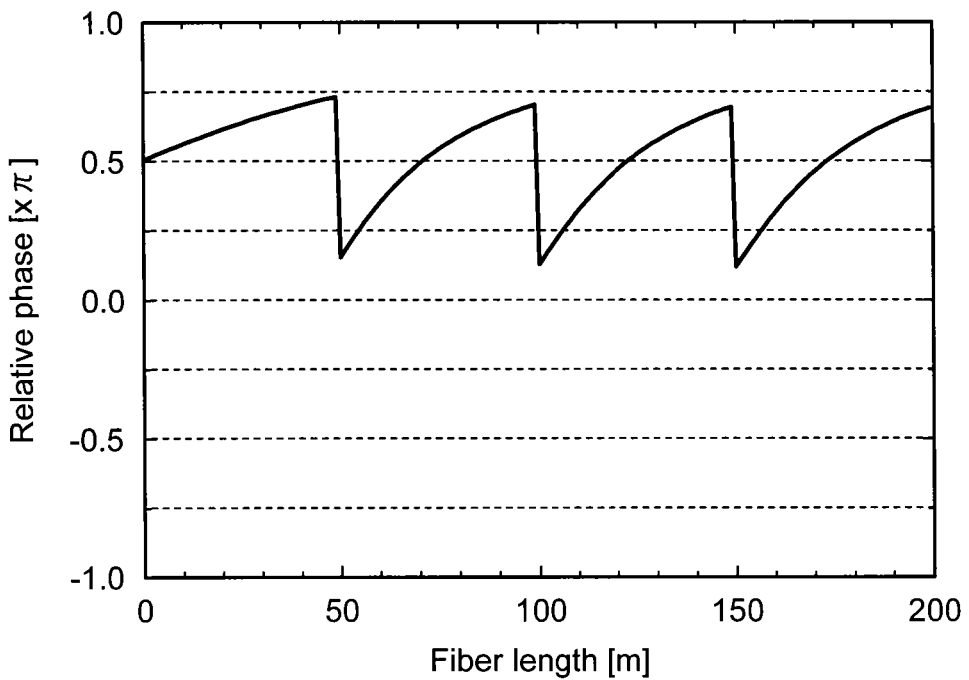
FIG. 32A is a fluctuation waveform chart of relative phase of signal light when dispersion slope is 0.02 [ps/nm$^2$/km]
Figure 32B:
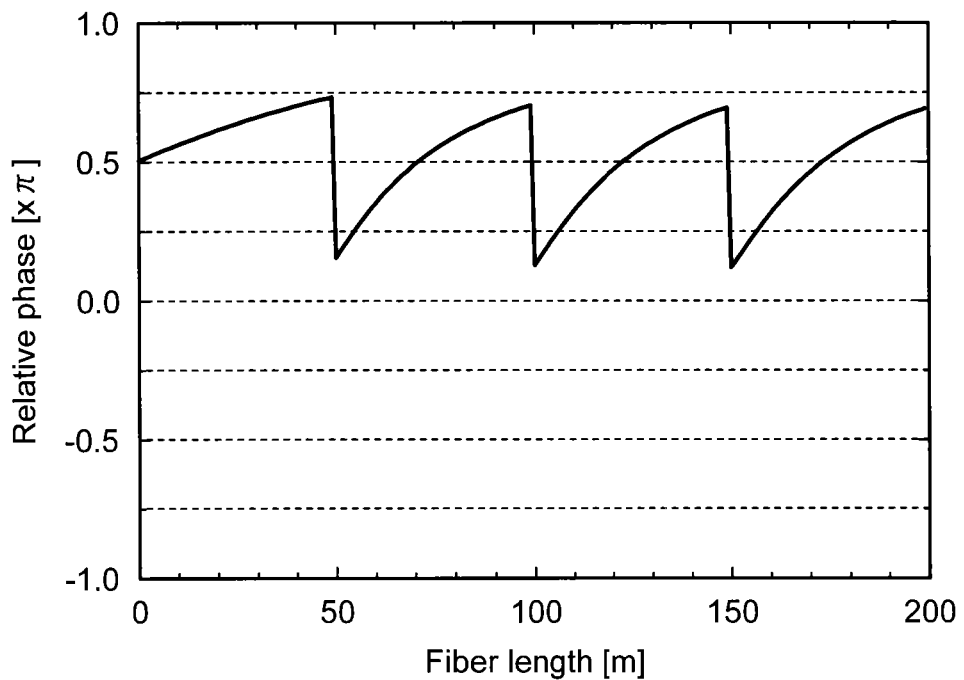
FIG. 32B is a fluctuation waveform chart of relative phase of signal light when dispersion slope is 0.05 [ps/nm$^2$/km]

FIGS. 32A and 32B are change in relative phase of signal light in the lengthwise direction when dispersion slope is 0.02 [ps/nm²/km], and change in relative phase of signal light in the lengthwise direction when dispersion slope is 0.05 [ps/nm²/km] respectively. Herein wavelength λs of signal light was set at 1560 nm. It is found that changes in relative phase coincide substantially.

As explained above, primary influence of dispersion slope is given to a wavelength range in which optical power of signal light is flat. Since a wavelength range which can obtain flat gain characteristics is wider when dispersion slope is smaller, it is desirable that dispersion slope is as small as possible at zero-dispersion wavelength of an optical gain fiber. For example, an optical gain fiber of which absolute value of dispersion slope at zero-dispersion wavelength is smaller than 0.05 [ps/nm²/km] is effective for broadening flat gain characteristics.

Figure 33A:
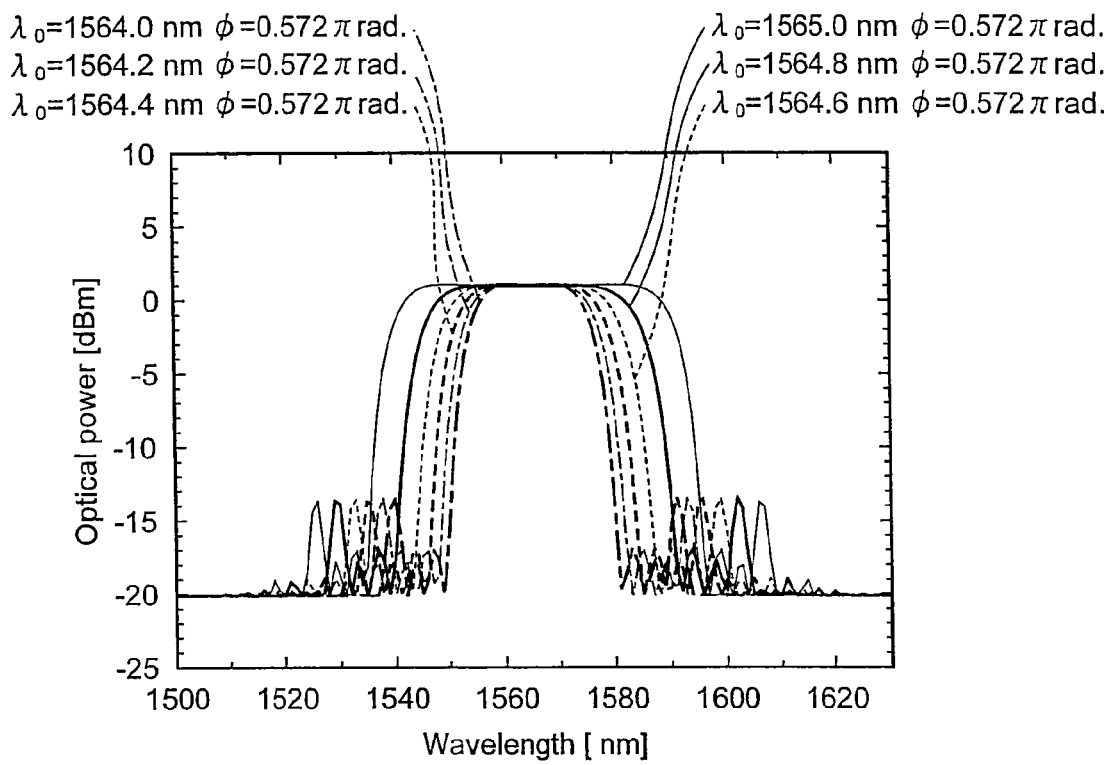
FIG. 33A is an outputted signal spectrum in case of varying zero-dispersion wavelength of an optical gain fiber in a range within 1564.0 to 1565.0 nm.
Figure 33B:
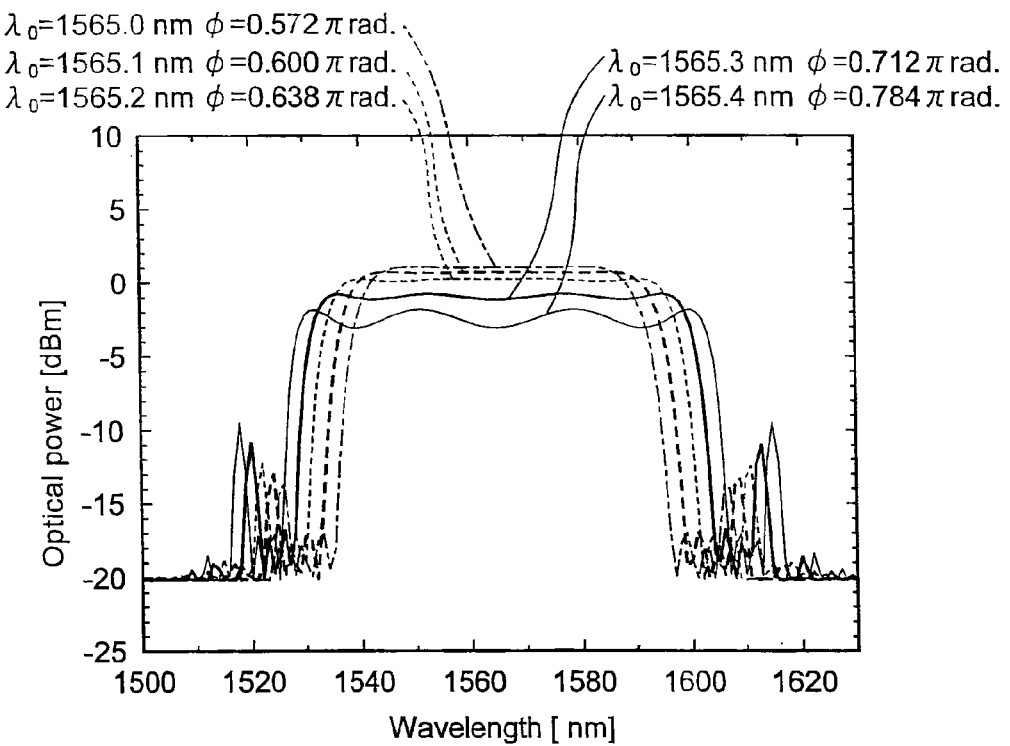
FIG. 33B is an outputted signal spectrum in case of varying zero-dispersion wavelength of an optical gain fiber in a range within 1565.0 to 1565.4 nm.
Figure 34A:
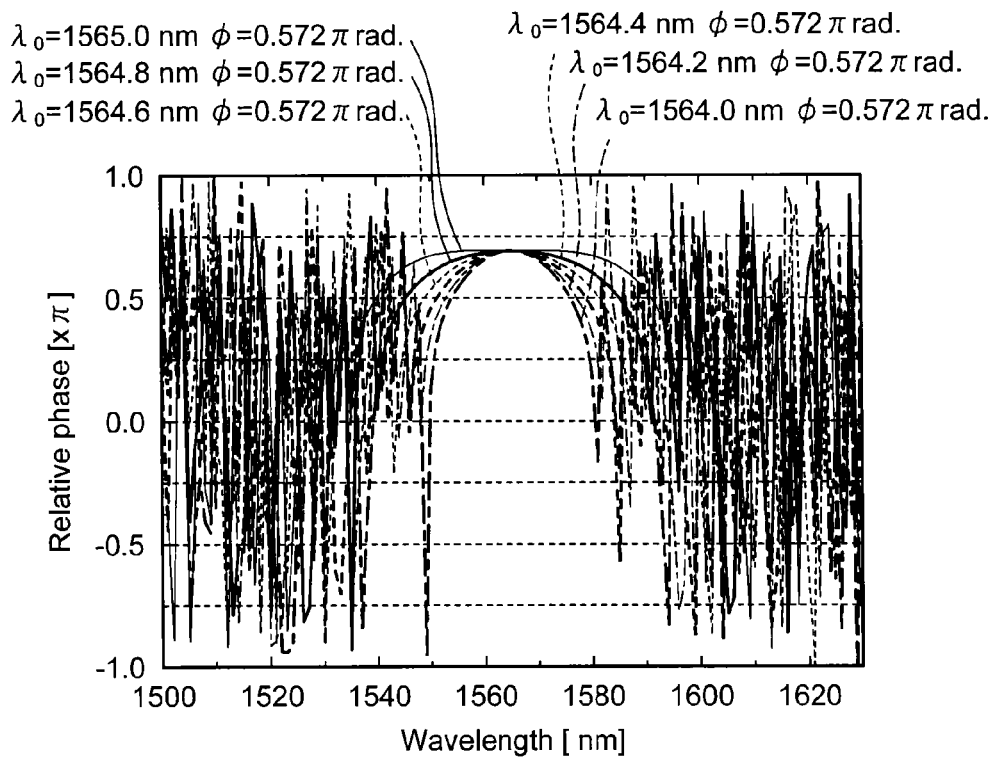
FIG. 34A is a relative phase spectrum in case of varying zero-dispersion wavelength of an optical gain fiber in a range within 1564.0 to 1565.0 nm.
Figure 34B:
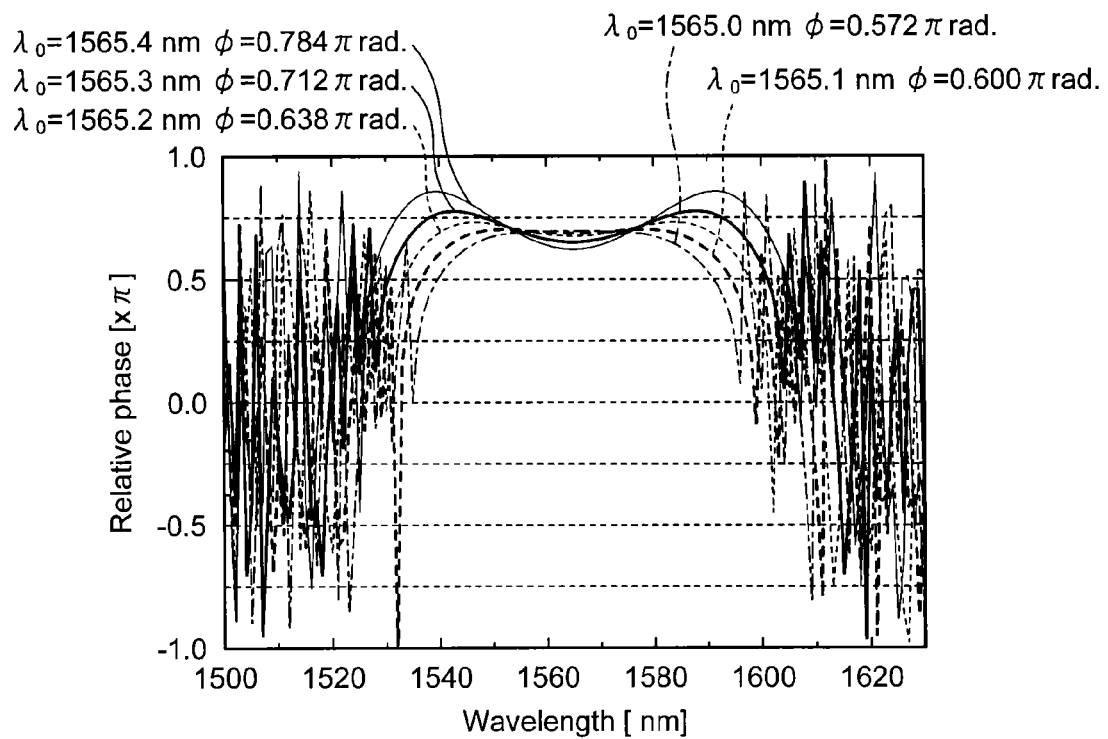
FIG. 34B is a relative phase spectrum in case of varying zero-dispersion wavelength of an optical gain fiber a range within 1565.0 to 1565.4 nm.

Up until here, the case in which zero-dispersion wavelength of an optical gain fiber and a pump light wavelength coincide was argued. FIGS. 33A and 33B are output signal spectra in cases in which zero-dispersion wavelength of an optical gain fiber is changed within a range of 1564.0 nm to 1565.0 nm and within a range of 1565.0 nm to 1565.5 nm respectively. Although it is approximately 1 nm at maximum, in accordance with zero-dispersion wavelength shifted to shorter wave side relative to pumping wavelength (1565 nm), a wavelength range in which output power spectrum of signal light is flat becomes narrow (FIG. 33A). On the other hand, although it is approximately 1 nm at maximum, in accordance with zero-dispersion wavelength shifted to longer wave side relative to pumping wavelength, a wavelength range in which output power spectrum of signal light is flat becomes wide, and simultaneously, flatness is deteriorated (FIG. 33B). FIGS. 34A and 34B are relative phase spectra corresponding to FIGS. 33A and 33B. It is found that deterioration of wavelength band and flatness of signal light power spectrum is correlated with band and shift at which relative phase spectrum is 0.5π. That is, it is important to coincide zero dispersion of an optical gain fiber with wavelength of pump light to obtain a spectrum in a wide band while maintaining superior state of flatness of output power spectrum of signal light.

We consider possibility that dispersion characteristics of a fiber fluctuate due to environmental temperature etc. In case where amplification band width is more important than flatness as a function of an optical amplifier, it is desirable to set zero-dispersion wavelength of a fiber at shorter wave side relative to pump light wavelength. On the contrary, in case where flatness is more important than amplification band width as a function of an optical amplifier, it is desirable to set zero-dispersion wavelength of a fiber at longer wave side relative to pump light wavelength.

Up until here, argument was made in which 4th dispersion value of an optical gain fiber is zero. Next, simulation result is shown in case where 4th dispersion of an optical gain fiber (wavelength differentiation of dispersion slope) is considered. Condition of simulation is shown in FIG. 35. Relative phase shifters are disposed at an interval of 50 meters, and its relative phase shift value is 0.52π.

Figure 36A:
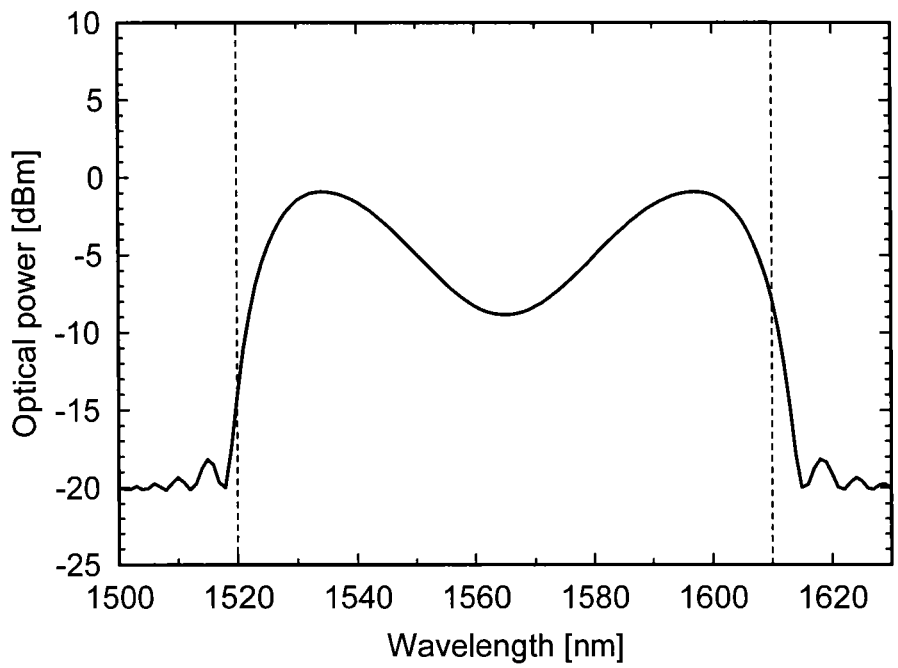
FIG. 36A is a spectrum of outputted signal light power in case where there is not a relative phase shifter.
Figure 36B:
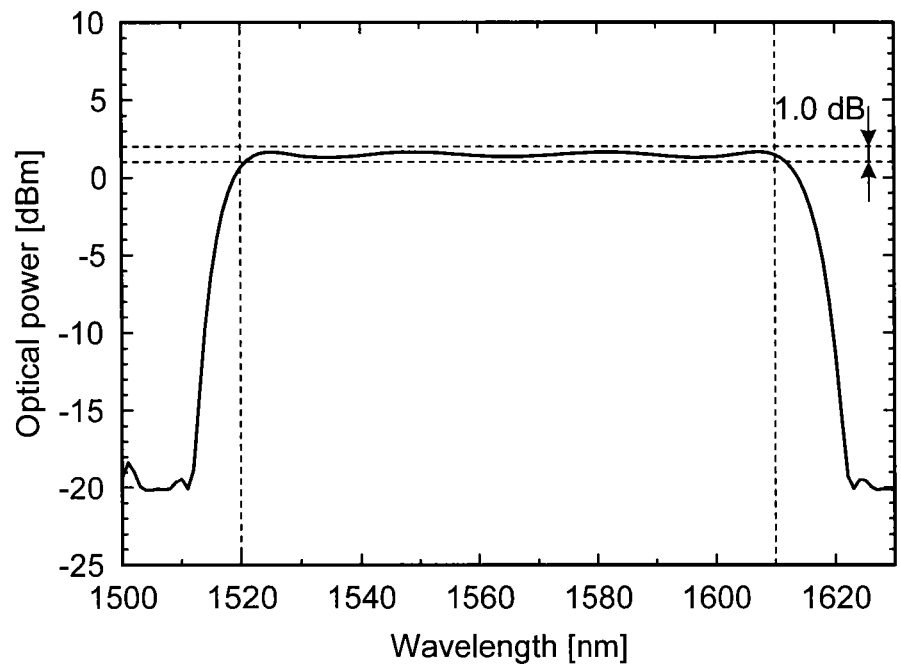
FIG. 36B is a spectrum of outputted signal light power in case where there is a relative phase shifter.

FIGS. 36A and 36B are spectra of signal light power when there is not a relative phase shifter, and when there is a relative phase shifter respectively. It is found that, when there is not a relative phase shifter, power around pump light wavelength is low, and power at wavelength which is distant from pump light wavelength by approximately 30 nm is high. On the other hand, it is found that, when there is a relative phase shifter, signal light power shows 1.3 dB of flatness within a range of wavelengths 1520 nm to 1610 nm. From this result, it can be reconfirmed that a relative phase shifter is effective for obtaining flatness of gain of signal light power.

Figure 37A:
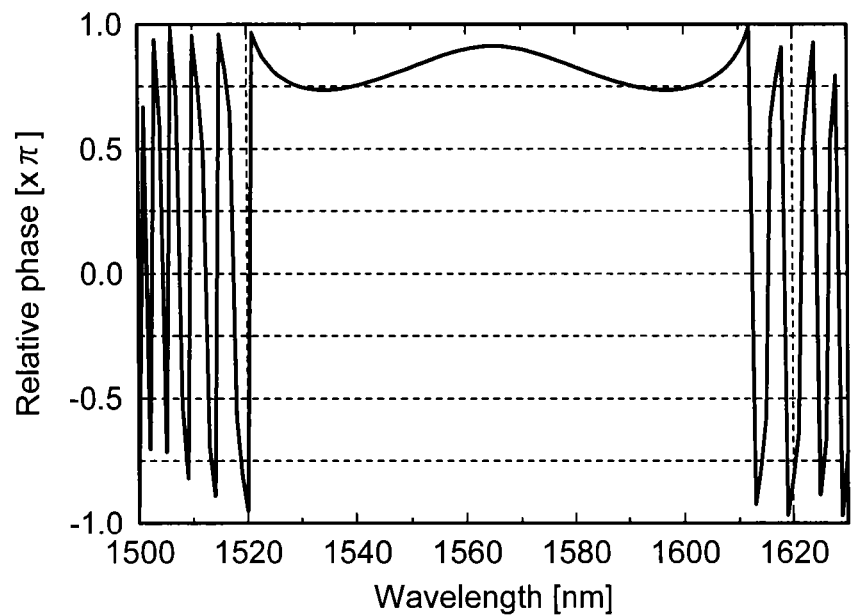
FIG. 37A is a relative phase spectrum of outputted signal light in case where there is not a relative phase shifter.
Figure 37B:
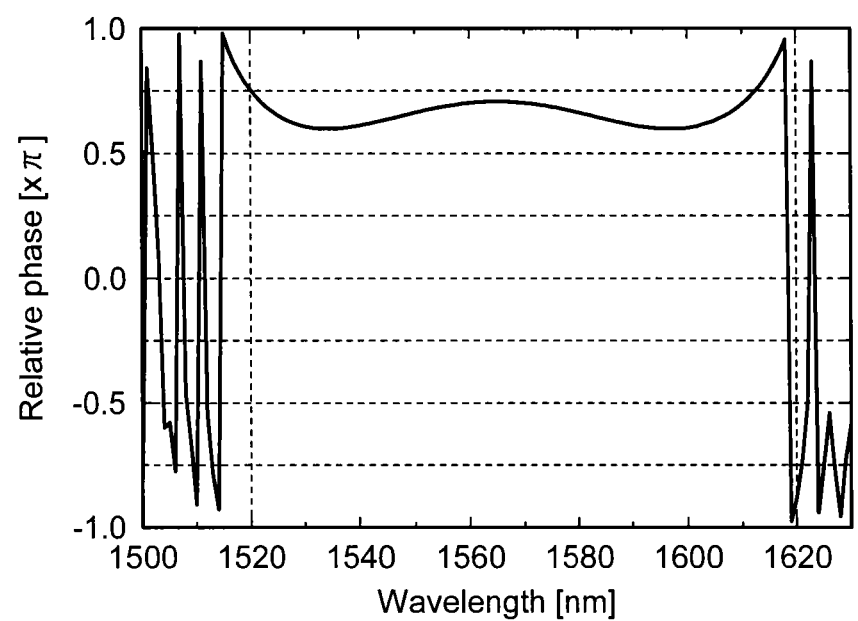
FIG. 37B is a relative phase spectrum of outputted signal light in case where there is a relative phase shifter.

FIGS. 37A and 37B show relative phases of signal light in fiber output when there is not a relative phase shifter and when there is a relative phase shifter respectively. It is found that, when there is not a relative phase shifter, relative phase is equal to or greater than 0.75π within a range of wavelengths 1520 nm to 1610 nm, and the relative phase fluctuates to a significant degree based on wavelength. On the other hand, it is found that, when there is a relative phase shifter, relative phase exists within a narrow range of width 0.11π i.e. from 0.59π to 0.70π, and dependence on wavelength is small.

Figure 38A:
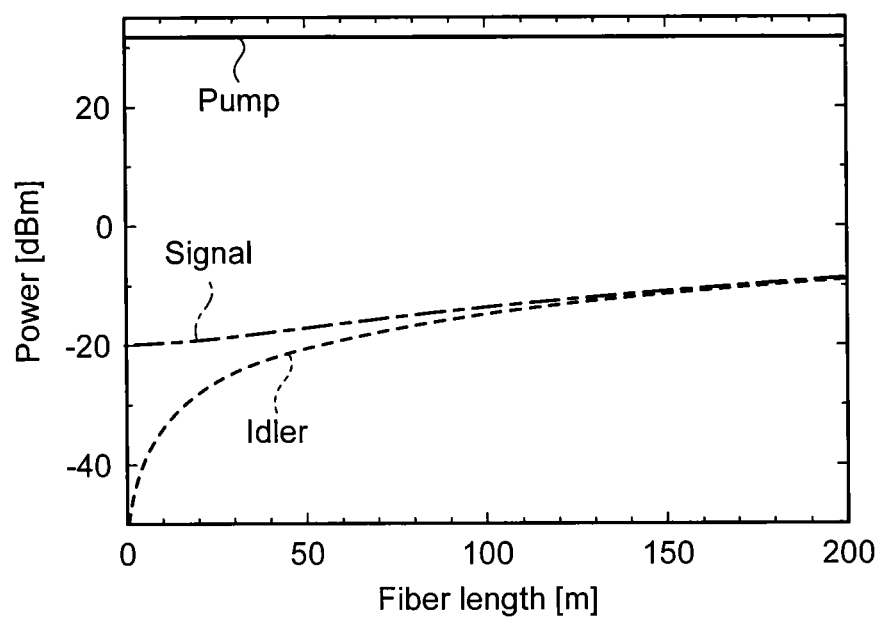
FIG. 38A is an optical power fluctuation waveform chart in case where there is not a relative phase shifter.
Figure 38B:
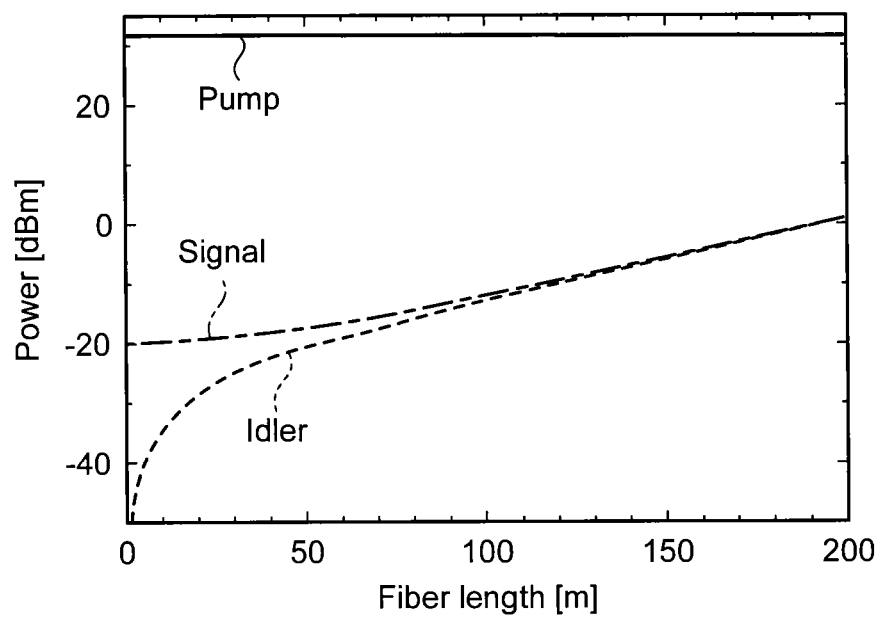
FIG. 38B is an optical power fluctuation waveform chart in case where there is a relative phase shifter.

FIGS. 38A and 38B show change in each signal power in the lengthwise direction of a fiber when there is not a relative phase shifter and when there is a relative phase shifter respectively. Herein wavelength λs of signal light was set at 1560 nm. Power of signal light in fiber output is −8.6 dBm when there is not a relative phase shifter, and in contrast, it is 1.3 dBm when there is a relative phase shifter, and there is a difference of approximately 9.9 dB. It is also found, from this, that the relative phase shifter contributes to increasing gain ratios of signal light and idler light.

Figure 39A:
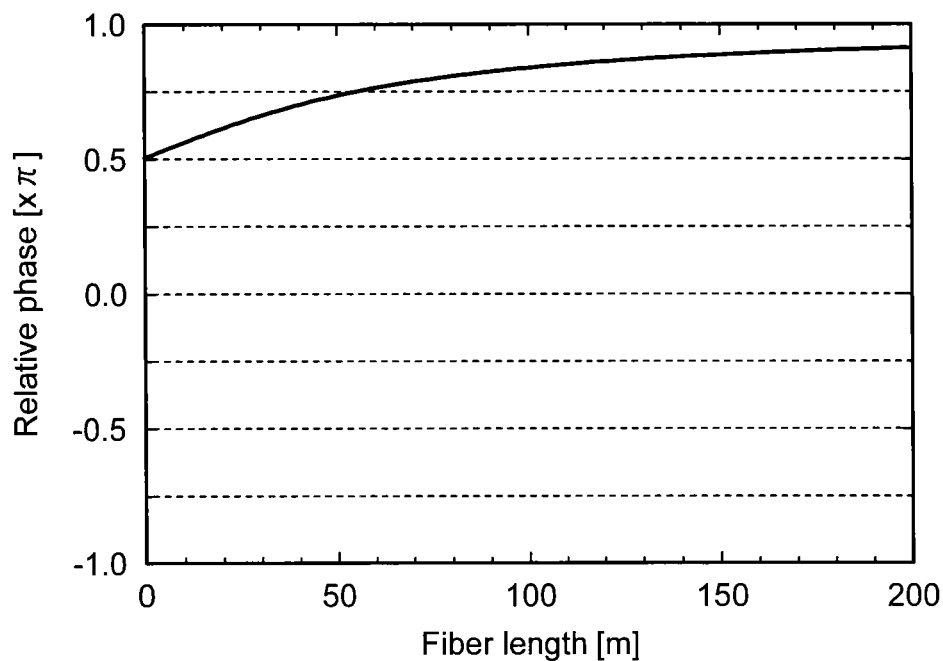
FIG. 39A is a fluctuation waveform chart of relative phase of signal light in case where there is not a relative phase shifter.
Figure 39B:
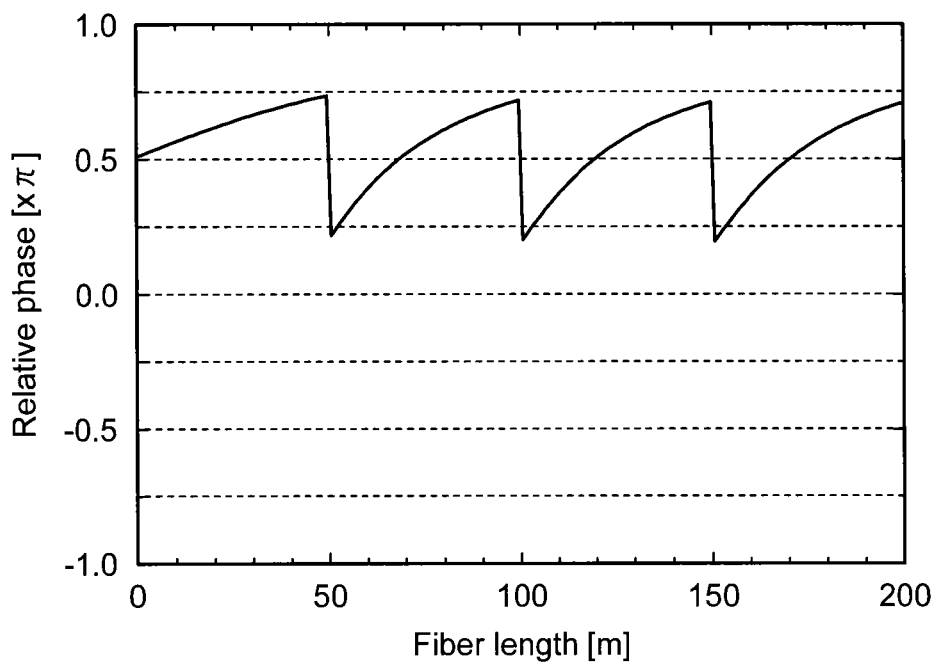
FIG. 39B is a fluctuation waveform chart of relative phase of signal light in case where there is a relative phase shifter.

FIGS. 39A and 39B show change in relative phase in the lengthwise direction of a fiber when there is not a relative phase shifter and when there is a relative phase shifter, respectively. Herein wavelength λs of signal light was set at 1560 nm. When there is a relative phase shifter, although the relative phase, after beginning with π/2, increases gradually, and is shifted to approximately 0.25π by the relative phase shifter when reaching at approximately 0.75π. The relative phase increases gradually from that point and repeats periodically to be shifted to approximately 0.25π by the relative phase shifter when reaching approximately 0.75π again. A fact that the relative phase vibrates with respect to the relative phase π/2 as a center at which power gain is high comes to a difference of gain in FIG. 38B. This is, the signal light is considered to propagate under dynamically phase matched condition. Phase matching condition is relaxed by inserting a relative phase shifter, and pseudo-phase matching is obtained. As a result, gain of signal light is flattened.

Effect of relative phase shifter will be confirmed especially. Each dependence of gain of signal light and power of idler light to be generated on wavelength has been studied in case where there is a relative phase shifter and in case where there is not a relative phase shifter. Wavelength of pump light was calculated based on three wavelengths at 1) zero-dispersion wavelength, 2) wavelength of zero-dispersion wavelength +1 [nm], and 3) wavelength of zero-dispersion wavelength −1 [nm]. Power of pump light was calculated based on five kinds of power, i.e., 100, 500, 1000, 1500, and 2000 [mW]. Input power of signal light is −20 [dBm] (0.01 [mW]). Fiber length of an optical gain fiber is 200 [m], dispersion slope is 0.02 [ps/nm$^2$/km], 4th dispersion is −0.0002 [ps/nm$^3$/km], nonlinear constant is 12 [1/W/km], and transmission loss is 0.8 [dB/km]. Relative phase shifters were inserted into an optical fiber at a period of 50 meter. Relative phase shift value was set at a shift value at which gain characteristics of signal light in each condition become the flattest (so that $\Delta$ becomes the smallest where $\Delta$ is difference between maximum signal light power and minimum signal light power within wavelength band of signal) and the broadest in band.

Figure 40A:
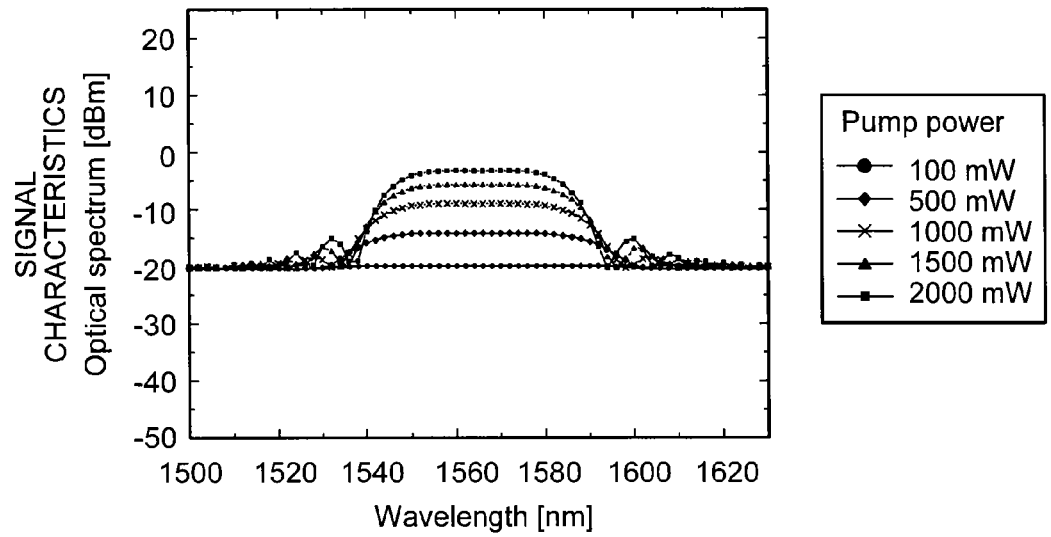
FIG. 40A is a result of calculating a spectrum of light outputted from an optical gain fiber when pump wavelength coincides with zero-dispersion wavelength of the optical gain fiber, and is a spectrum of signal light in case of not using a relative phase shifter.
Figure 40B:
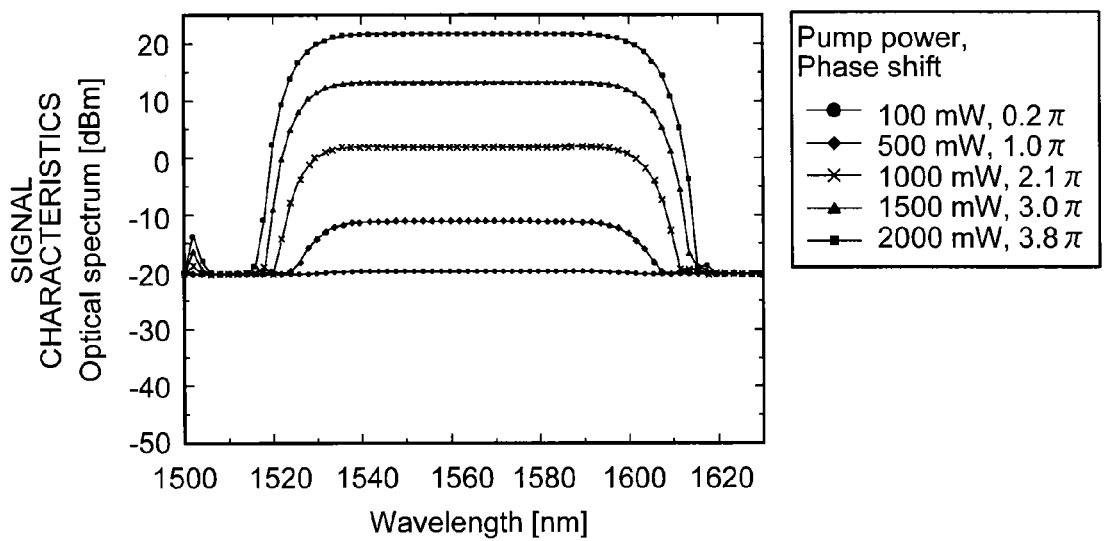
FIG. 40B is a result of calculating a spectrum of light outputted from an optical gain fiber when pump wavelength coincides with the zero-dispersion wavelength of the optical gain fiber, and is a spectrum of signal light in case of using a relative phase shifter.
Figure 40C:
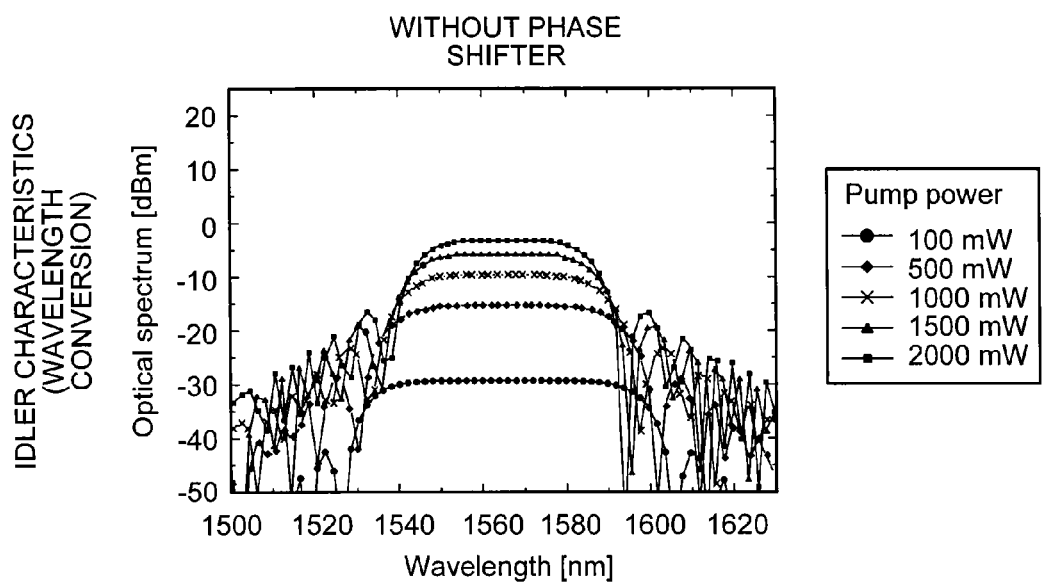
FIG. 40C is a result of calculating a spectrum of light outputted from an optical gain fiber when pump wavelength coincides with the zero-dispersion wavelength of the optical gain fiber, and is a spectrum of idler light in case of not using a relative phase shifter.
Figure 40D:
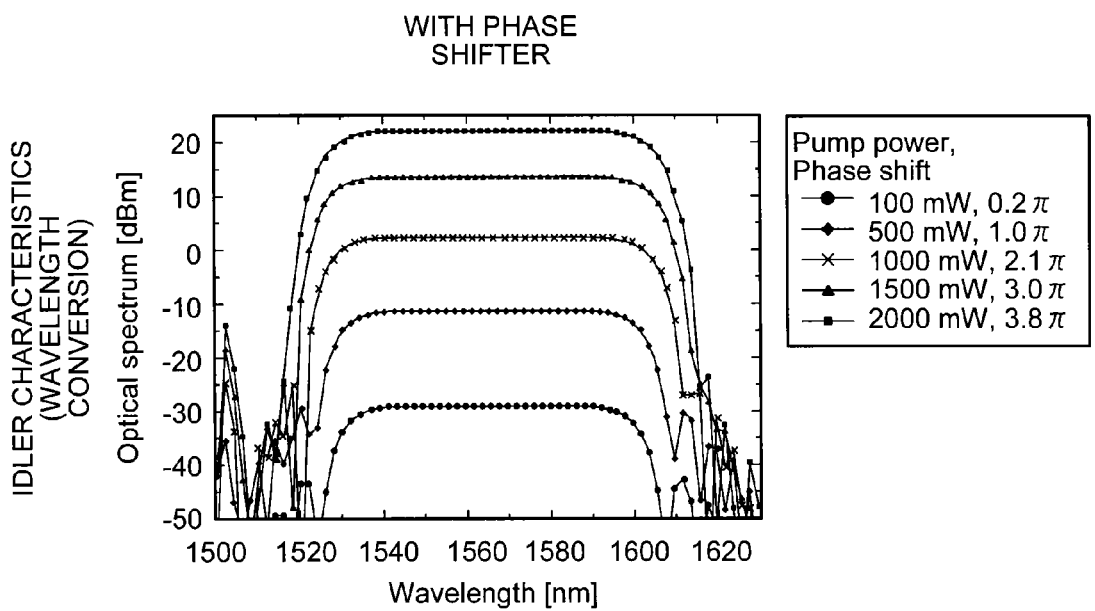
FIG. 40D is a result of calculating a spectrum of light outputted from an optical gain fiber when pump wavelength coincides with the zero-dispersion wavelength of the optical gain fiber, and is a spectrum of idler light in case of using a relative phase shifter.

FIGS. 40A to 40D are results of calculating spectra of output light from an optical gain fiber when pumping wavelength coincides with zero-dispersion wavelength of an optical gain fiber. FIG. 40A is a signal light output power spectrum when there is not a relative phase shifter, FIG. 40B is a signal light output power spectrum when there is a relative phase shifter, FIG. 40C is an idler light output power spectrum when there is not a relative phase shifter, and FIG. 40D is an idler light output power spectrum when there is a relative phase shifter. Phase-shift value of a relative phase shifter was set at a shift value at which a waveform of signal light maintains flatness within 0.5 dB of power fluctuation and a flat band becomes the maximum.

When the wavelength of pump light coincides with zero-dispersion wavelength, both gain waveform and idler waveform have high flatness even if there is not a relative phase shifter. However, it is found that, in case where there is a relative phase shifter, as compared with waveform having identical power of pump light, both band and gain of flat waveform enlarge. That is, insertion of relative phase shifter has an effect of enhancing both gain characteristics and wavelength conversion efficiency.

Figure 41A:
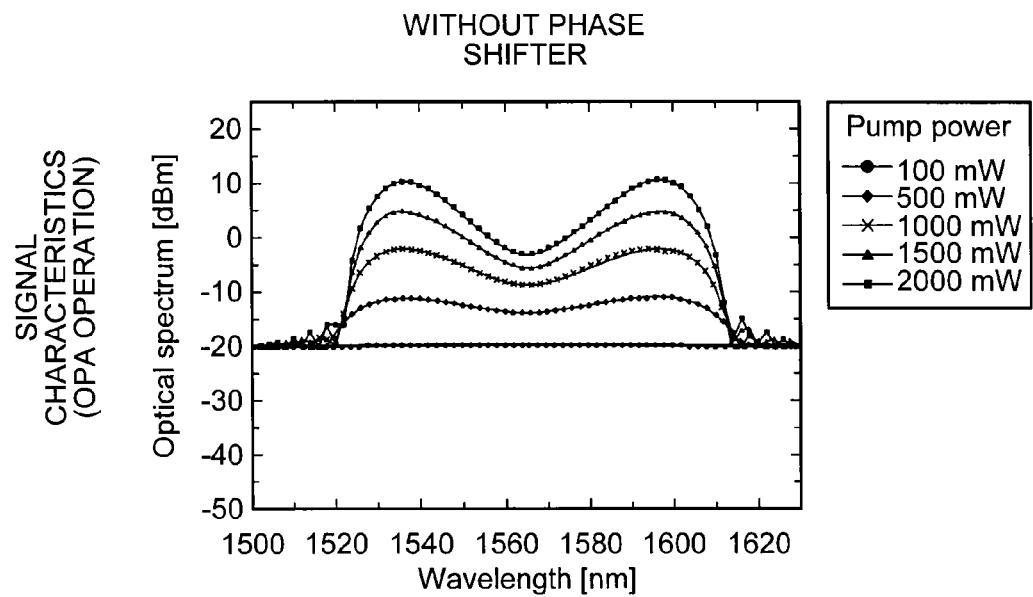
FIG. 41A is a result of calculating a spectrum of light outputted from an optical gain fiber when pump wavelength is set at a longer wavelength side by 1 [nm] with respect to zero-dispersion wavelength, and is a spectrum of signal light in case of not using a relative phase shifter.
Figure 41B:
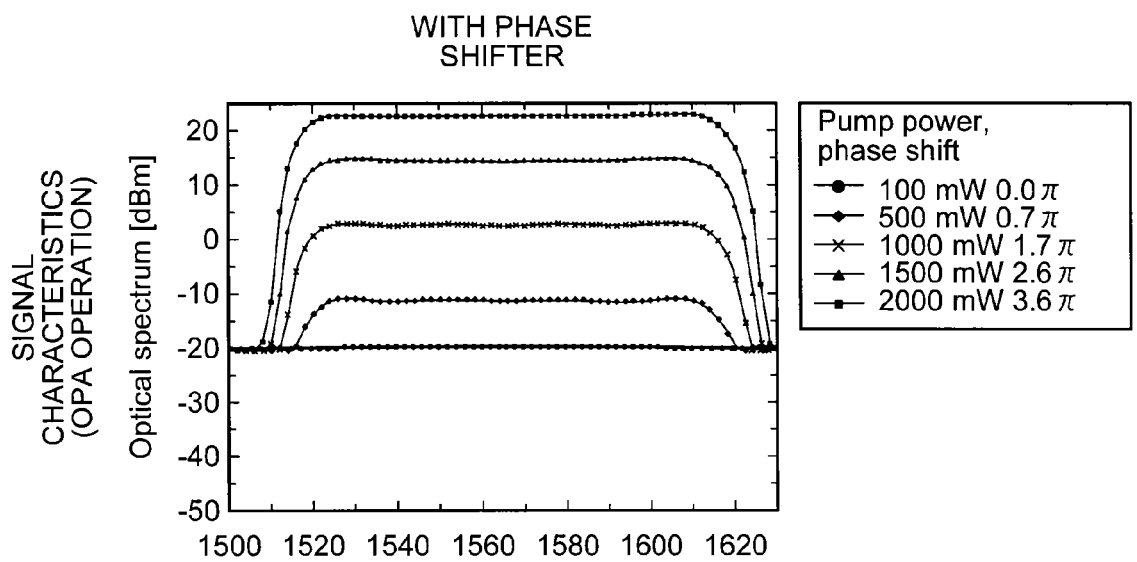
FIG. 41B is a result of calculating a spectrum of light outputted from an optical gain fiber when pump wavelength is set at a longer wavelength side by 1 [nm] with respect to zero-dispersion wavelength, and is a spectrum of signal light in case of using a relative phase shifter.
Figure 41C:
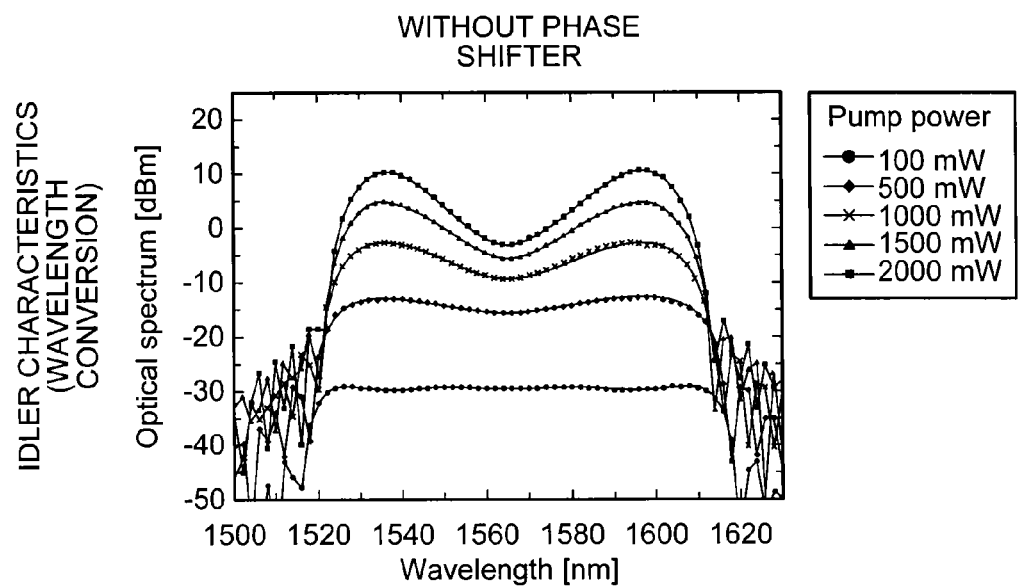
FIG. 41C is a result of calculating a spectrum of light outputted from an optical gain fiber when pump wavelength is set at a longer wavelength side by 1 [nm] with respect to zero-dispersion wavelength, and is a spectrum of idler light in case of not using a relative phase shifter.
Figure 41D:
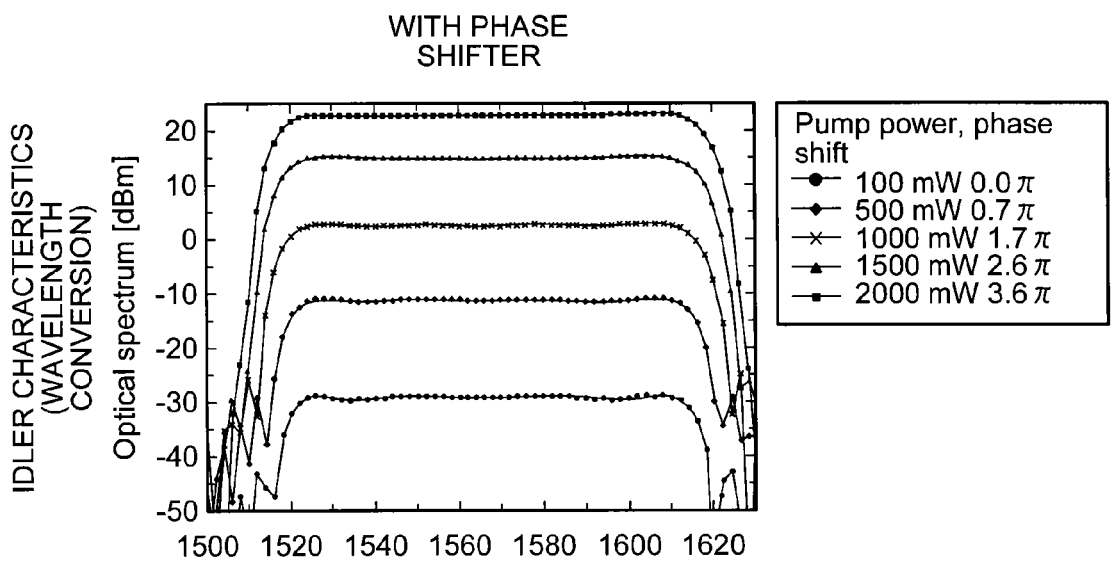
FIG. 41D is a result of calculating a spectrum of light outputted from an optical gain fiber when pump wavelength is set at a longer wavelength side by 1 [nm] with respect to zero-dispersion wavelength, and is a spectrum of idler light in case of using a relative phase shifter.

FIGS. 41A to 41D are results of calculating spectra of output light of an optical gain fiber when pumping wavelength is set at longer wavelength side by 1 [nm] relative to zero-dispersion wavelength of an optical gain fiber. FIG. 41A is a signal light output power spectrum when there is not a relative phase shifter, FIG. 41B is a signal light output power spectrum when there is a relative phase shifter, FIG. 41C is an idler light output power spectrum when there is not a relative phase shifter, and FIG. 41D is an idler light output power spectrum when there is a relative phase shifter. Phase-shift value of a relative phase shifter was set at a shift value at which a waveform of signal light maintains flatness within 0.5 dB of power fluctuation and a flat band becomes the maximum.

In case where there is not a relative phase shifter, signal waveform and idler waveform become waveforms in which flatness is lost and a peak exists on both sides of pumping wavelength. On the other hand, in case where there is a relative phase shifter, signal waveform and idler waveform have flatness within 0.5 dB of power fluctuation. In addition, gain characteristics and wavelength conversion efficiency enhance together.

Figure 42A:
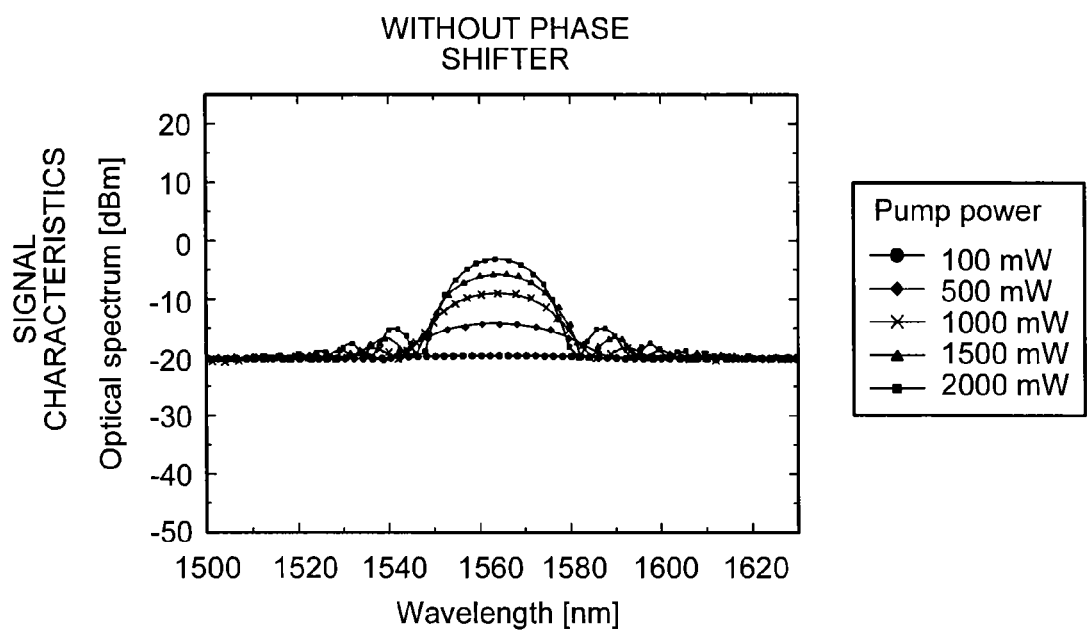
FIG. 42A is a result of calculating a spectrum of light outputted from an optical gain fiber when pump wavelength is set at a shorter wavelength side by 1 [nm] with respect to zero-dispersion wavelength, and is a spectrum of signal light in case of not using a relative phase shifter.
Figure 42B:
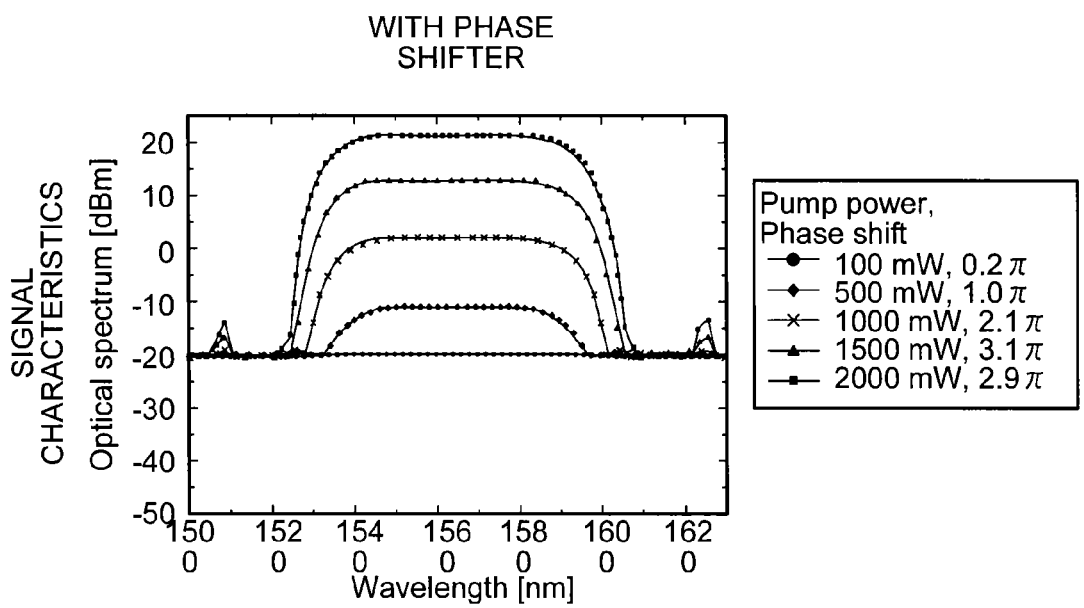
FIG. 42B is a result of calculating a spectrum of light outputted from an optical gain fiber when pump wavelength is set at a shorter wavelength side by 1 [nm] with respect to zero-dispersion wavelength, and is a spectrum of signal light in case of using a relative phase shifter.
Figure 42C:
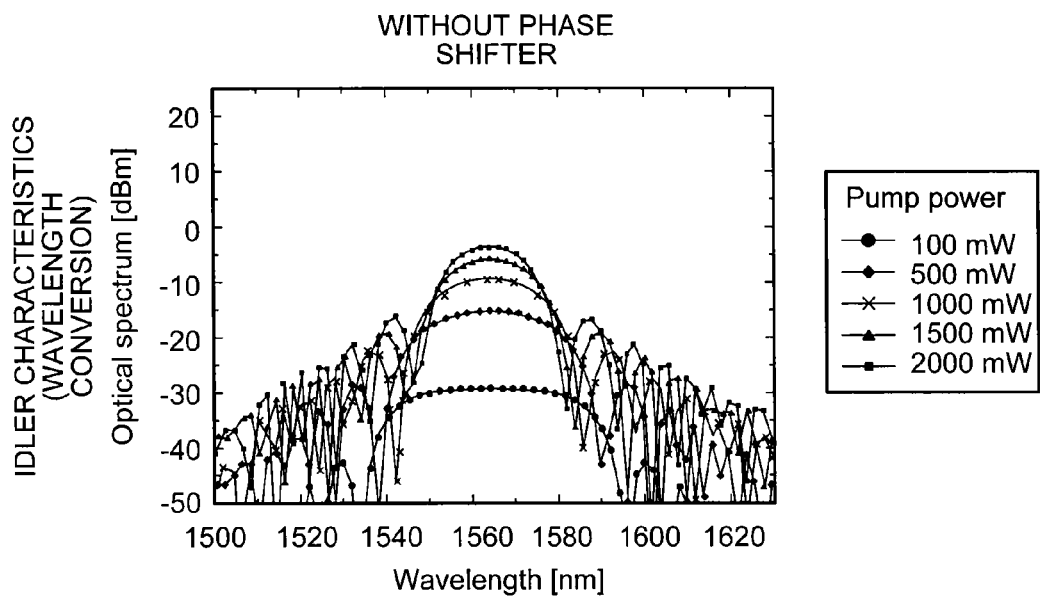
FIG. 42C is a result of calculating a spectrum of light outputted from an optical gain fiber when pump wavelength is set at a shorter wavelength side by 1 [nm] with respect to zero-dispersion wavelength, and is a spectrum of idler light in case of not using a relative phase shifter.
Figure 42D:
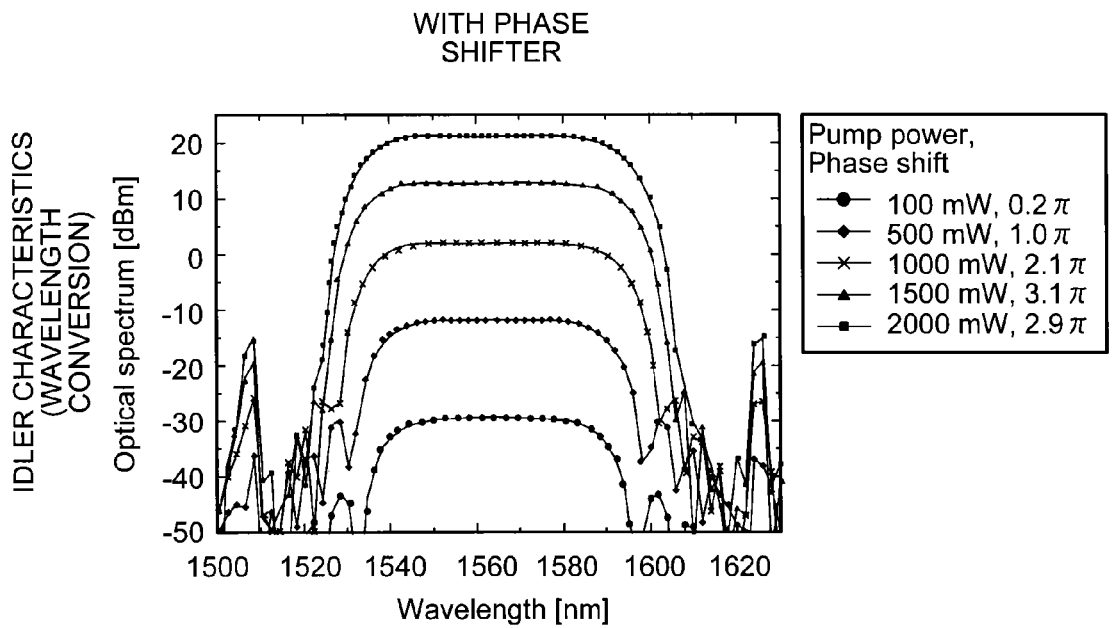
FIG. 42D is a result of calculating a spectrum of light outputted from an optical gain fiber when pump wavelength is set at a shorter wavelength side by 1 [nm] with respect to zero-dispersion wavelength, and is a spectrum of idler light in case of using a relative phase shifter.

FIGS. 42A to 42D are results of calculating spectra of output light of an optical gain fiber when pumping wavelength is set at shorter wavelength side by 1 [nm] relative to zero-dispersion wavelength of an optical gain fiber. As compared with the case where pumping wavelength coincides with zero-dispersion wavelength of an optical gain fiber, flatness of waveform, band, gain, and wavelength conversion efficiency become smaller. It should be noted that, FIG. 42A is a signal light output power spectrum when there is not a relative phase shifter, FIG. 42B is a signal light output power spectrum when there is a relative phase shifter, FIG. 42C is an idler light output power spectrum when there is not a relative phase shifter, and FIG. 42D is an idler light output power spectrum when there is a relative phase shifter. Phase-shift value of a relative phase shifter was set at a shift value at which a waveform of signal light maintains flatness within 0.5 dB of power fluctuation and a flat band becomes the maximum.

In case where there is a relative phase shifter, gain characteristics of signal light, and wavelength conversion efficiency of idler light enhance together with a band having flat characteristics.

Figure 43A:
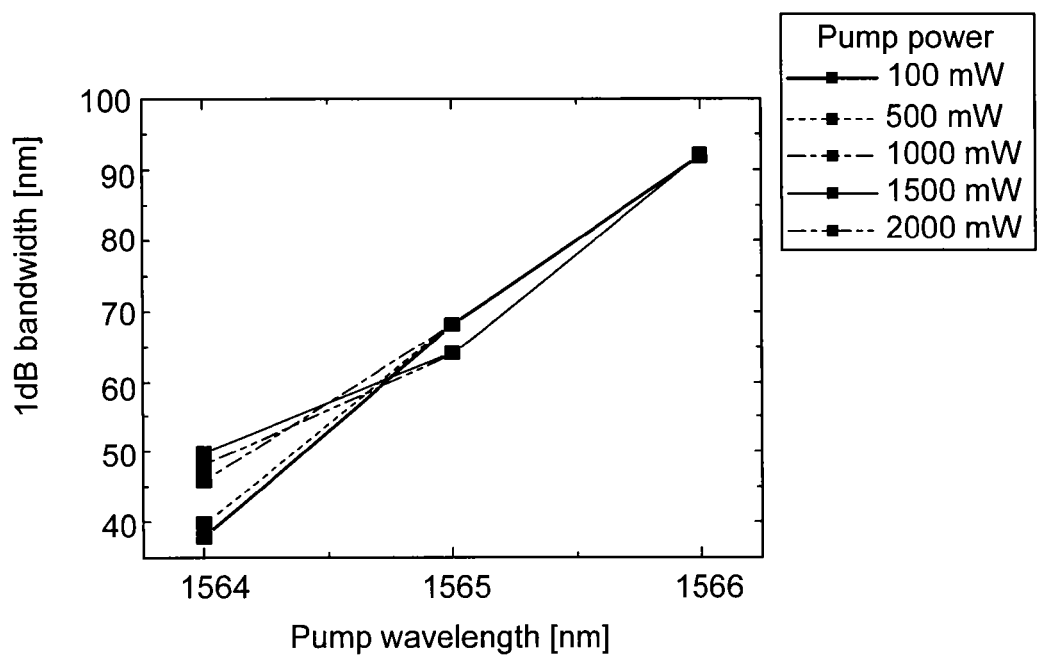
FIG. 43A is a view showing dependence of a 1 dB amplification band (1 dB wavelength conversion band) on pump wavelength.
Figure 43B:
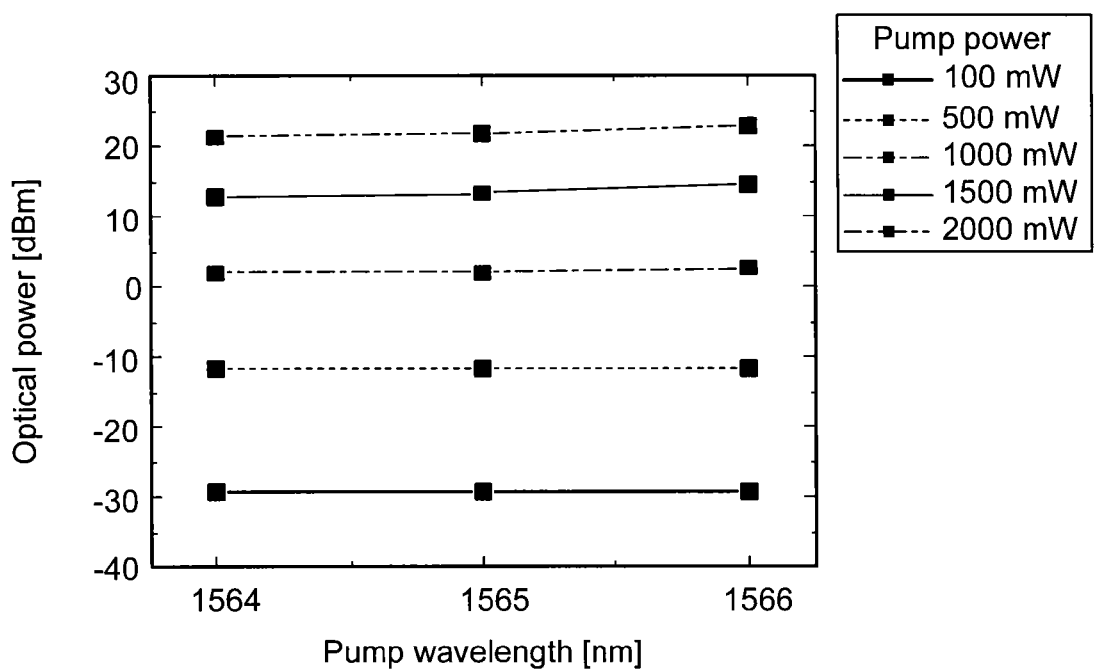
FIG. 43B is a view showing dependence of output power of signal light (idler light) on pump wavelength in a wavelength range in which gain (wavelength conversion efficiency) is flat.

It was found that, in FIGS. 40 to 42, as long as there is a relative phase shifter, flat wavelength characteristics can be obtained regardless to setting for pumping wavelength. Then, we studied how band and power of flat wavelength characteristics act according to wavelength of pump light (FIGS. 43A and 43B). FIG. 43A shows dependence of 1 dB band width of idler light on pumping wavelength, and FIG. 41B shows dependence of power of wavelength region in which idler light has flat characteristics on pumping wavelength. Herein, when power of idler light is greater than −20 [dBm] which is input power of signal light, since power of signal light coincides with power of idler light, signal light exhibits the same action as that of idler light.

Figure 44A:
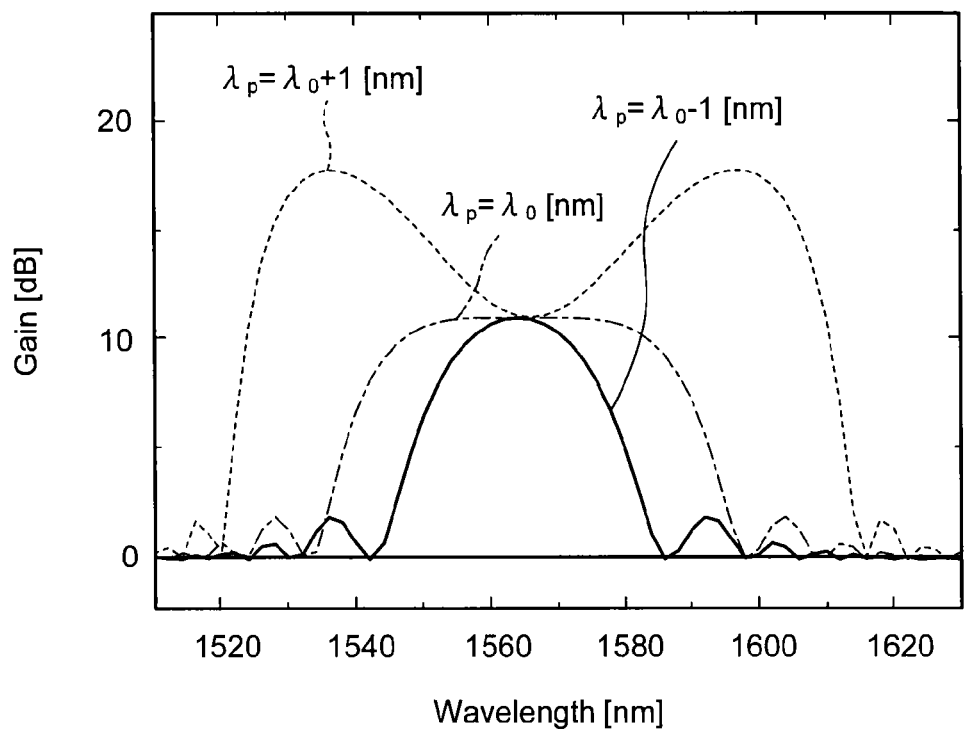
FIG. 44A is a gain spectrum in case that pump power is 30 dBm and there is not a relative phase shifter.
Figure 44B:
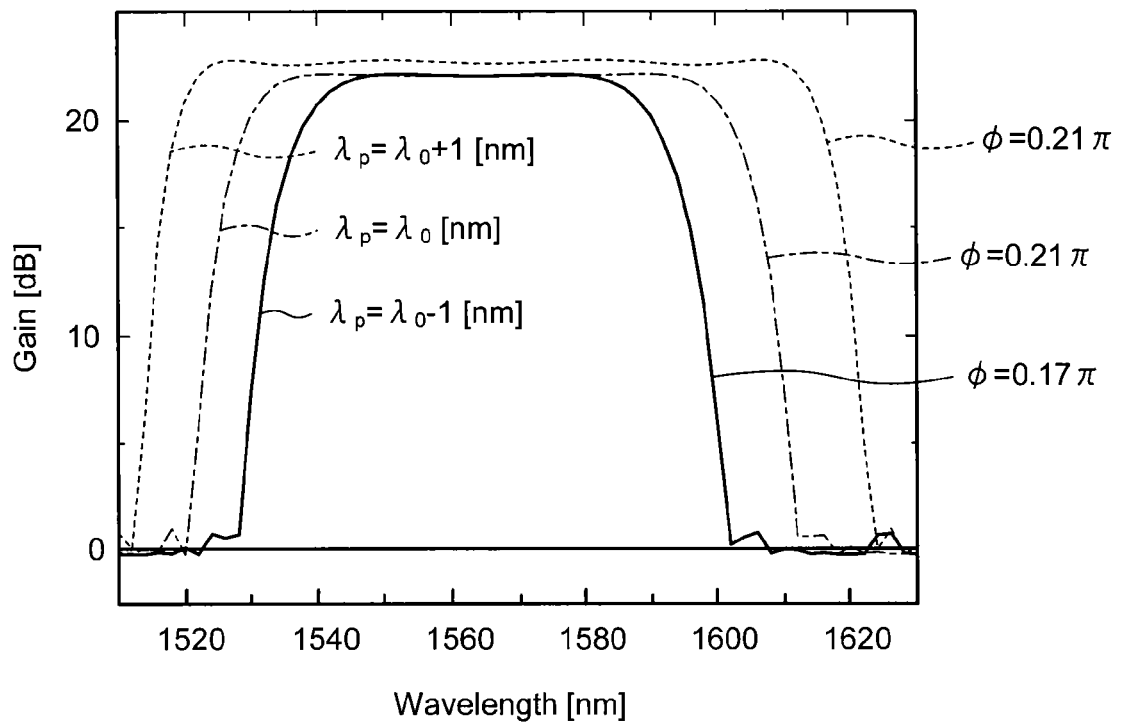
FIG. 44B is a gain spectrum in case that pump power is 30 dBm and there is a relative phase shifter.

FIGS. 44A and 44B are spectra having 1000 [mW] (30 dBm) of pump power in FIGS. 40 to 42 and being extracted and re-plotted. When there is not a relative phase shifter (FIG. 44A), waveform of gain spectrum fluctuates to a significant degree relative to 1 [nm] of fluctuation of pump light wavelength. On the other hand, when there is a relative phase shifter (FIG. 44B), it has flatness having substantially identical gain and falling within a 0.5 dB range of gain. However, if pump light wavelength is set at longer wavelength side, flat amplification band enlarges, but simultaneously, flatness is lost gradually.

FIG. 44B shows that, when pumping wavelength is longer, wavelength band having flat characteristics becomes broader in band, and on the other hand, when pumping wavelength is longer, flatness of wavelength characteristics is more deteriorated and power fluctuation of wavelength characteristics increases. That is, wavelength band and flatness are in relation of trade off. This means that there is an optimum pumping wavelength corresponding to requirement of a system to which an optical amplifier is applied.

FIG. 43B shows that wavelength conversion characteristics of idler light and gain characteristics of signal light are constant almost regardless to wavelength of pump light.

With regard to gain characteristics of signal and wavelength conversion characteristics of idler light, dependence of a relative phase shifter on insertion period was re-calculated in case where there is 4th dispersion in an optical gain fiber. Calculation was conducted based on that wavelength of pump light is zero-dispersion wavelength +1 [nm] and power of pump light is 1500 [mW]. Input power of signal light is −20 [dBm] (0.01 [mW]). Fiber length of the optical gain fiber is 200 [m], dispersion slope is 0.02 [ps/nm$^2$/km], 4th dispersion is −0.0002 [ps/nm$^3$/km], nonlinear constant is 12 [1/W/km], and transmission loss is 0.8 [dB/km]. Relative phase shift value was set at shift value at which gain characteristics of signal light becomes the flattest and the widest in band in each condition.

Figure 45A:
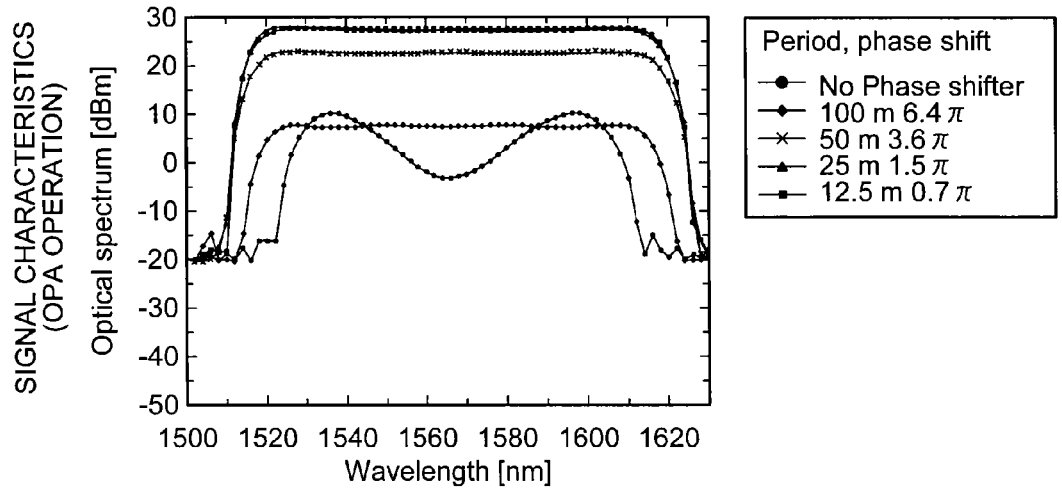
FIG. 45A is a signal light power spectrum when insertion period at which relative phase shifters are disposed is varied.
Figure 45B:
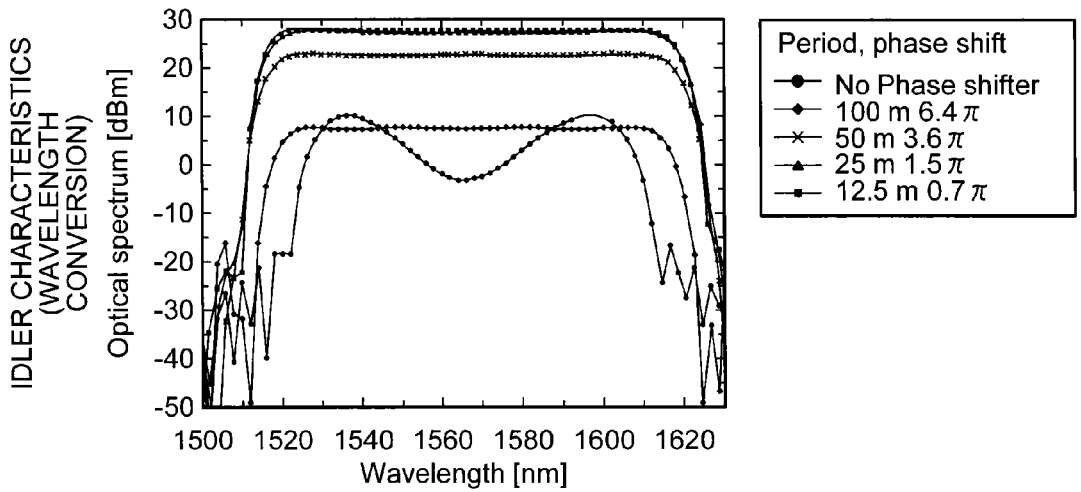
FIG. 45B is a spectrum of idler light when insertion period at which relative phase shifters are disposed is varied.
Figure 45C:
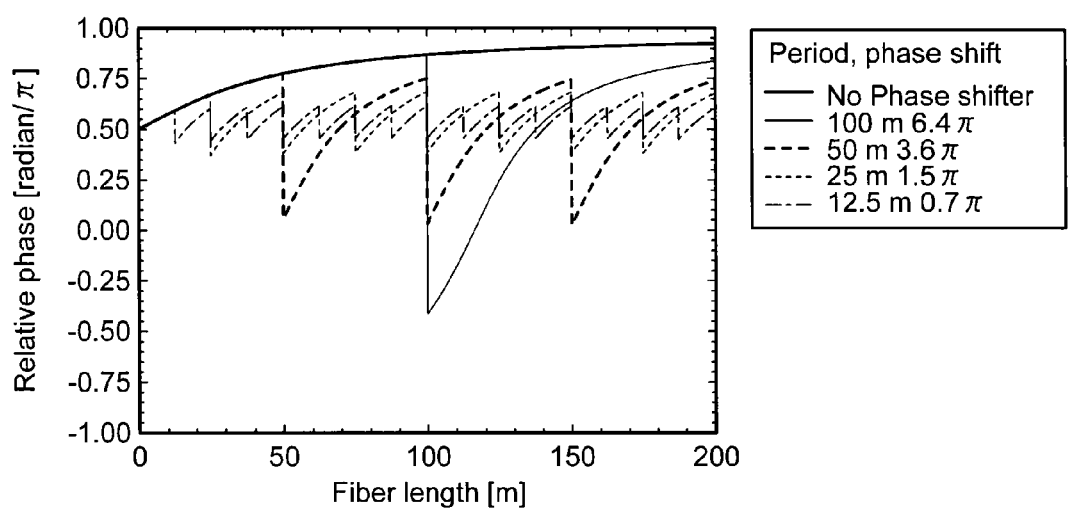
FIG. 45C is a view showing fluctuation of relative phase in a fiber when insertion period at which relative phase shifters are disposed is varied.

FIG. 45A is a signal light power spectrum. FIG. 45B is a spectrum of idler light power. Insertion periods are 100 m, 50 m, 25 m, and 12.5 m. It is found that if insertion period is shorter, gain or conversion efficiency becomes higher. Also, if an insertion period becomes shorter, optimum phase-shift value of each relative phase shifter becomes smaller for obtaining flat wavelength characteristics. FIG. 45C is change in relative phase in each condition in the lengthwise direction of an optical fiber. If an insertion period is shorter, deviation from relative phase shift value of 0.5π [radian] which is shift value indicating phase matching becomes smaller. That is, if an insertion period is shorter, light propagates on condition closer to condition of a more ideal PSA. Gain or conversion efficiency is higher when being closer to phase matching condition. In addition, noise figure becomes smaller when being closer to phase matching condition.

In the calculation in FIGS. 45A and 45B, since 0.8 [dB/km] of transmission loss is ignorably small, insertion period of relative phase shifters is made constant. However, since there is transmission loss in an actual optical gain fiber, pump light power attenuates in accordance with propagation. As a result, if light propagates in a further subsequent stage, gain or conversion efficiency decreases to the extent of loss. Extending insertion period of relative phase shifters in a further subsequent stage and increasing fiber length of an optical gain fiber between relative phase shifters for compensating lowered gain rate due to loss in the optical gain fiber or the relative phase shifters are advantageous in achieving higher gain.

It should be noted that, the above described simulation is a case where it operates mainly as an OPA. On the other hand, if propagation simulation of light is performed in which pump light, signal light, and idler light are inputted into an optical gain fiber simultaneously as shown in FIG. 2, operation as a PSA and its effect can be confirmed. In case of a PSA, effect when introducing one or greater number of relative phase shifter into an optical gain fiber is similar to effect when operating as an OPA.

As described above, an OPA or a PSA was disclosed in which a relative phase shifter was inserted into an optical gain fiber according to an embodiment of the present invention. The disclosed optical amplifier is characterized in that NF is small and NF does not depend on wavelength and has a substantially same value. Then, it is possible to realize an optical amplifying system with low noise and high output power in the entire system by providing the disclosed optical amplifier at a stage prior to a conventional optical amplifier such as an EDFA, a Ytterbium doped fiber amplifier (YDFA), or an Erbium Ytterbium doped fiber amplifier (EYDFA) etc., which makes use of optical absorption and emission, and operating as a pre-amplifier.

Figure 46:
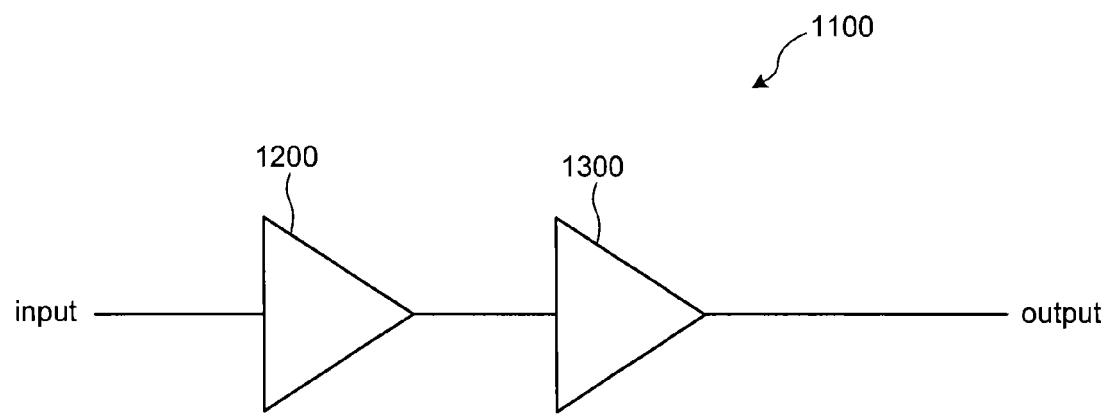
FIG. 46 is a view of configuration when optical amplifiers are used in cascade.

FIG. 46 shows an optical amplifying system 1100 in which an optical amplifier 1200 which is an embodiment of the present invention is disposed at a stage prior to an optical amplifier 1300 which is an EDFA, and the optical amplifier is connected in cascade. This optical amplifying system 1100 is an optical amplifying system the entire of which is low in noise and high in output power because of low noise characteristics of the optical amplifier 1200.

Figure 47:
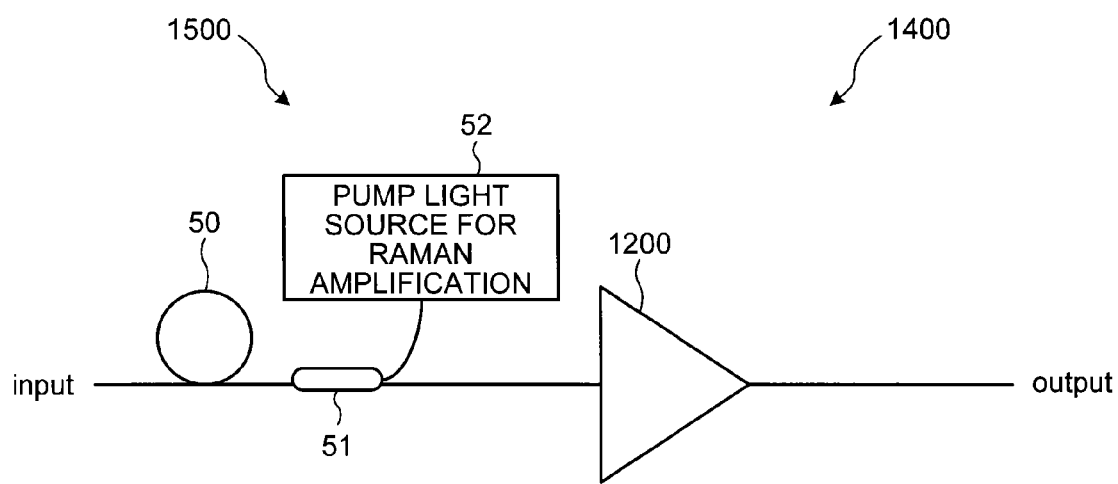
FIG. 47 is a view of configuration of using a Raman amplifier and an OPA in combination.
Figure 48:
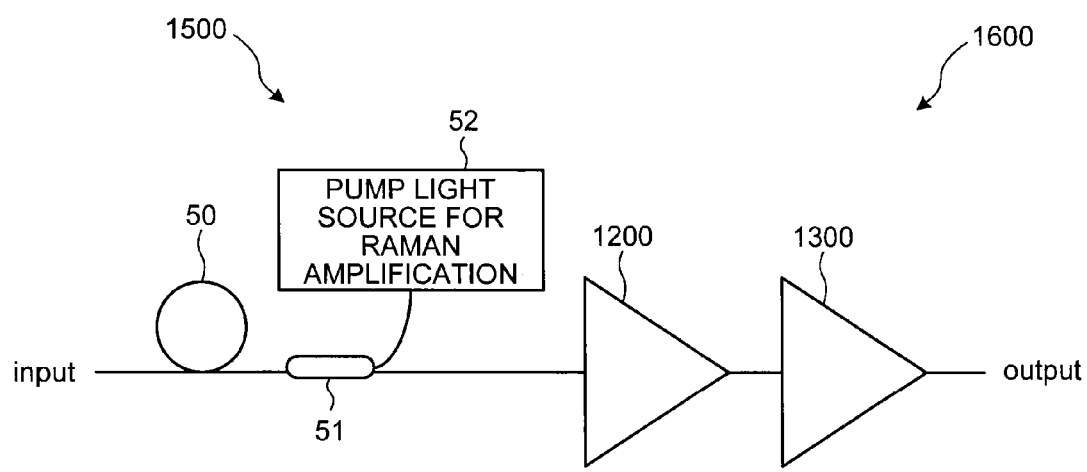
FIG. 48 is a view of configuration of using a Raman amplifier, an EDFA, and an OPA in combination.

Similarly, it is possible to construct an optical amplifying system in which NF is small in the entire amplification band by providing the proposed optical amplifier at a stage subsequent to the optical amplifying system making use of Raman effect. FIG. 47 shows an optical amplifying system 1400 in which the optical amplifier 1200 which operates as an OPA which is an embodiment of the present invention is disposed at a stage subsequent to a Raman amplifying system 1500 which is constituted by an optical fiber for Raman amplification 50, an optical coupler 51 for coupling a pump light, and a pump light source for Raman amplification 52. In FIG. 47, in order to increase light output, an optical amplifying system 1600 may be configured by disposing a conventional optical amplifier 1300, such as EDFA, YDFA, or EYDFA etc., which makes use of optical absorption and emission at a last stage of the optical amplifying system 1400 (FIG. 48).

Figure 49:
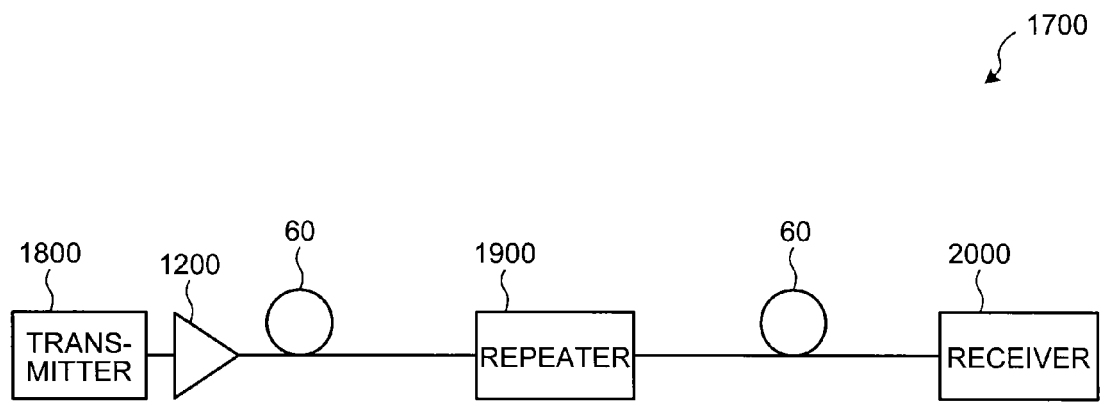
FIG. 49 is a schematic view of an optical communication system.

It is also possible to construct an optical communication system which makes use of the optical amplifier disclosed as an embodiment of the present invention. In an optical communication system 1700 shown in FIG. 49, an arbitrary number of the disclosed optical amplifiers 1200 are inserted at arbitrary locations in a path of a transmission optical fiber 60 from a transmitter 1800 via a repeater 1900 to a receiver 2000. As an example for insertion location, a stage subsequent to the transmitter 1800 as illustrated, a stage prior to the repeater 1900, a stage subsequent to the repeater 1900, or a stage prior to the receiver 2000 can be mentioned. The proposed optical amplifier 1200 may be disposed in the transmitter 1800 or in the receiver 2000. This enables extending transmission distance of the optical communication system in which a conventional EDFA is used as an optical amplifier, and reducing electric power consumption by decreasing transmission power and so on.

Figure 50:
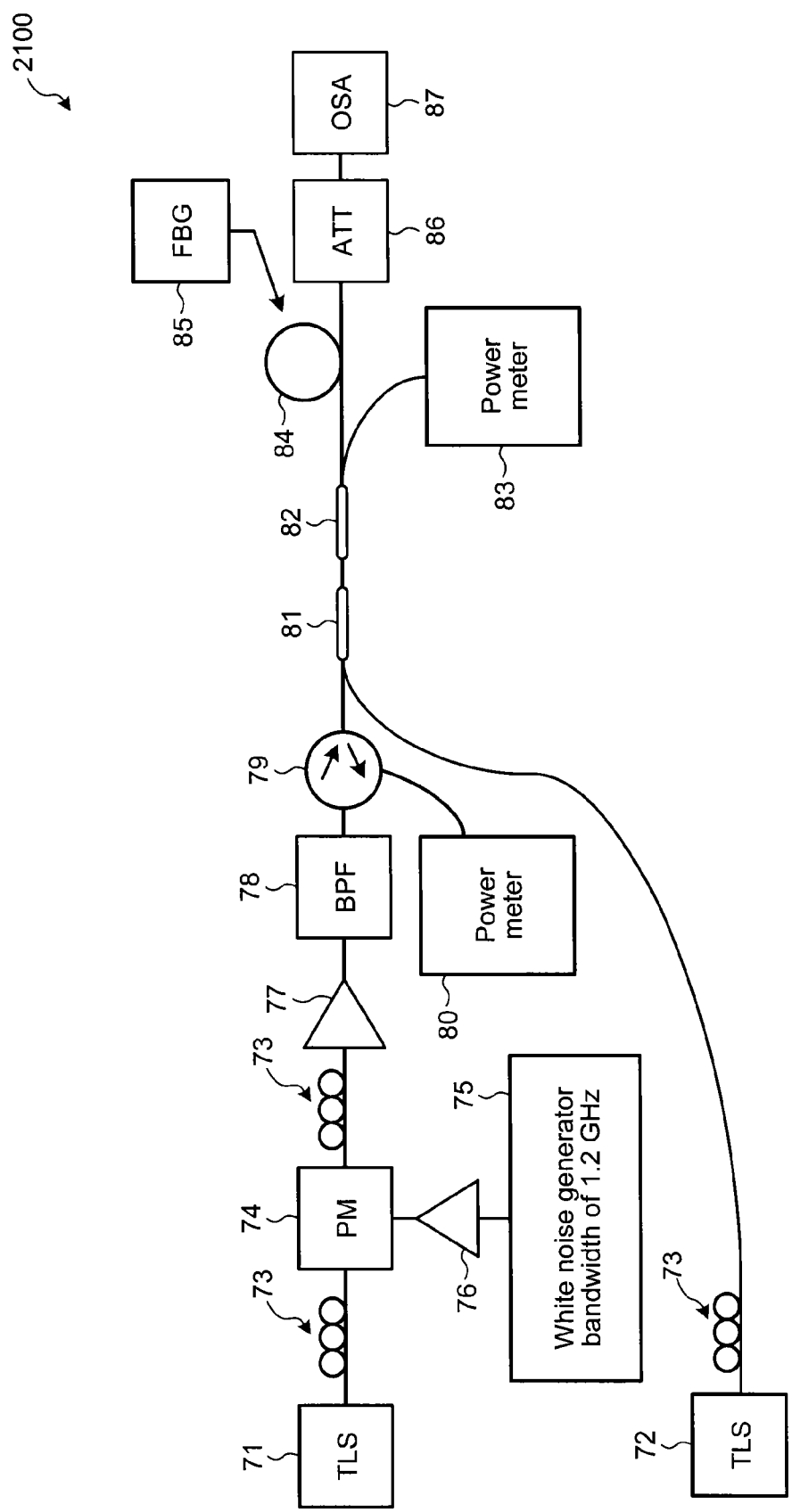
FIG. 50 is a view of an experimental configuration.

The result obtained by the above described simulations will be confirmed by experiments below. The configuration of an optical system 2100 used in an experiment is shown in FIG. 50.

In order to generate pump light, a pump light generation source was used which was configured by a TLS (tunable laser source) 71, a PC (polarization controller) 73, a phase modulator 74, an EYDFA 77, and a BPF (band pass filter) 78. The TLS 71 outputs continuous wave (CW) without using coherence control. The outputted light is inputted into the PM 74. In this state, if a polarization axis of the PM 74 is identical with a polarization axis of the inputted light, phase modulation can be performed efficiently. So the polarization of the inputted light was adjusted by using the PC 73. Adjustment of the polarization was performed so that outputted light power of the PM 74 becomes the maximum. It is because the power of outputted light becomes the maximum when the polarization axis of incident light into the PM 74 coincides with the polarization axis of the polarizer since a polarizer is included in the PM 74. In order to increase the freedom in polarization adjustment, the PC 73 was disposed at a stage subsequent to the PM 74. The light outputted from the PC 73 was amplified by the EYDFA 77 to generate pump light.

For a signal source driving the PM 74, a white noise source 75 of which band is 1.2 GHz was used. This white noise is amplified to approximately 27 dBm by a wide-band RF amplifier 76 to drive the PM 74. As a result, it is possible to phase-modulate pump light in wider band and with higher intensity. This restrains reflection light by SBS (stimulated Brillouin scattering) generated in an FUT (fiber under test) 84 as the optical gain fiber. It should be noted that, as a method of generating light phase-modulated in wider band and with higher intensity, besides the method shown in FIG. 50, there is also a method of using a Fabry Perot laser diode (LD).

When generating signal light, a TLS 72 and the PC 73 were used. The TLS 72 outputs CW light without using coherence control. In order to maximize OPA gain, PSA gain, or wavelength conversion efficiency, the PC 73 is disposed because it is necessary to coincide polarization of signal light with polarization of pump light.

An optical circulator 79 was disposed at a stage subsequent to the EYDFA 77. It is for preventing reflection light by SBS from returning to the EYDFA 77 from the FUT 84 in experiment, and simultaneously, for measuring power of returning light by a power meter 80.

Pump light and signal light were coupled by a 17-dB coupler 81. Herein, pump light passes through a transmission port, and signal light passes through a −17 dB port. Because, in experiment, since power which is equal to or greater than 30 dBm is used in most cases, it is desirable to avoid loss of pump light as much as possible, and the other hand, signal light is sufficient to be approximately −20 dBm. In order to measure, by a power meter 83, light power inputted into the FUT 84, a 20 dB coupler 82 was disposed at a stage prior to the FUT 84. The light power at a −20 dB port of the 20-dB coupler 82 was measured by the light power meter.

A highly nonlinear optical fiber was used as the FUT 84, and an FBG 85 was used as a relative phase shifter to be inserted into the FUT 84.

Because there is possibility that, when output light of the FUT 84 is inputted into an OSA (optical spectrum analyzer) 87 directly, input power exceeds the upper input limit of the OSA 87, an optical attenuator (ATT) 86 was disposed immediately prior to the OSA 87 to protect the OSA 87.

Figure 51:
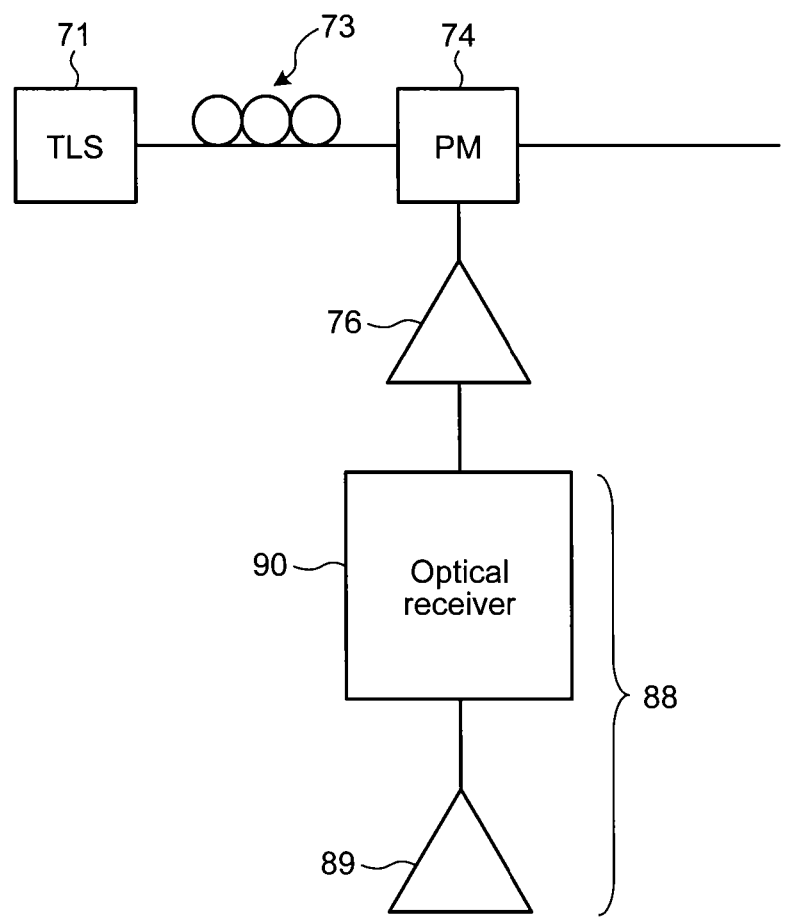
FIG. 51 is a configuration of a circuit driving a phase modulator.

The white noise source 75 which is an RF signal source for driving the PM 74 and is in 1.2 GHz of wide band was generated as follows (a white noise source 88 shown in FIG. 51). An EDFA 89 is driven without input signal light. Then, ASE (amplified spontaneous emission) light is outputted. The ASE light is received by an optical receiver 90 to be converted to a white noise RF signal. Herein, the optical receiver 90 is a module which is constituted by a 10 GHz wide band PD, a 10 GHz wide band TIA (trans-impedance amplifier), and a limiting amplifier. The generated white noise RF signal was amplified by 56 dB by a wide-band RF amplifier 76 of which band is equal to or greater than 2 GHz.

Figure 52:
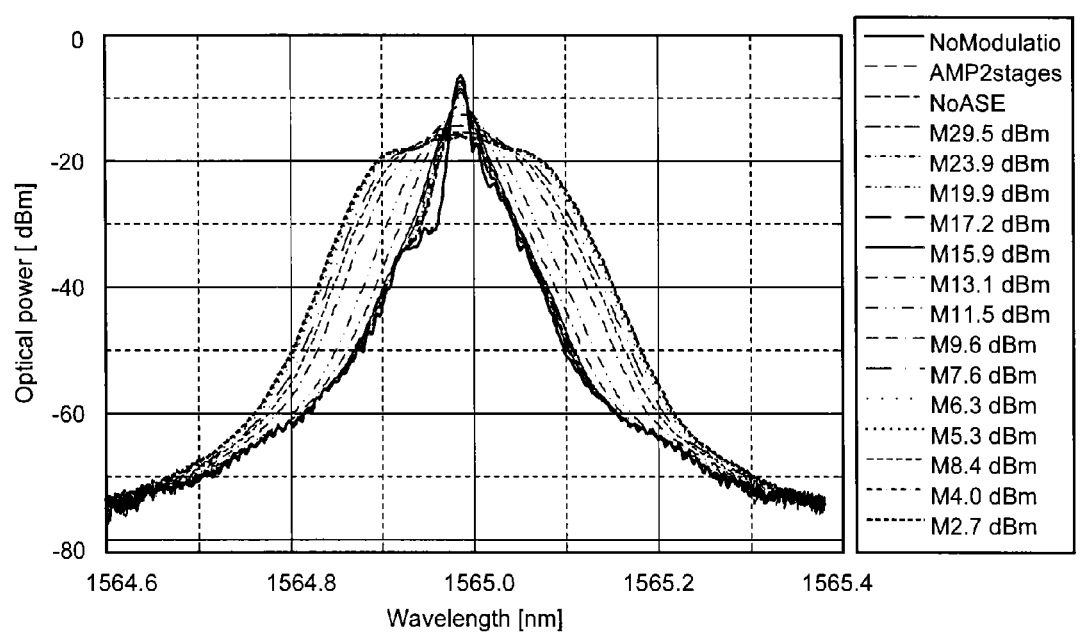
FIG. 52 is a view showing dependence of phase-modulated pump light spectrum on ASE power inputted into an optical receiver.
Figure 53:
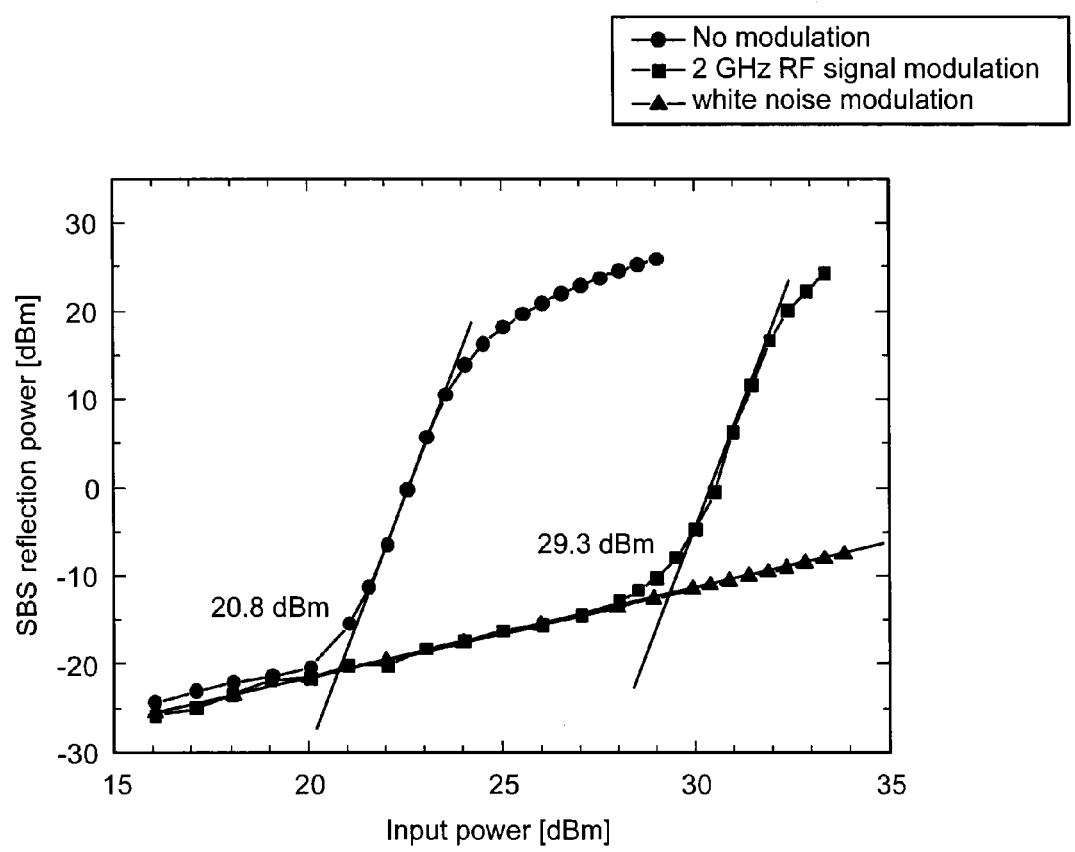
FIG. 53 is a view showing dependence of power of reflective light caused by SBS on inputted power.

FIG. 52 shows dependence of spectrum of output light, of the TLS 71, modulated by the PM 74 driven with the wideband white noise 75 on ASE power inputted into the optical receiver 90. In FIG. 52, "M" means minus sign. For example, M29.5 dBm means −29.5 dBm. Along with increase in the power of the ASE light inputted into the optical receiver 90, the peak of optical spectrum decreases, and simultaneously, line width of spectrum becomes broader in band. In order to suppress SBS, in general, the PM 74 is driven with a plurality of amplified RF signals. In this state, although the line width of optical spectrum becomes broader, optical signal has a comb-shaped spectrum having the interval of the RF signal. Since there is not light power between comb-shaped spectra, even if the line width of optical spectrum becomes broadened, an effect of suppressing SBS is low. On the other hand, since optical signal modulated with the white noise signal has optical spectrum in which there is not a gap, an effect of suppressing SBS is high. FIG. 53 is optical power reflected by SBS corresponding to the power of signal light inputted into a highly nonlinear optical fiber of which nonlinear constant is 12 [1/W/km]. In case where signal light which is not modulated is inputted, reflection power increases from over approximately 20 dBm of input power, that is, an SBS threshold is 20.8 [dBm]. On the other hand, in case of being phase-modulated with 2.0 GHz of RF signal, SBS threshold increases to 29.3 [dBm]. Furthermore, in case of being phase-modulated with white noise having RF power that is the same as RF power of the RF signal, SBS threshold exceeds 34 dBm. As described above, it is found that white noise has superior effect in suppressing SBS than RF signal.

By using the above described optical system 2100, signal gain characteristics and characteristics of idler light of a highly nonlinear optical fiber, into which an FBG as a relative phase shifter is inserted, will be studied.

Figure 54A:
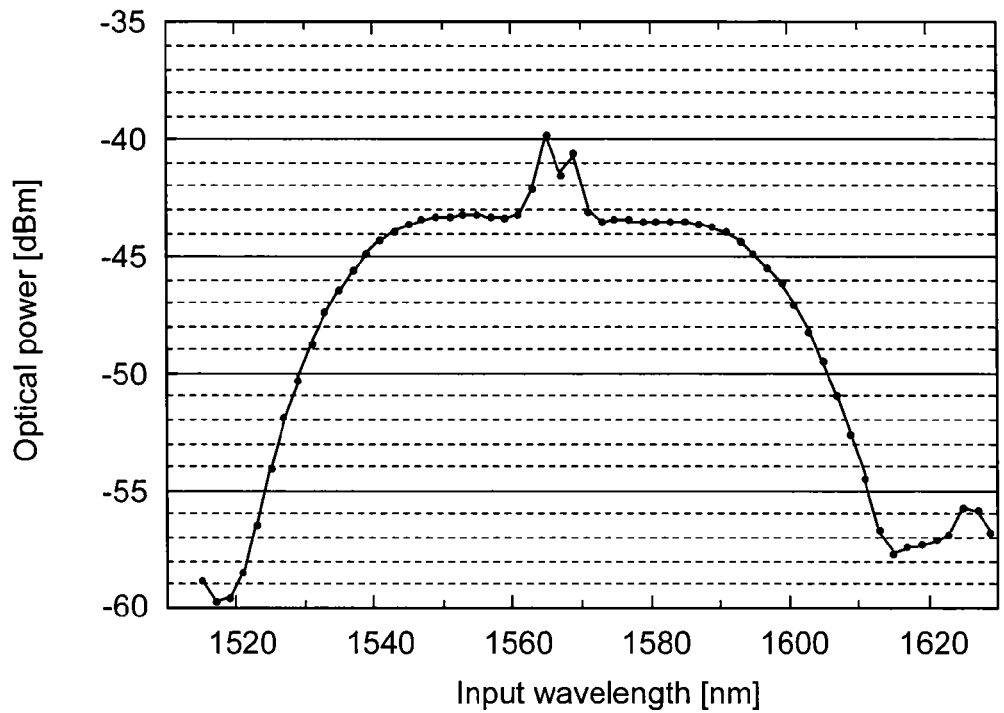
FIG. 54A is a spectrum of idler light power in case of using a relative phase shifter (FBG)
Figure 54B:
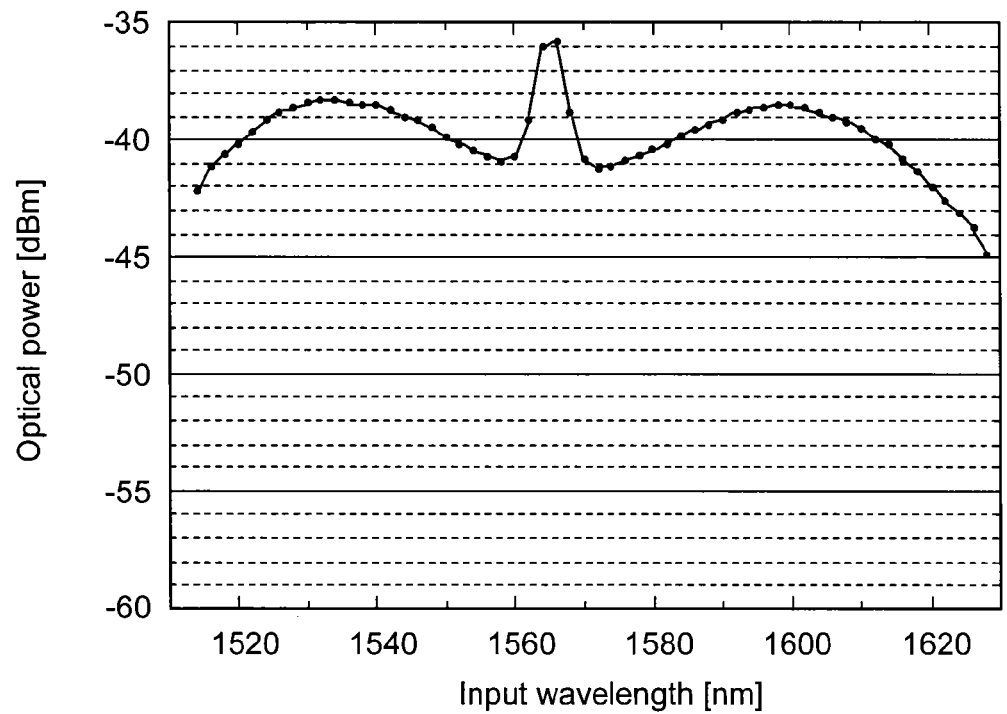
FIG. 54B is a spectrum of idler light power in case of not using a relative phase shifter (FBG)
Figure 55A:
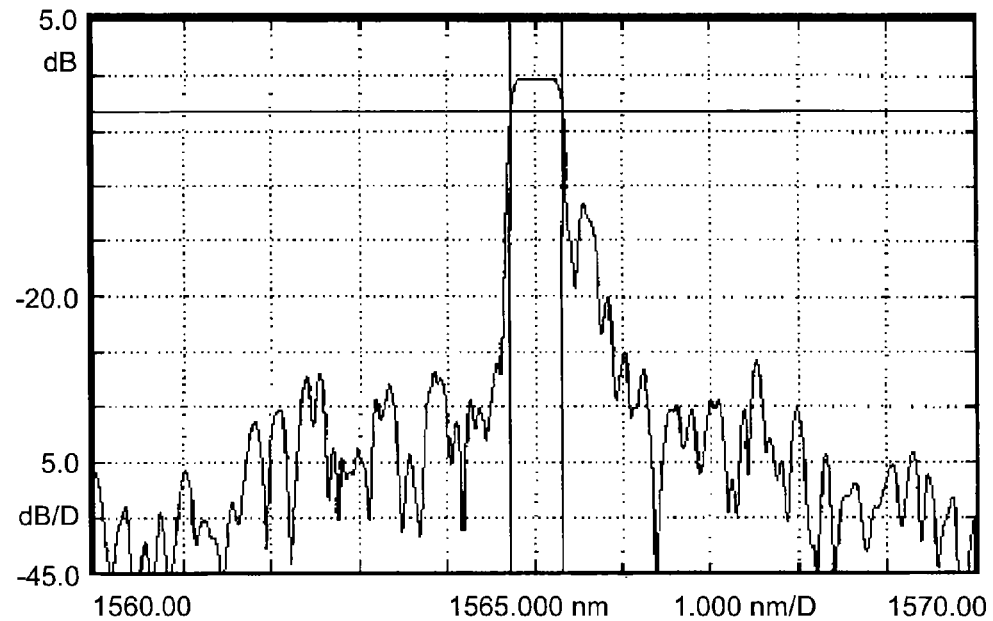
FIG. 55A is a reflection spectrum of an FBG.
Figure 55B:
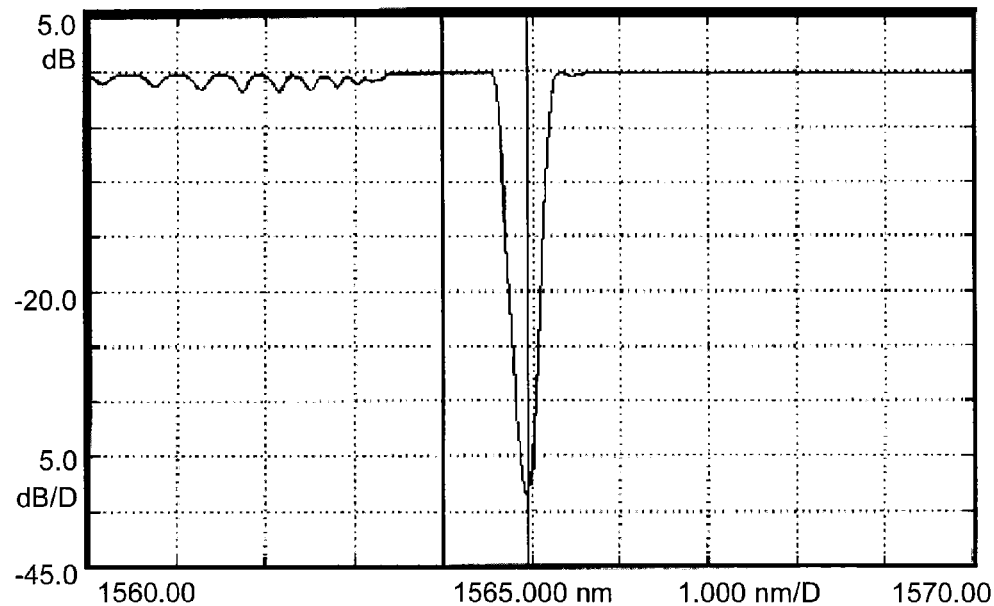
FIG. 55B is a transmission spectrum of an FBG.

FIG. 54A is a spectrum of idler light power when an FBG, having a length of 5 cm and being manufactured with an SMF (single mode fiber) conforming to ITU-T (International Telecommunication Union) G.652, is inserted at a point by 50 m from an end portion of a highly nonlinear fiber having a length of 100 m. Pump light wavelength is 1566.3 nm. FIG. 54B is a spectrum of idler light power when an FBG is not inserted into the highly nonlinear optical fiber, i.e., when there is only the highly nonlinear optical fiber. The power of inputted pump light is 32.4 dBm, and the power of signal light is −20 dBm. Pump light wavelength is 1566.0 nm. As characteristics of the highly nonlinear optical fiber, zero-dispersion wavelength is 1564 nm, and as characteristics at zero-dispersion wavelength, dispersion slope is 0.014 [ps/nm$^2$/km], nonlinear constant is 18 [1/W/km], and loss is 0.9 [dB/km]. FIGS. 55A and 55B are transmission spectrum and reflection spectrum of the inserted FBG (FBG 85) respectively. Line width is 0.6 nm at 1565 nm of Bragg wavelength. Loss at Bragg wavelength in the transmission spectrum is −38.5 dB. Splice loss when inserting this FBG into the highly nonlinear optical fiber is 2.5 dB in total at both ends of the FBG. Attenuation of an attenuator 86 at a stage prior to the OSA 87 in FIG. 50 was set at −20 dB.

An effect of inserting the FBG is understood by comparing FIG. 54A with FIG. 54B. In case where the FBG is not inserted, since pumping wavelength is at longer wavelength side than zero-dispersion wavelength, a waveform has peaks at both sides of the pumping wavelength by MI (modulation instability), there is not flatness. On the other hand, waveform in which an FBG is inserted is in trapezoidal shape. Furthermore, a 1 dB band is present in 53 nm. It was confirmed from this fact that relative phase was shifted at 50 m point of fiber length by insertion of the FBG, and as a result of that, flat waveform characteristics can be obtained. Idler light power in a flat wavelength region of FIG. 54A is −43.2 dBm. By considering that FBG splice loss is 2.5 dB, setting of an attenuator is −20 dB, and peak power of idler light by phase modulation using white noise of pump light is approximately −10 dB relative to the total power, fiber output power of idler light can be inferred to be approximately −10 dBm. This power is substantially the same as power at a bottom of recess in the vicinity of pumping wavelength in idler light spectrum when there is not an FBG.

Figure 56A:
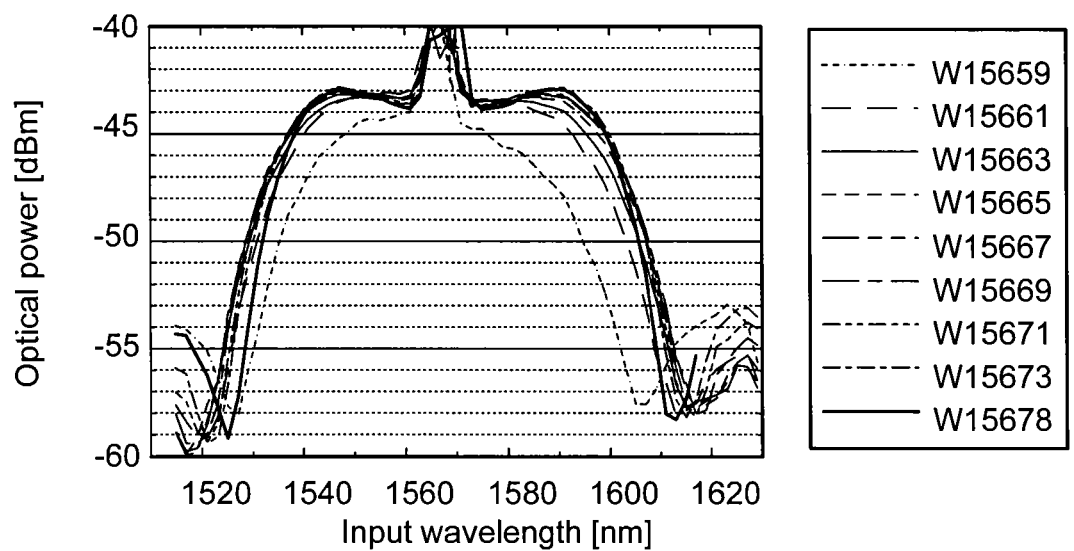
FIG. 56A is a spectrum of idler light power when wavelength of pump light is set at a longer wavelength side with respect to Bragg wavelength of an FBG.

FIG. 56A is a spectrum of idler light power when pumping wavelength is set at longer wavelength side relative to Bragg wavelength of the FBG. Legends show wavelengths of pump light. Even though there is difference of 1 dB flat band, when wavelength is longer than 1566.3 nm, spectrum waveform having substantially same flat waveform characteristics is shown.

Figure 56B:
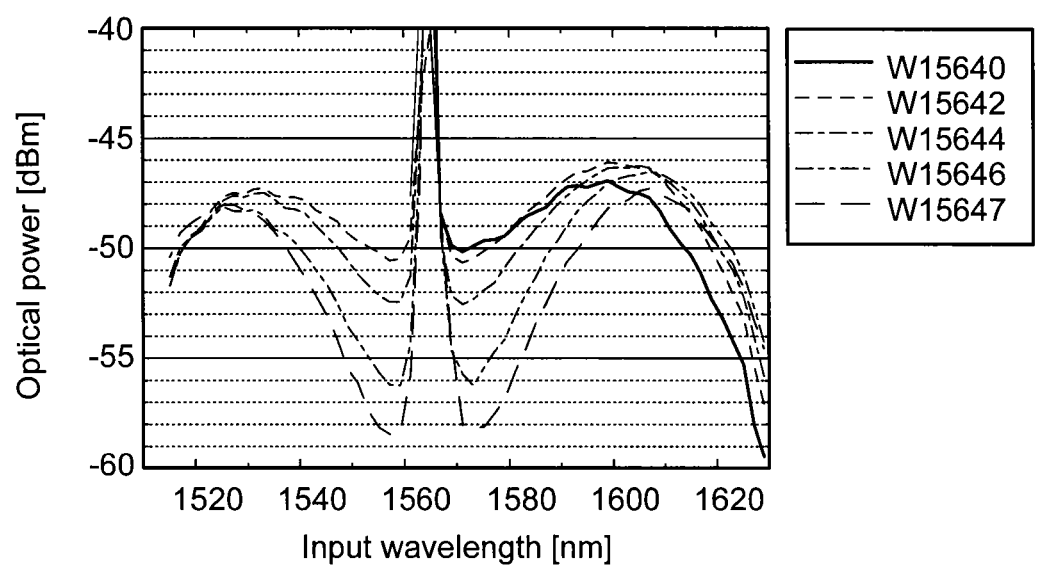
FIG. 56B is a spectrum of idler light power when wavelength of pump light is set at a short wavelength side with respect to Bragg wavelength of an FBG.

FIG. 56B is a spectrum of idler light power when wavelength of pump light is set at shorter wavelength side relative to Bragg wavelength. It is found that, along with making wavelength of pump light shorter, idler light power in the vicinity of pumping wavelength becomes lower. This indicates that phase-shifting directions are opposite between longer wavelength side and shorter wavelength side relative to the Bragg wavelength. At longer wavelength side, it contributes to form flat waveform characteristics by increasing power in the vicinity of wavelength of pump light. On the other hand, it suggests that flatness is lost since, at shorter wavelength side, power in the vicinity of wavelength of pump light is attenuated.

Figure 57A:
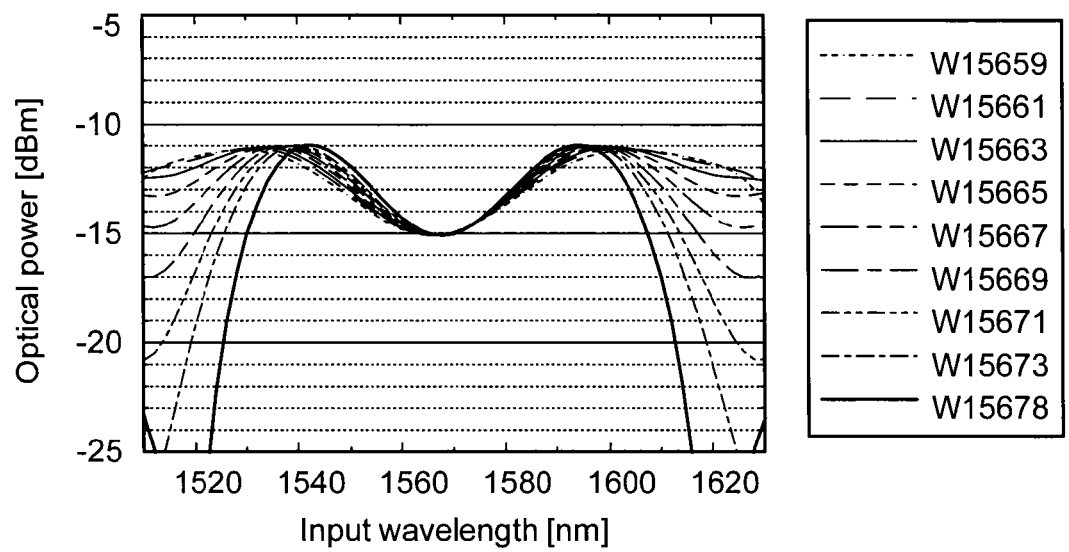
FIG. 57A is a view showing a result of simulation calculating a spectrum of idler light power in case that an SMF is inserted into an optical gain fiber as dispersion medium and when wavelength of pump light is set at a longer wavelength side with respect to Bragg wavelength of an FBG.
Figure 57B:
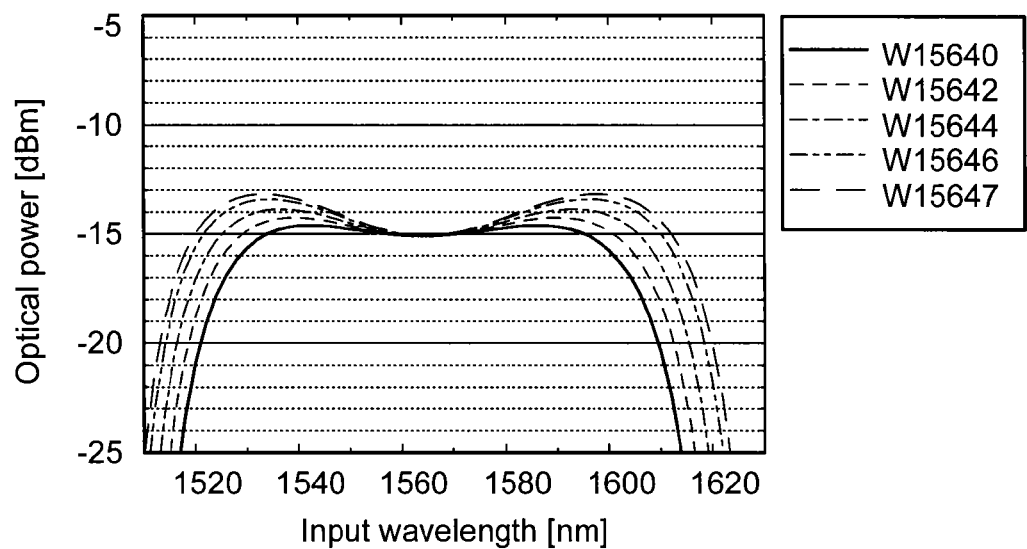
FIG. 57B is a view showing a result of simulation calculating a spectrum of idler light power in case that an SMF is inserted into an optical gain fiber as dispersion medium and when wavelength of pump light is set at a short wavelength side with respect to a Bragg wavelength of an FBG.

FIGS. 57A and 57B are simulation calculation results when inserting an SMF having a length of 5 cm at a 50 m point from an end portion of a highly nonlinear optical fiber to show that the flat waveform characteristics shown in FIG. 56A are not an effect of dispersion of FBG. FIG. 57A is simulation calculation result of spectrum of idler light power when pumping wavelength is at longer wavelength side relative to zero-dispersion wavelength and FIG. 57B is simulation calculation result of spectrum of idler light power when pumping wavelength is at shorter wavelength side relative to zero-dispersion wavelength. Characteristics of a highly nonlinear optical fiber were in accordance with characteristics used in the experiment, and were calculated based on that pump light power was 1500 mW (31.8 dBm). It was found that, either of FIGS. 57A and 57B could not obtain flat waveform characteristics. These simulation calculation results support that the flat waveform characteristics of FIG. 56A are by an effect of phase shift of the FBG.

Although 1 dB band of the flat spectrum of FIG. 54A is 53 nm, it is affected by dispersion of FBG manufactured with an SMF, a flat band becomes narrower than in a case where dispersion of FBG is ignorable. Then, we manufactured an FBG, of which dispersion is ignorable, with a highly nonlinear optical fiber (HNLF) having the same characteristics with characteristics of an HNLF used in the experiment, coupled two pieces of them in series, and applied it as a relative phase shifter.

Figure 58:
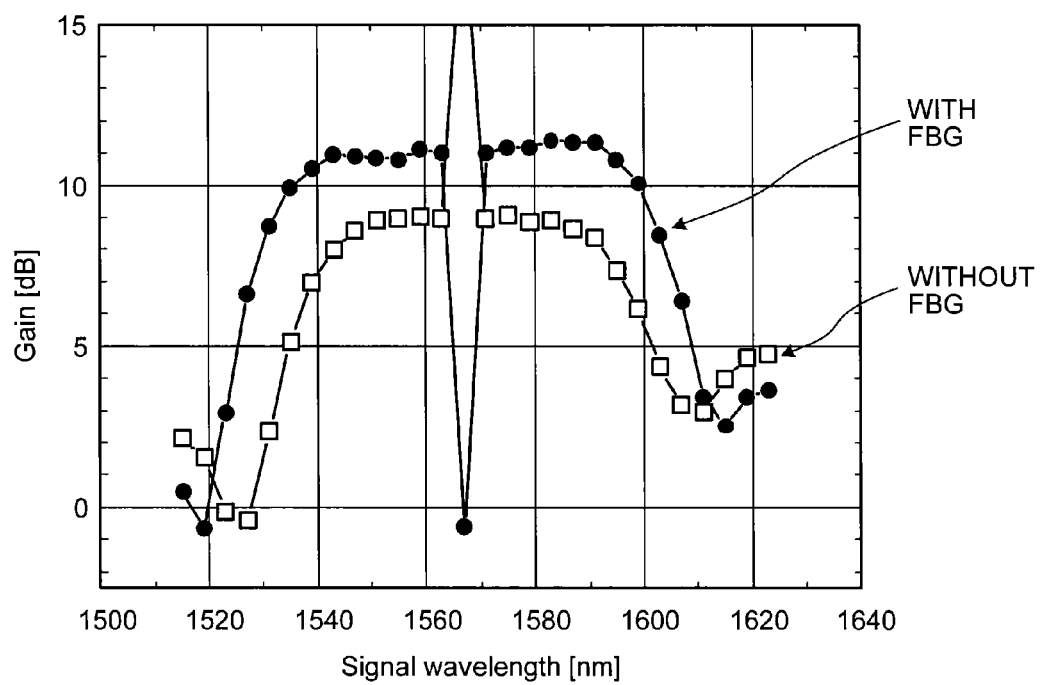
FIG. 58 is a gain spectrum of an OPA.

FIG. 58 is a gain spectrum of signal light when an FBG manufactured by using HNLF is applied to a relative phase shifter and when there is not an FBG. Wavelength of pump light is 1565.9 [nm] which is at shorter wave side than zero-dispersion wavelength by only 1.0 [nm]. As compared with spectrum when there is not an FBG, in spectrum when there is an FBG, gain increased by 2 dB, and 1 dB band increased from 40 nm to 56 nm. As described above, it was clarified that an FBG operates as a relative phase shifter and expands gain and band.

Figure 59A:
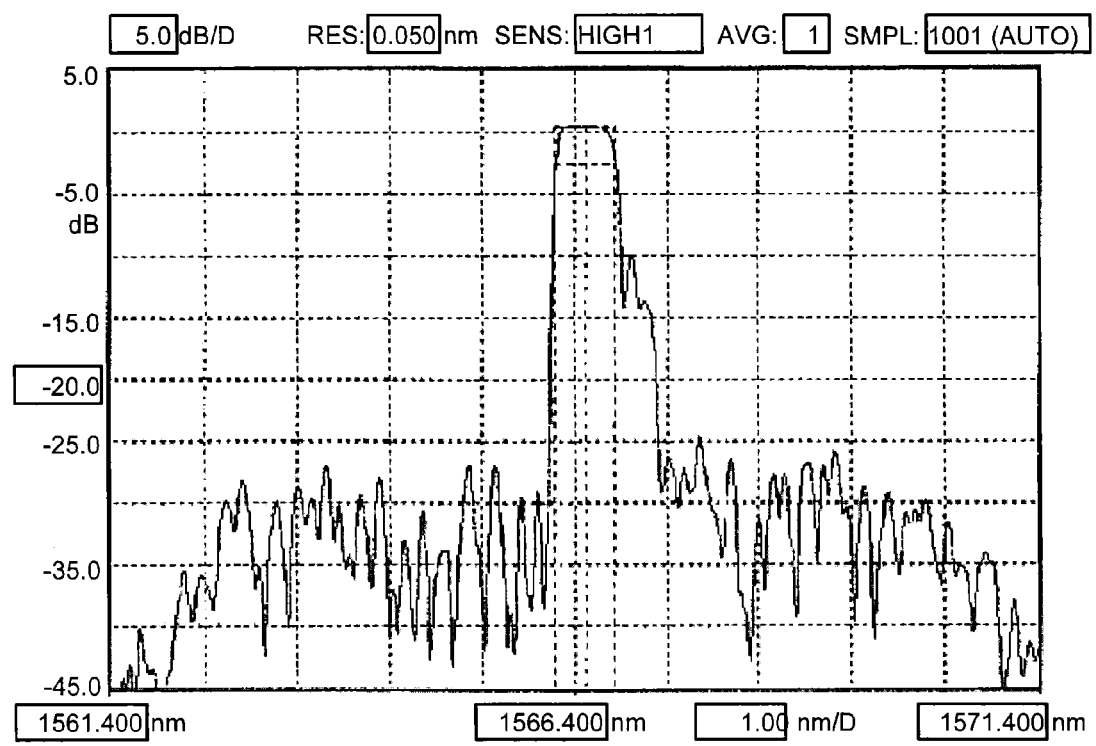
FIG. 59A is a reflection spectrum of an FBG.
Figure 59B:
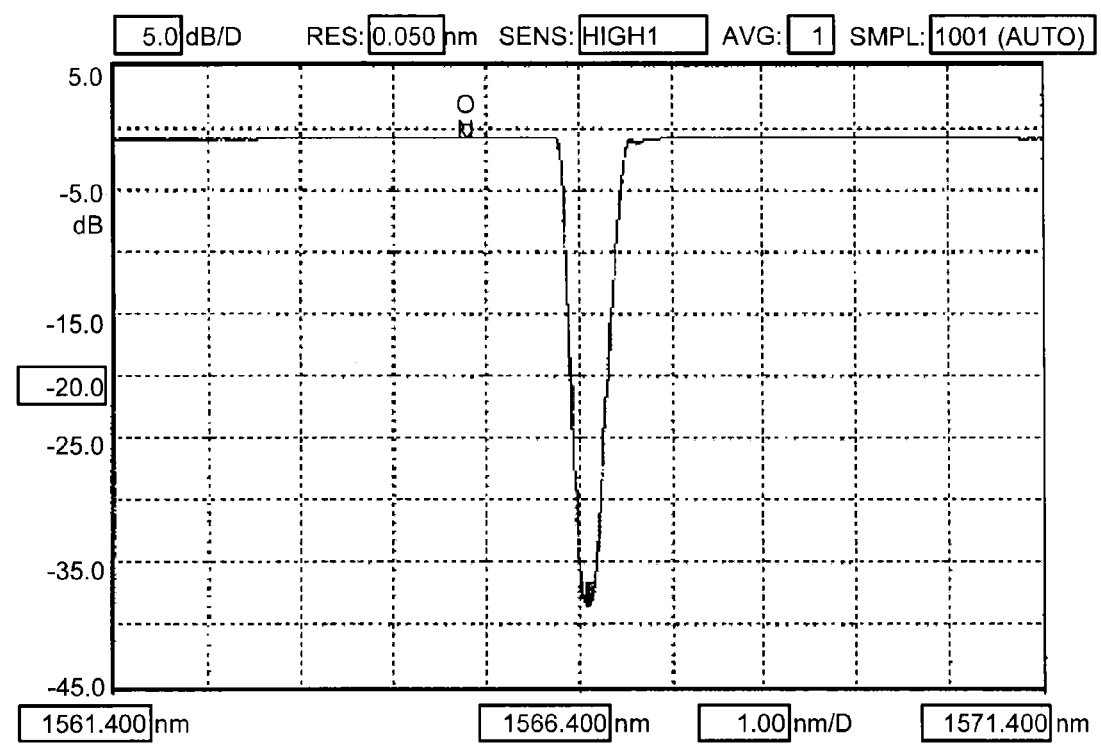
FIG. 59B is a transmission spectrum of an FBG.

A reflection spectrum and a transmission spectrum of the FBG used in this time are FIG. 59A and FIG. 59B respectively. Bragg wavelength is 1566.52 nm, transmission loss at the Bragg wavelength of transmission spectrum is −37.8 dB, and line width is 0.65 nm. A highly nonlinear optical fiber is 200 m in length, zero-dispersion is 1566.9 nm, and as characteristics at zero-dispersion wavelength, dispersion slope is 0.02 [ps/nm$^2$/km], nonlinear constant is [1/W/km], and loss is 0.9 [dB/km]. The FBG was inserted at a point by 100 m from an end portion of the highly nonlinear fiber.

Figure 60A:
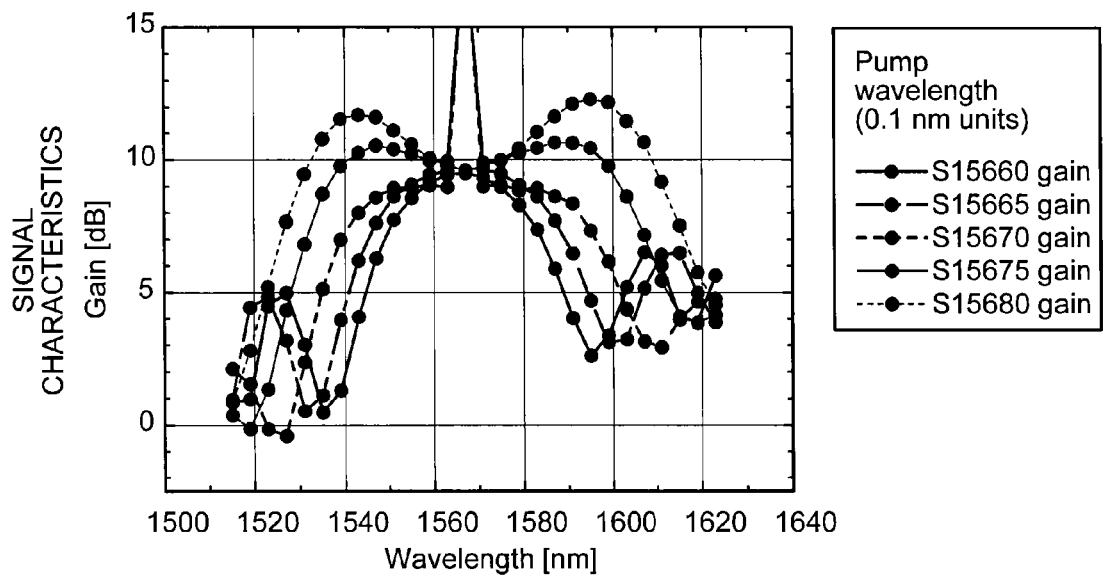
FIG. 60A is a spectrum of light outputted from an optical gain fiber and a spectrum of signal light in case of not using a relative phase shifter.
Figure 60B:
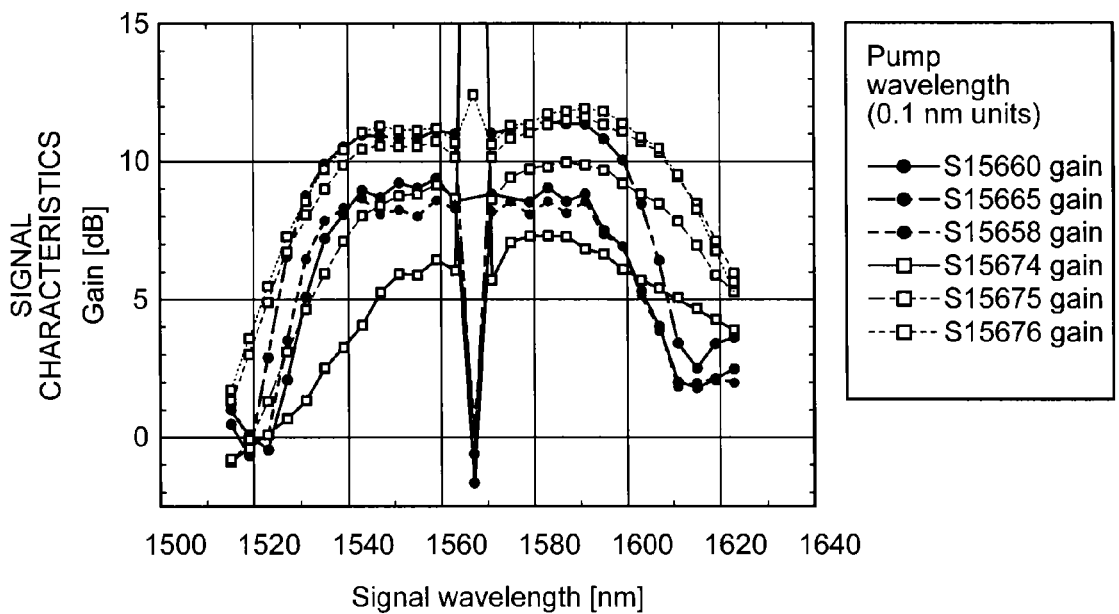
FIG. 60B is a spectrum of light outputted from an optical gain fiber and a spectrum of signal light in case of using a relative phase shifter.
Figure 60C:
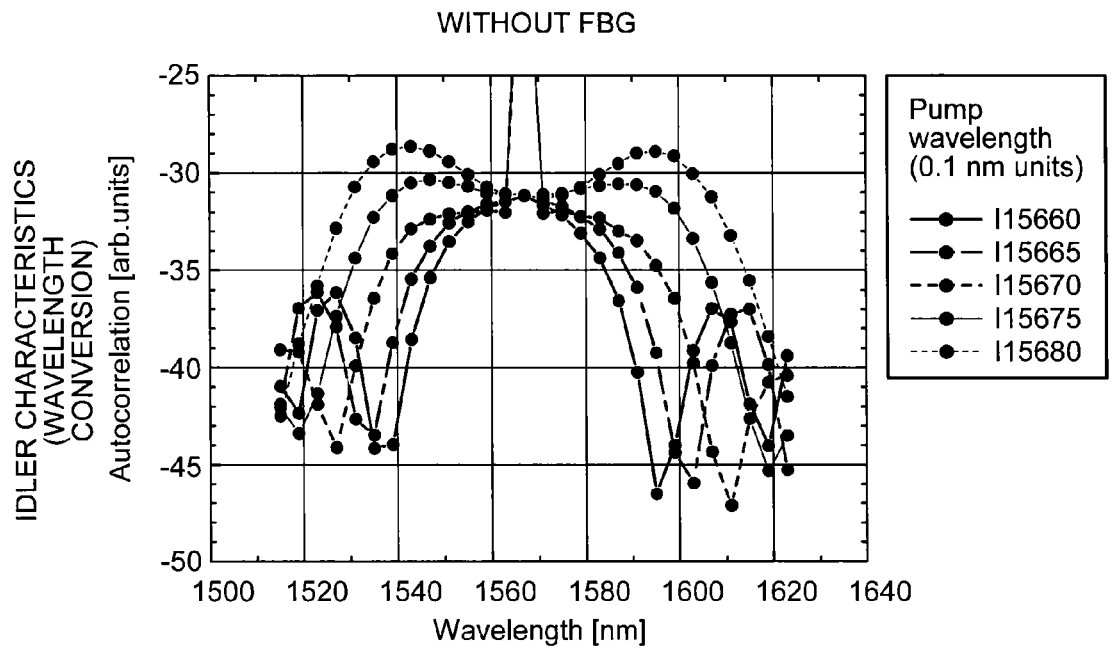
FIG. 60C is a spectrum of light outputted from an optical gain fiber and a spectrum of idler light in case of not using a relative phase shifter.
Figure 60D:
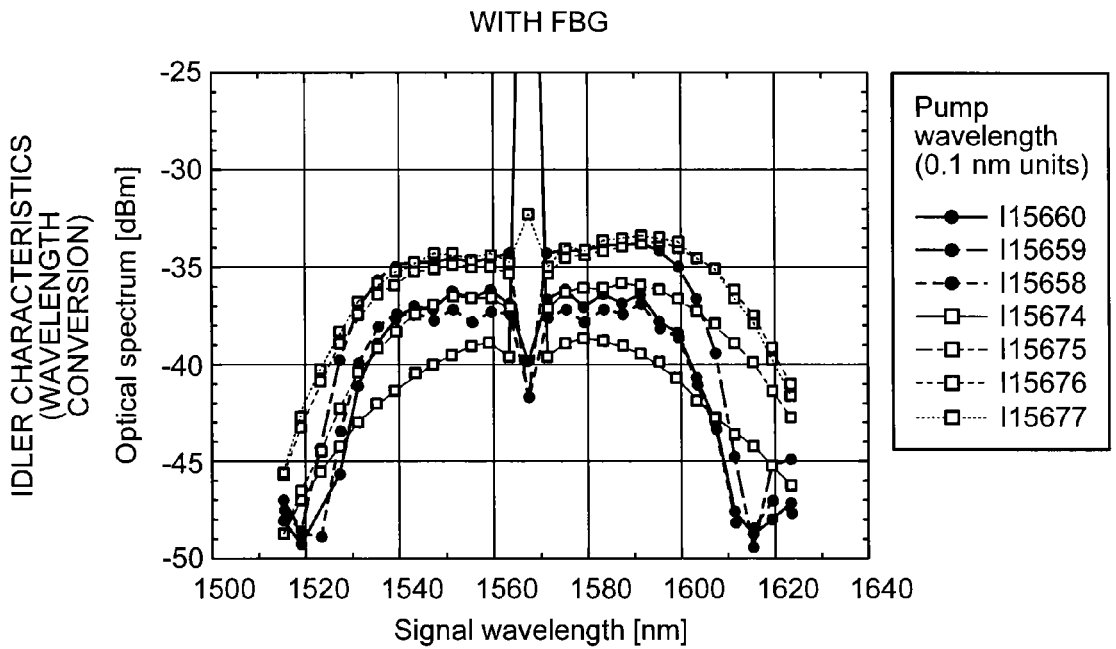
FIG. 60D is a spectrum of light outputted from an optical gain fiber and a spectrum of idler light in case of using a relative phase shifter.

FIGS. 60A to 60D are gain spectrum of signal light and spectrum of idler light power when an FBG manufactured with HNLF is applied and when not applied. FIG. 60A is a signal light gain spectrum when there is not an FBG, FIG. 60B is a signal light gain spectrum when there is an FBG, FIG. 60C is a spectrum of idler light power when there is not an FBG, and FIG. 60D is a spectrum of idler light power when there is an FBG. It should be noted that, when measuring FIG. 60C, attenuation of an attenuator at a stage prior to an OSA was set at −20 dB, and set at −15 dB when measuring FIG. 60D. For spectra of highly nonlinear optical fiber as a single unit, waveforms of FIGS. 60A and 60C are typical. As pumping wavelength becomes shorter than zero-dispersion wavelength, 1 dB band becomes narrower, and as pumping wavelength becomes longer than zero-dispersion wavelength, flatness of the spectrum is lost, and peaks on both sides of pumping wavelength grow. In FIG. 60B and FIG. 60D, flat waveform characteristics are obtained at several pump light wavelengths.

Figure 61:
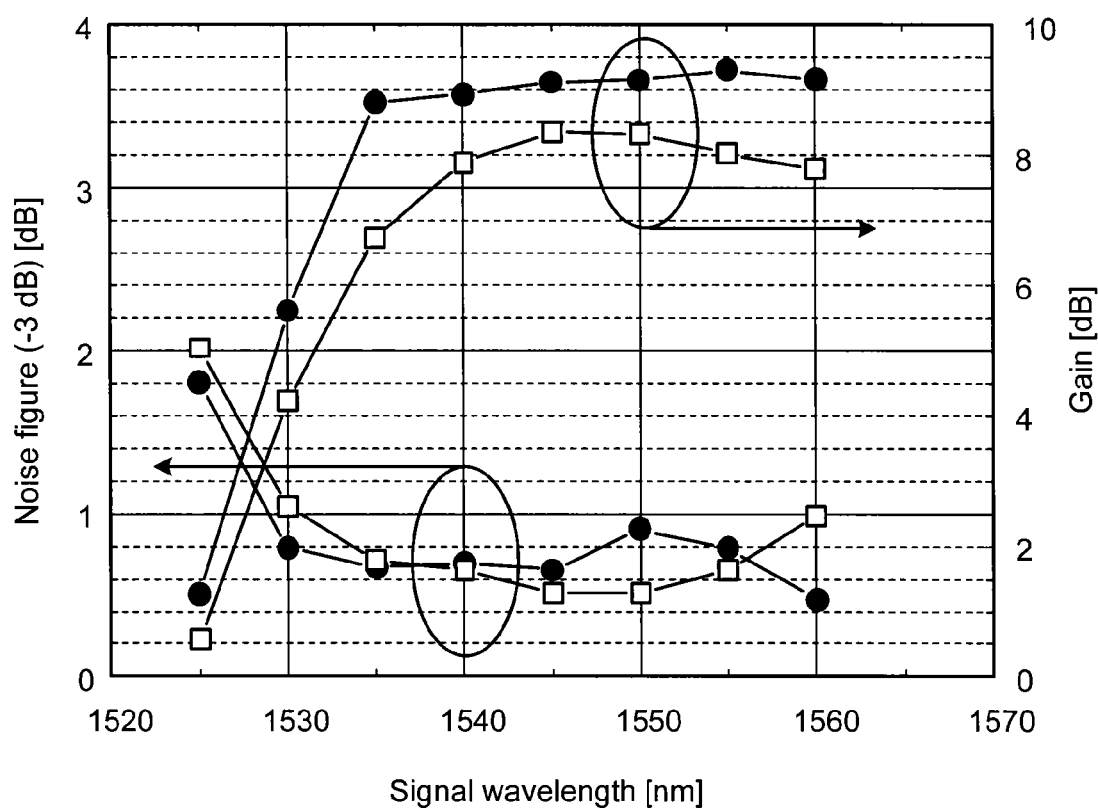
FIG. 61 is a noise figure (NF) spectrum and a gain spectrum, where a black round indicates that there is a relative phase shifter and a white square indicates that there is not a relative phase shifter.

Typical gain spectrum and measured results of its NF are shown in FIG. 61. A black round indicates that two FBGs were applied as relative phase shifters and a white square indicates that no FBG is applied. Pumping wavelength when an FBG was applied was set at 1565.9 nm, and pumping wavelength when no FBG was applied was set at 1566.9 nm at which dispersion is zero. Other conditions are the same as those of the above described experiment. It should be noted that, when measuring NF, we followed a method, of NF measurement of EDFA, in which gain and ASE level of output light are measured based on an input spectrum and an output spectrum of an optical gain fiber in an optical spectrum, and NF is calculated by using these measured values. Herein a point where attention must be paid is that, since the configuration of the present optical system 2100 is a polarization-dependent optical amplifier in which a component which is perpendicular to polarization of pump light is not amplified, the minimum value of NF is not 3 dB but 0 dB. In order to convert to NF when configuration is polarization independent, it is desirable to add 3 dB to NF obtained and shown in FIG. 61.

FIG. 61 shows that NF is equal to or lower than 0.9 dB and is a substantially constant value regardless to whether or not FBG is applied within a range between pumping wavelength and 1530 nm.

Figure 62:
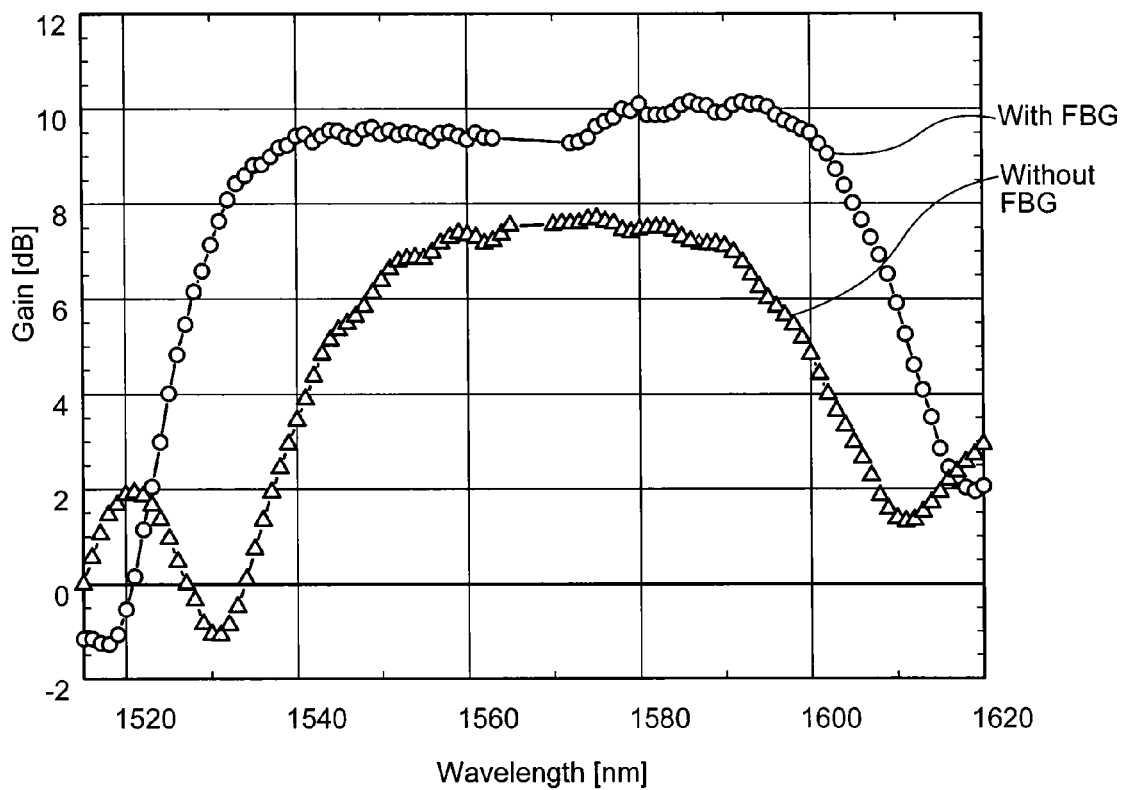
FIG. 62 is a gain spectrum of an OPA when there is a relative phase shifter (FBG) (a round) and when there is not a relative phase shifter (FBG) (a triangle)

A gain spectrum when wavelength of pump light was set at a long wavelength side relative to zero-dispersion wavelength is shown in FIG. 62. By inserting an FBG, gain increased by 2 dB and a 3 dB band increased from 65 [nm] to 85 [nm]. As a result of Raman amplification by pump light, gain at longer wavelength side relative to pumping wavelength increased by approximately 0.5 dB than at shorter wavelength side. On the other hand, at shorter wavelength side, flatness was realized in which gain falls within a range of 0.3 dB, i.e., 9.31 dB to 9.61 dB in a range from 1540 [nm] to 1567.65 [nm] of wavelength of pump light. In order to make flatness, in which gain falls within a range of 0.5 dB, broadened in band, it is preferable that a highly nonlinear optical fiber of which 4th dispersion of the fiber is as close to zero as possible is used, and pump light wavelength is set at a longer wavelength side (abnormal dispersion side) than zero-dispersion wavelength by, equal to or less than, 1 [nm]. However, pump light wavelength which is a wavelength longer than zero-dispersion wavelength by, equal to or greater than, 1 [nm] increases 3 dB band of gain, a flat gain range falling within a range of 0.5 dB becomes narrower.

It should be noted that, a highly nonlinear optical fiber is 200 m in length, zero-dispersion is 1566.9 nm, and as characteristics at zero-dispersion wavelength, dispersion slope is 0.02 [ps/nm$^2$/km], nonlinear constant is 12 [1/W/km], and loss is 0.9 [dB/km]. The FBG was inserted at a point by 100 m from an end portion of the highly nonlinear optical fiber. Wavelength of pump light is 1567.65 [nm], and input power is 31.7 [dBm]. Since pump light is phase-modulated by a phase modulator (PM) which is driven with 27 dBm of 1.5 GHz-wideband white noise signal, SBS is not generated and the entire input pump power propagates in the HNLF.

Figure 63:
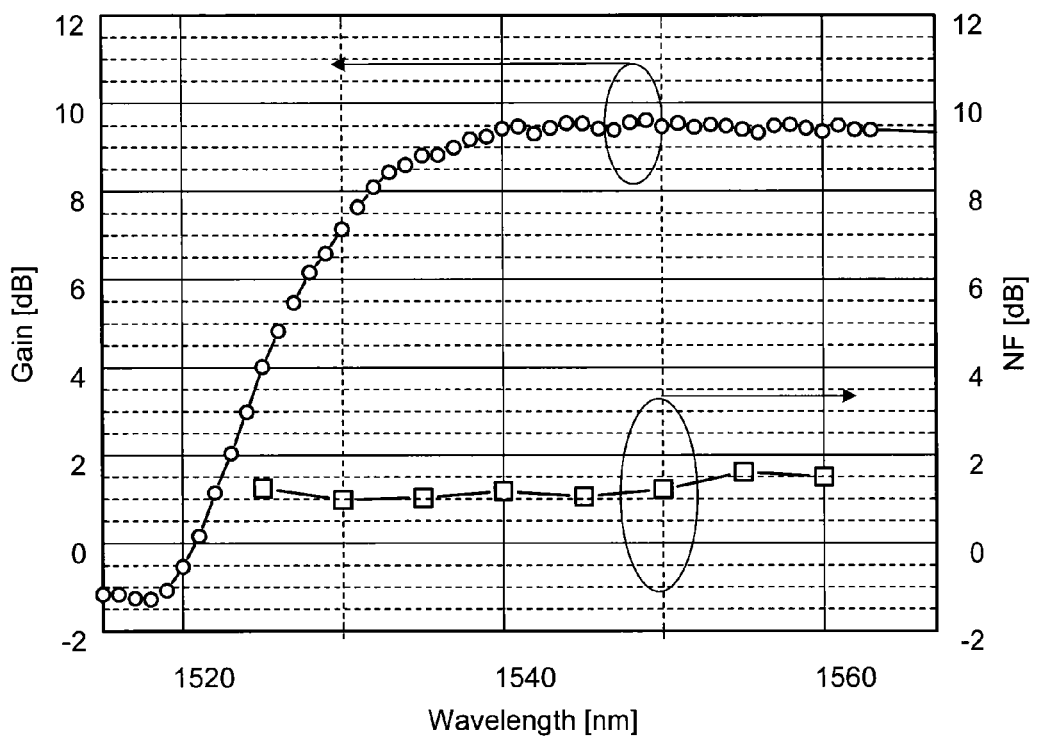
FIG. 63 is a noise figure (NF) spectrum and a gain spectrum, where a round indicates gain and a square indicates NF.

FIG. 63 is a spectrum of gain and noise figure (NF) of an OPA under the conditions of FIG. 62. NF falls within a range from 0.98 dB to 1.6 dB and is substantially constant. Herein a point where attention must be paid is that, since the configuration of the present optical system 2100 is a polarization-dependent optical amplifier in which a component which is perpendicular to polarization of pump light is not amplified, the minimum value of NF is not 3 dB but 0 dB. In order to convert to NF when configuration is polarization independent, 3 dB may be added to NF obtained and shown in FIG. 63.

Next, a spectrum, when an FBG manufactured with an HNLF is disposed in an HNLF, which is an optical gain fiber having a length of 200 m so that gain of signal light becomes further greater at a period of 50 m, was measured. It should be noted that an isolator module was disposed at a stage prior to each FBG. Therefore, the optical gain fiber which is an HNLF is in a 4-stage structure.

Figure 64:
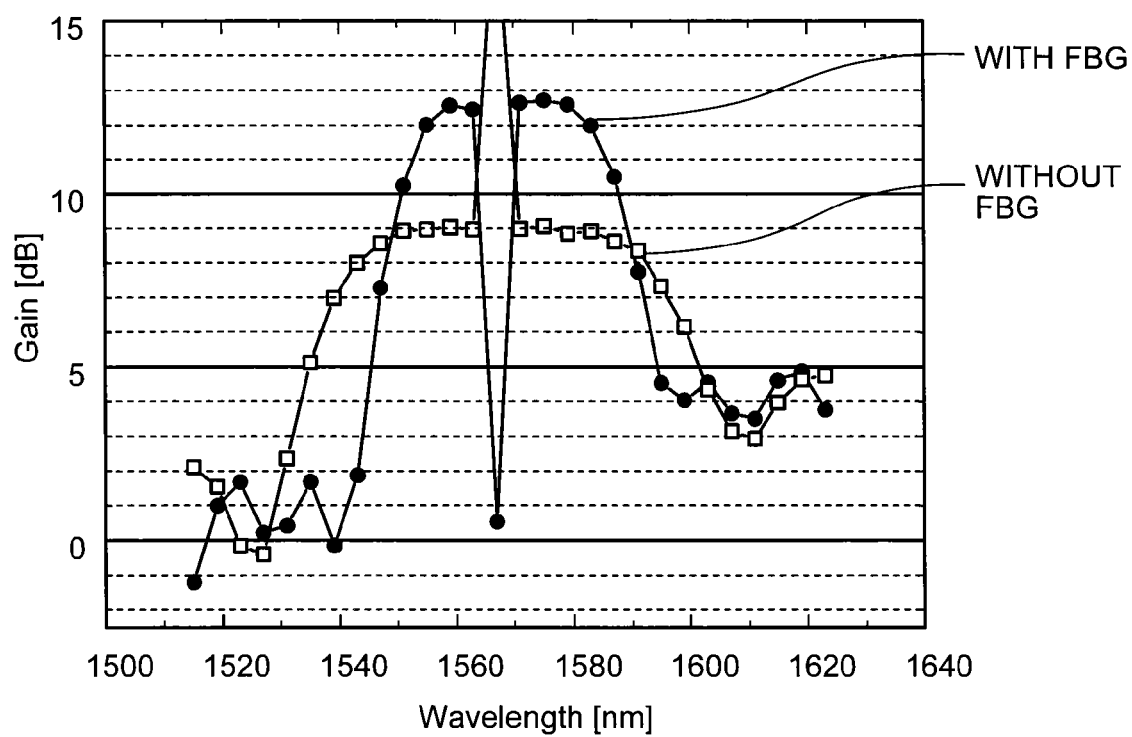
FIG. 64 is a typical gain spectrum (black round) of an OPA in which an optical gain fiber using a relative phase shifter is configured in four stages, and a typical gain spectrum when there is not a relative phase shifter (white square)

FIG. 64 is a gain spectrum of signal light when an FBG manufactured by using an HNLF as a relative phase shifter is disposed in an HNLF having a length of 200 m at a period of 50 m, and when there is not an FBG. A gain spectrum when there is an FBG increased by 4 dB as compared with a spectrum when there is not an FBG. Amplification band when there is an FBG decreases because dispersion of an SMF having a length of 10 cm and constituting an optical isolator disposed at a stage prior to an FBG narrows a band in each stage. It should be noted that, wavelength of pump light of which spectrum is measured when there is an FBG is 1568.0 nm, and wavelength of pump light of which spectrum is measured when there is not an FBG is 1567.0 nm. Except that zero-dispersion wavelength of an HNLF having a length of 200 m is 1567.0 nm, other conditions are the same as those of the above described experiment.

Figure 65A:
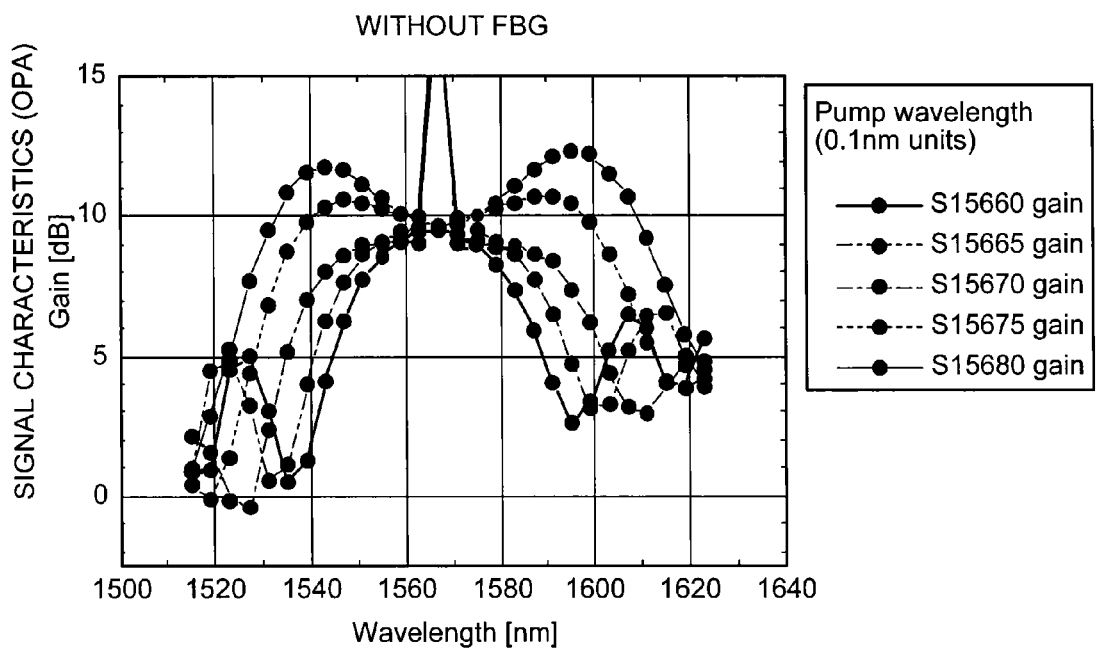
FIG. 65A is a signal light gain spectrum in case of not using a relative phase shifter (FBG)
Figure 65B:
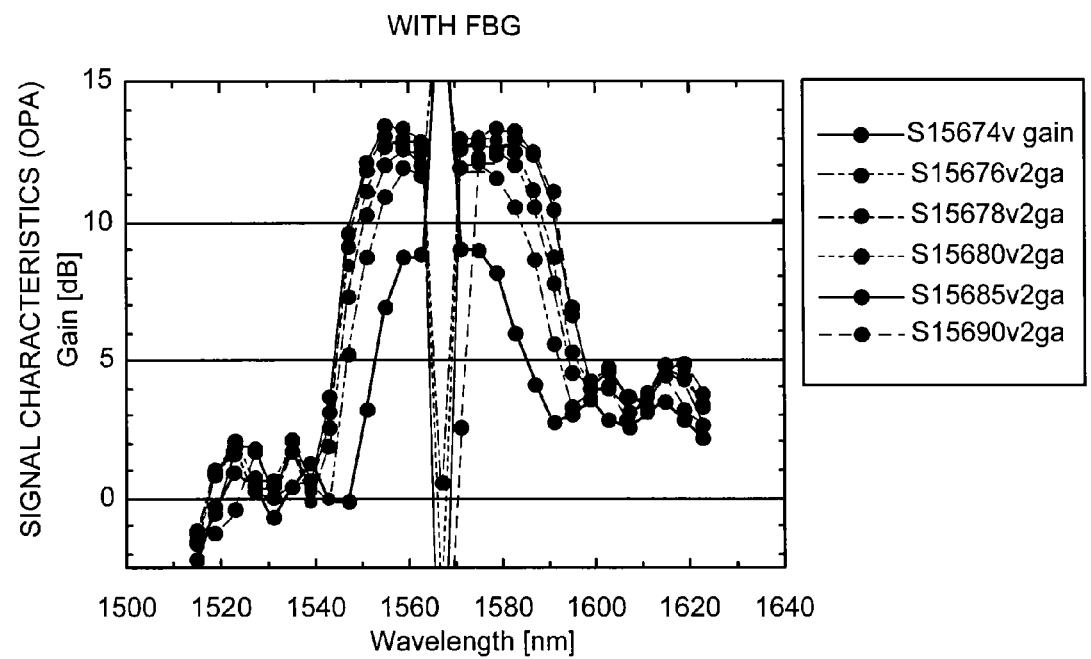
FIG. 65B is a signal light gain spectrum in case of using a relative phase shifter (FBG)
Figure 65C:
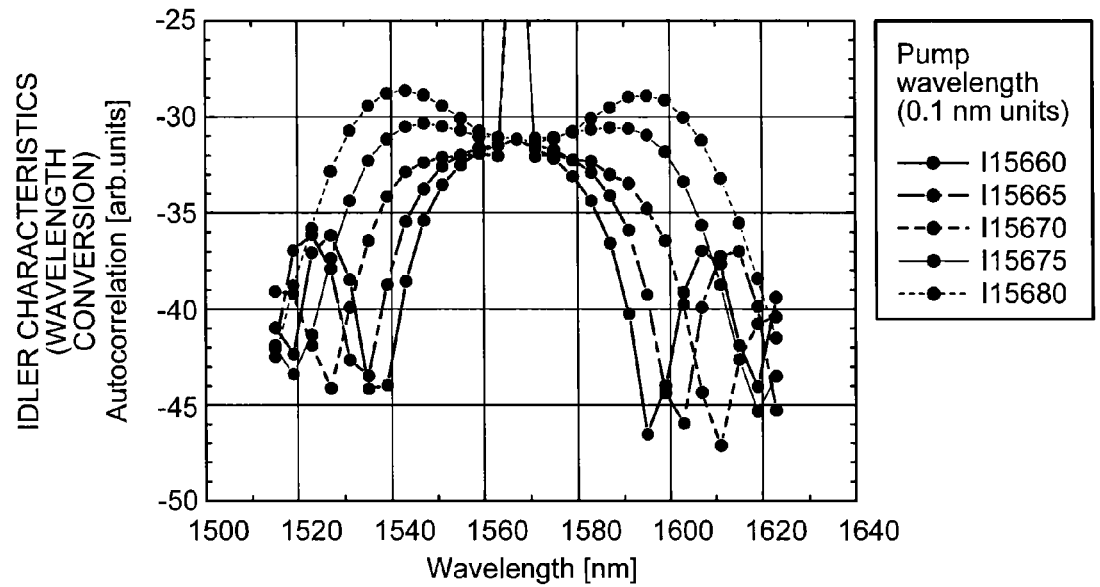
FIG. 65C is a spectrum of idler light power in case of not using a relative phase shifter (FBG)
Figure 65D:
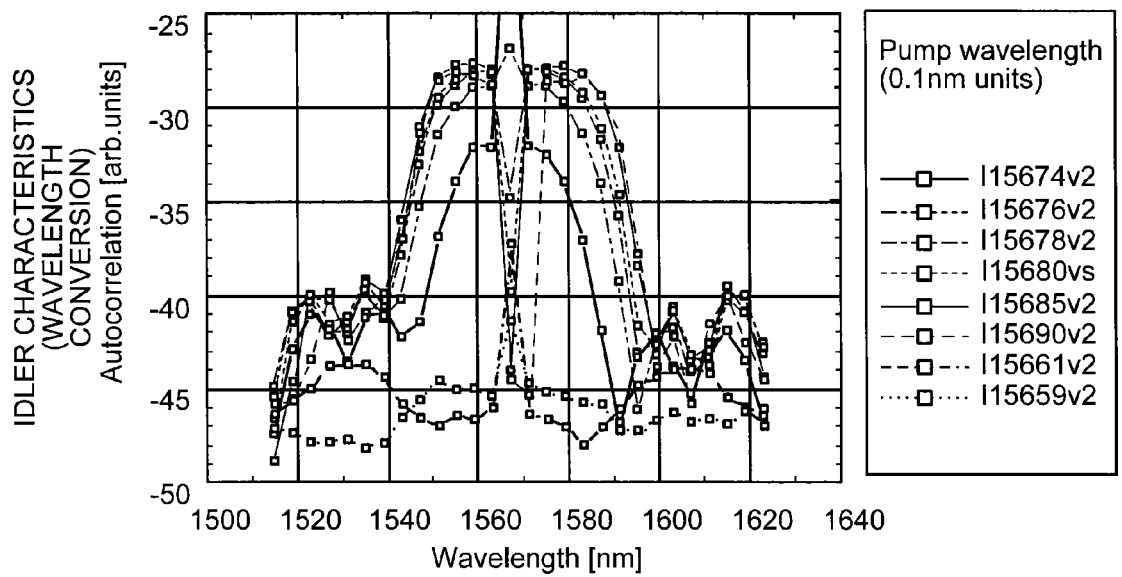
FIG. 65D is a spectrum of idler light power in case of using a relative phase shifter (FBG)

FIGS. 65A to 65D are gain spectra of signal light and spectra of idler light power when an FBG manufactured with an HNLF is applied and when not applied. FIG. 65A is a signal light gain spectrum when there is not an FBG, FIG. 65B is a signal light gain spectrum when there is an FBG, FIG. 65C is a spectrum of idler light power when there is not an FBG, and FIG. 65D is a spectrum of idler light power when there is an FBG. It should be noted that, when measuring FIGS. 65C and 65D, attenuation of an attenuator at a stage prior to an OSA was set at −20 dB. For spectrum of highly nonlinear optical fiber as a single unit, waveforms of FIGS. 65A and 65C are typical. As pumping wavelength becomes shorter than zero-dispersion wavelength, 1 dB band becomes narrower, and as pumping wavelength becomes longer than zero-dispersion wavelength, flatness of spectrum is lost, and peaks on both sides of pumping wavelength grow. In FIG. 65B and FIG. 65D, flat waveform characteristics are obtained at several pump light wavelengths.

Figure 66A:
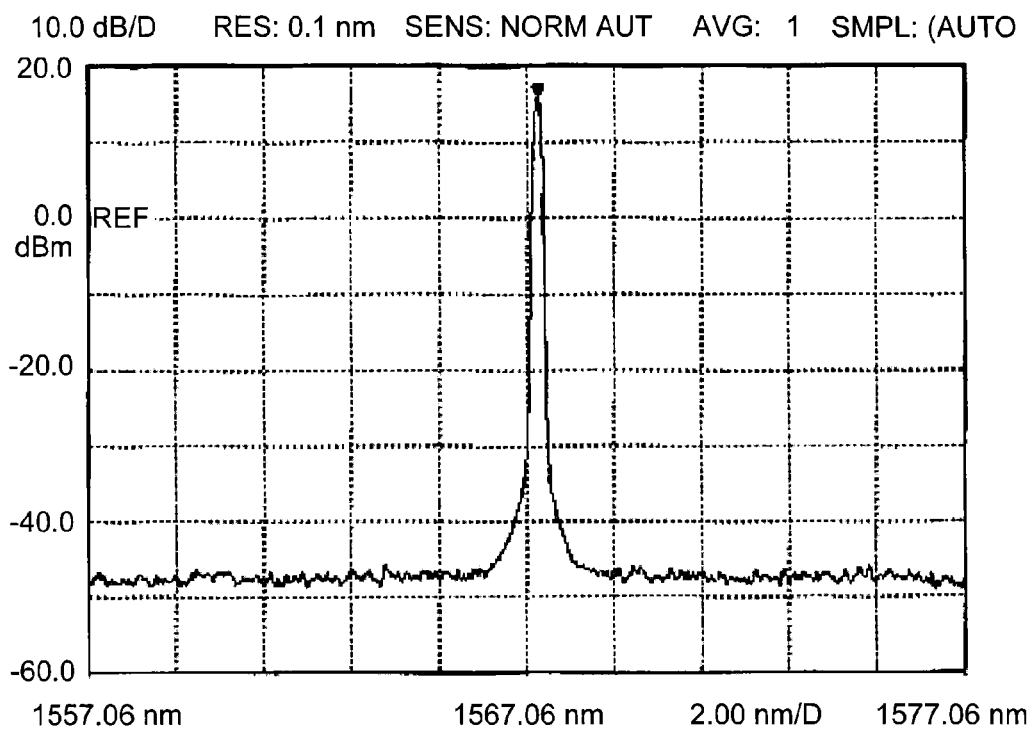
FIG. 66A is an output spectrum of pump light in case of inserting an isolator at a stage prior to an FBG.
Figure 66B:
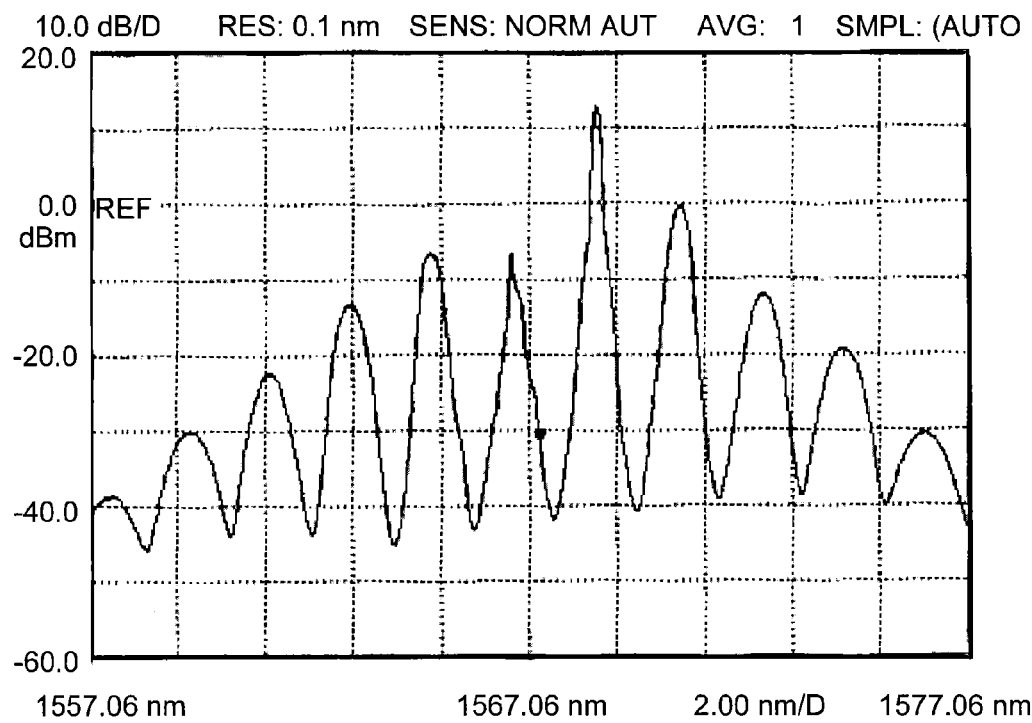
FIG. 66B is an output spectrum of pump light in case of not inserting an isolator at a stage prior to an FBG.

FIGS. 66A and 66B are output spectrum, when an isolator is inserted at a stage prior to an FBG when the FBG is inserted into an HNLF having a length of 200 m at a period of 50 m, of pump light (FIG. 66A), and output spectrum of pump light when an isolator is not inserted (FIG. 66B). A spectrum when an optical isolator is not inserted can be construed as follows. Firstly, a cavity is formed between FBGs. Next, when making round-trip in the cavity, optical noise at Bragg wavelength undergoes parametric amplification. Then, based on the amplified light, light in higher order is generated by FWM. From this fact, in case of inserting a plurality of FBGs as relative phase shifters, it is preferable that an isolator is inserted at a stage, prior to or subsequent to the FBG.

It should be noted that, although an optical gain fiber of which relative phase increases in the lengthwise direction is used in the above described embodiment, the present invention is not limited to this. For example, an optical gain fiber of which relative phase decreases from $0.5\pi$ in the lengthwise direction may be used and a relative phase shifter, which increases relative phase to a predetermined position, may be inserted.

We studied, by simulation, as to how a band of gain spectrum changes if a pair of an optical gain fiber and a relative phase shifter is added to increase the number of the pairs.

Characteristics of an optical gain fiber used for calculation are as follows. Nonlinear constant: 12 [1/W/km], loss: 0.8 [dB/km], zero-dispersion wavelength: 1565 [nm], dispersion slope: 0.02 [ps/nm$^2$/km], and 4th dispersion: −0.00025 [ps/nm$^3$/km]. Fiber length of an optical gain fiber used per one stage of a pair of an optical gain fiber and a relative phase shifter is 50 m. That is, the relative phase shifters were inserted at a period of 50 m. Input power of pump light and signal light are 31.77 dBm (1500 mW) and −20 dBm respectively.

Figure 67A:
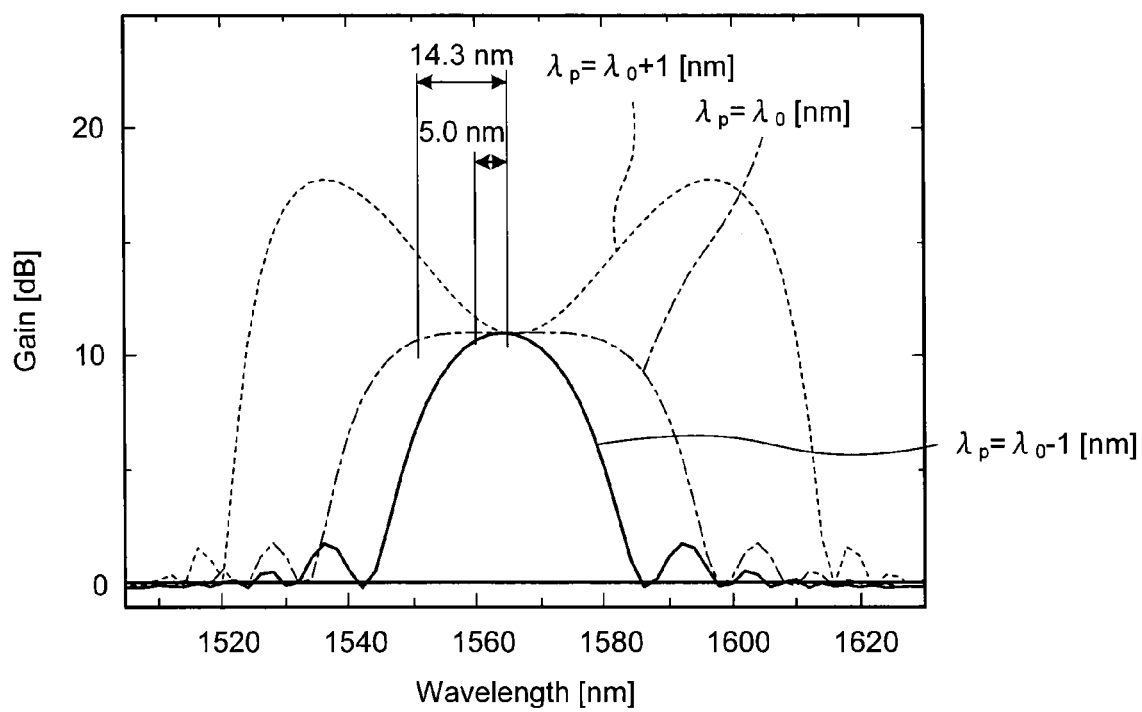
FIG. 67A is a gain spectrum when there is not a relative phase shifter, and in the drawings, a 0.3 dB band is shown where pump wavelengths are set at, zero-dispersion wavelength, the zero-dispersion wavelength +1 [nm], and the zero-dispersion wavelength −1 [nm]
Figure 67B:
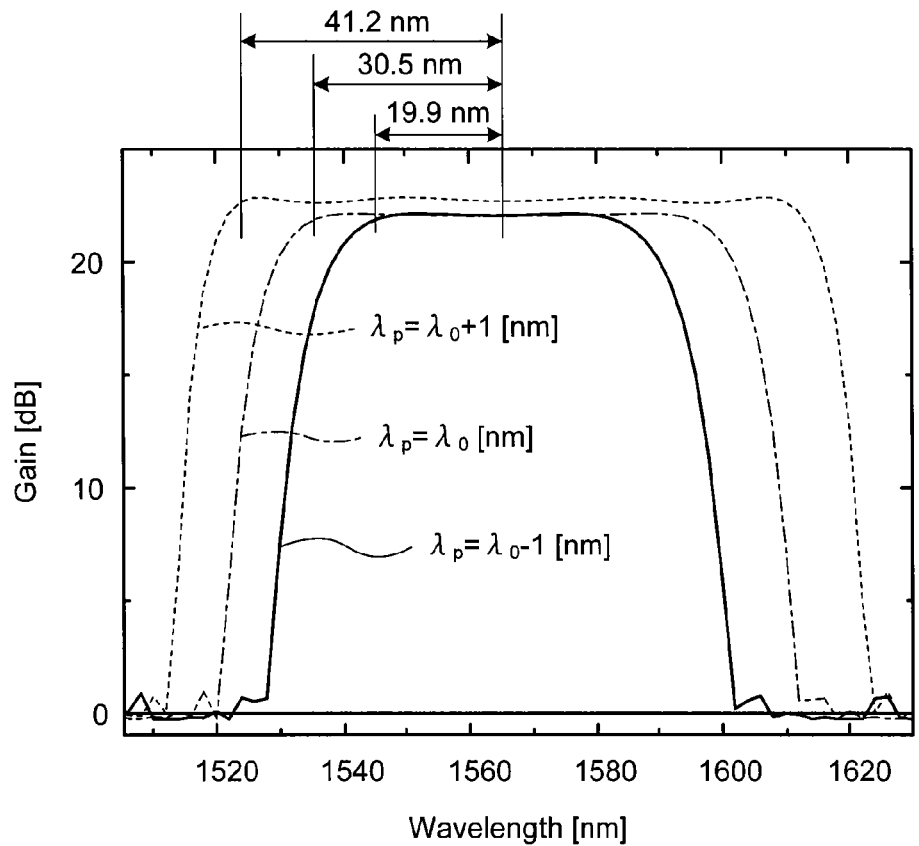
FIG. 67B is a gain spectrum when using a relative phase shifter, and in the drawing, a 0.3 dB band is shown where pump wavelengths are set at, zero-dispersion wavelength, the zero-dispersion wavelength +1 [nm], and the zero-dispersion wavelength −1 [nm]

Firstly, gain spectra were compared based on as to whether there is a relative phase shifter or not, and on difference of pumping wavelengths. FIGS. 67A and 67B are gain spectra when there is not a phase shifter and when a phase shifter is used respectively. Pumping wavelengths were set at, zero-dispersion wavelength, zero-dispersion wavelength +1 [nm], and zero-dispersion wavelength −1 [nm]. A value of a 0.3 dB band is shown in the drawing. Herein a 0.3 dB band was made a wavelength difference between wavelength at which gain decreases only by 0.3 dB with respect to a reference at zero-dispersion wavelength, and zero-dispersion wavelength. A 0.3 dB band when there is not a relative phase shifter is 14.3 [nm] and 5.0 [nm] when wavelength of pump light is zero-dispersion wavelength and when wavelength of pump light is zero-dispersion wavelength −1 [nm] respectively. Herein a 0.3 dB band when pump light wavelength is zero-dispersion wavelength +1 [nm] is not described because it cannot be defined. A 0.3 dB band when using a phase shifter is 41.2 [nm], 30.5 [nm], and 19.9 [nm] when wavelength of pump light is zero-dispersion wavelength +1 [nm], zero-dispersion wavelength, and zero-dispersion wavelength −1 [nm], respectively. Relative phase shift value at this time when using a relative phase shifter is $0.28\pi$, $0.32\pi$, and $0.31\pi$ [radian] when wavelength of pump light is zero-dispersion wavelength +1 [nm], zero-dispersion wavelength, and zero-dispersion wavelength −1 [nm], respectively. It is found that, when using a relative phase shifter, gain waveform is flat and a 0.3 dB band increases by, equal to or greater than, twice.

Figure 68A:
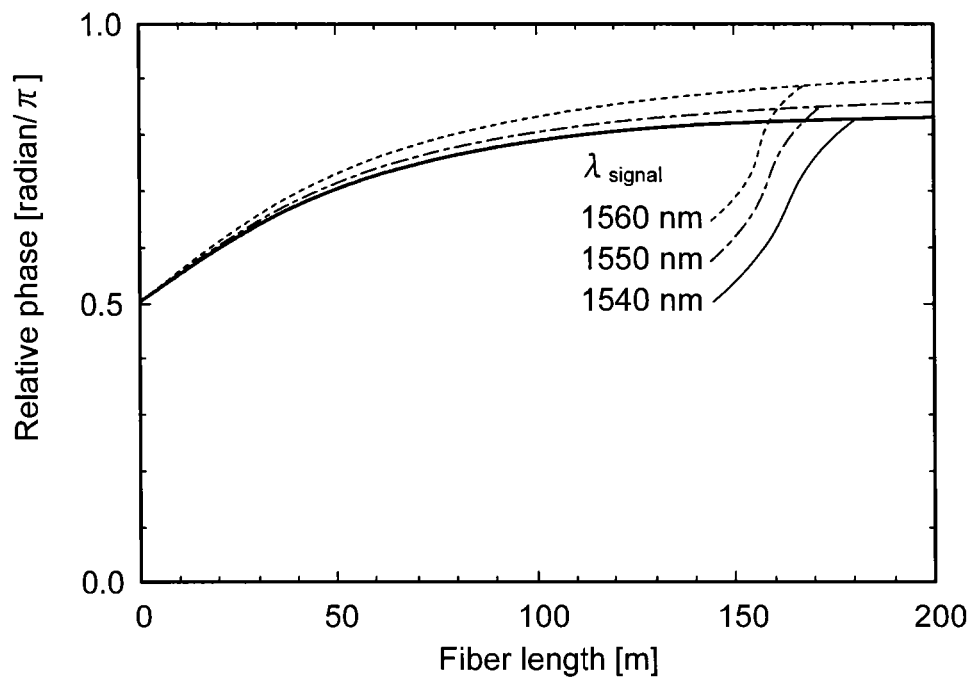
FIG. 68A is a view showing variation in relative phase when there is not a relative phase shifter.
Figure 68B:
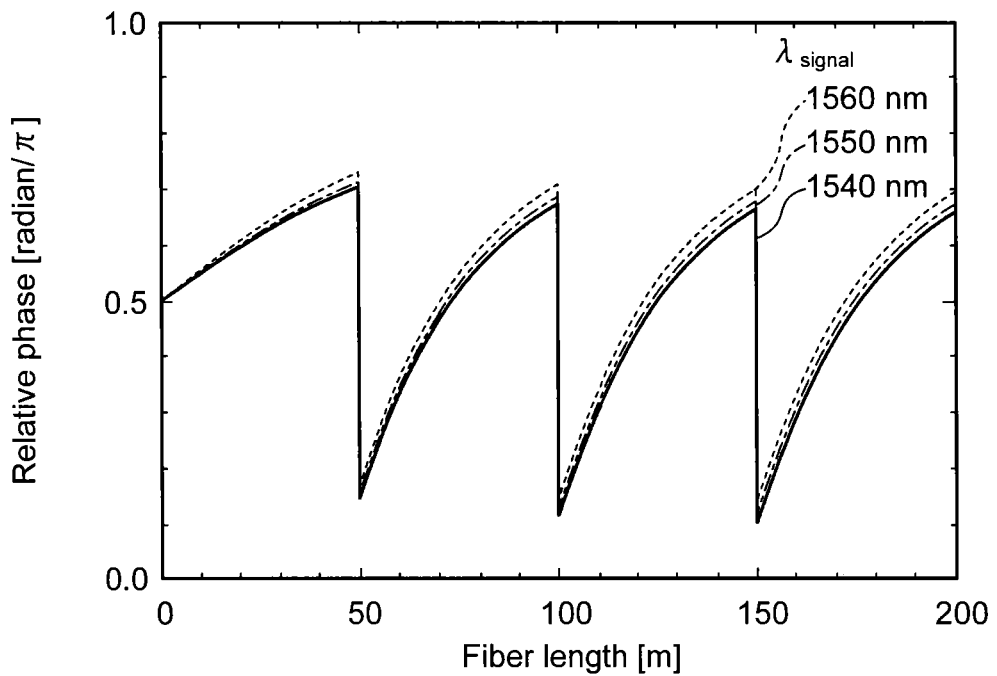
FIG. 68B is a view showing variation in relative phase when there is a relative phase shifter.

Next, change in relative phase in a lengthwise direction of a fiber when pump light wavelength is zero-dispersion wavelength +1 [nm] was studied when signal light wavelength is 1540 [nm], 1550 [nm], and 1560 [nm] respectively. The length of an optical gain fiber was calculated with 200 m. FIG. 68A is change in relative phase when there is not a relative phase shifter, and FIG. 68B is change in relative phase when there is a relative phase shifter. When there is not a relative phase shifter, relative phase converges in $0.8\pi$ to $0.9\pi$ [radian]. When using a relative phase shifter, it changes at an interval of 50 m periodically.

Figure 69A:
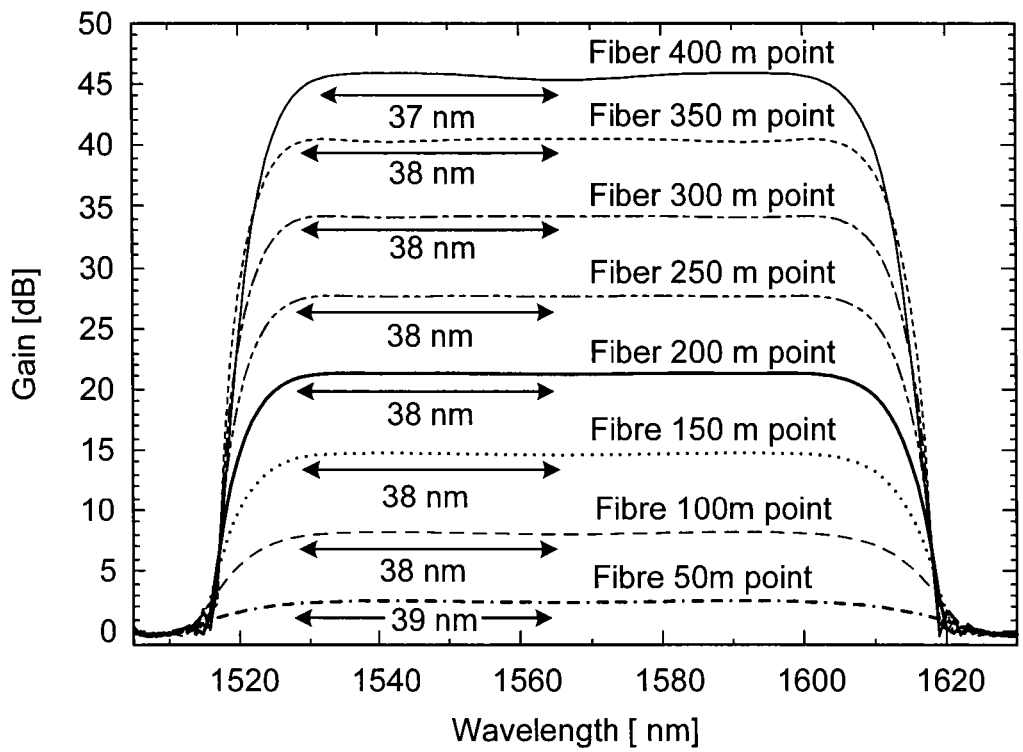
FIG. 69A is a gain spectrum when the number of stages of pairs of an optical gain fiber and a relative phase shifter increases.
Figure 69B:
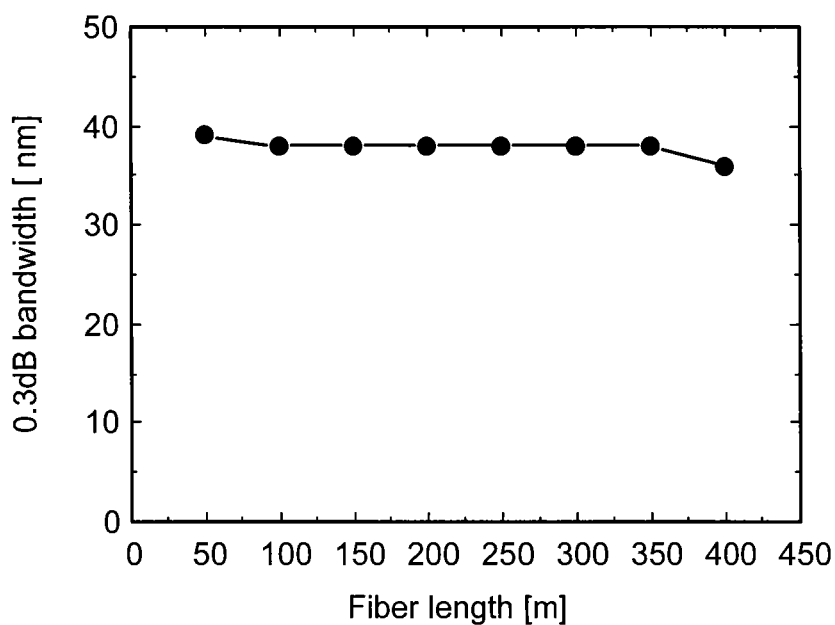

Since basic characteristics had been studied as described above, we studied a band when the number of stages of pairs of an optical gain fiber and a phase shifter was increased. FIG. 69A is a gain spectrum when the number of stages of pairs of an optical gain fiber and a phase shifter was increased. In FIG. 69A, a 0.3 dB band and the sum total of length of optical gain fibers are described. For example, at "Fiber 150 m point", the number of stages of pairs of a optical gain fiber and a relative phase shifter is 3. FIG. 69B is a 0.3 dB band of a gain spectrum corresponding to the sum total of length of an optical gain fiber, that is, (the number of stages of pairs*50) m. It is found that amplification band does not change substantially even if the number of stages of pairs is increased. Also, it is found that gain spectrum maintains also flat shape. A point where attention must be paid is that, since energy transference from pump light increases to an unignorable degree when gain increases and power of idler light which constitutes a pair with signal light increases, gain spectrum shape varies, and gain ratio per one stage decreases.

The above described argument applies not only to gain ratio of signal light, but also to power of idler light forming a pair with signal light and growing, or gain ratio, of idler light, corresponding to input signal light.

Figure 70:
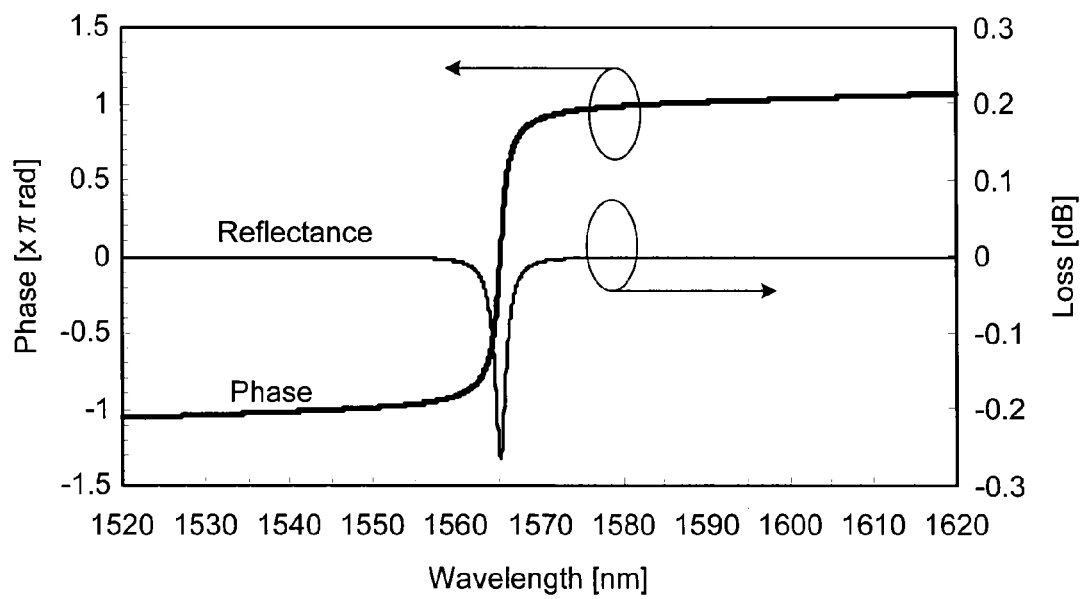

It should be noted that, for an all-pass filter which can be used as the above described relative phase shifter, the following can be mentioned. FIG. 70 is a drawing showing an example of phase and reflection characteristics of a reflection type all-pass filter using a dielectric multilayer film filter obtained by calculation. As is clear from characteristics shown in FIG. 70, in case where wavelength of pump light is set between wavelengths of 1560 nm and 1570 nm, a phase of pump light reflected by the present filter is shifted due to phase characteristics of the present filter. On the other hand, it shows that, between a region of shorter wavelength than a wavelength of 1560 nm and a region of longer wavelength than a wavelength of 1570 nm, phase characteristics deviate by substantially 2π by reflection, that is, phase of light is almost constant. Therefore, the present filter functions as a pump light phase shifter which deviates only phase of pump light and does not change phases of signal light and idler light.

Figure 71:
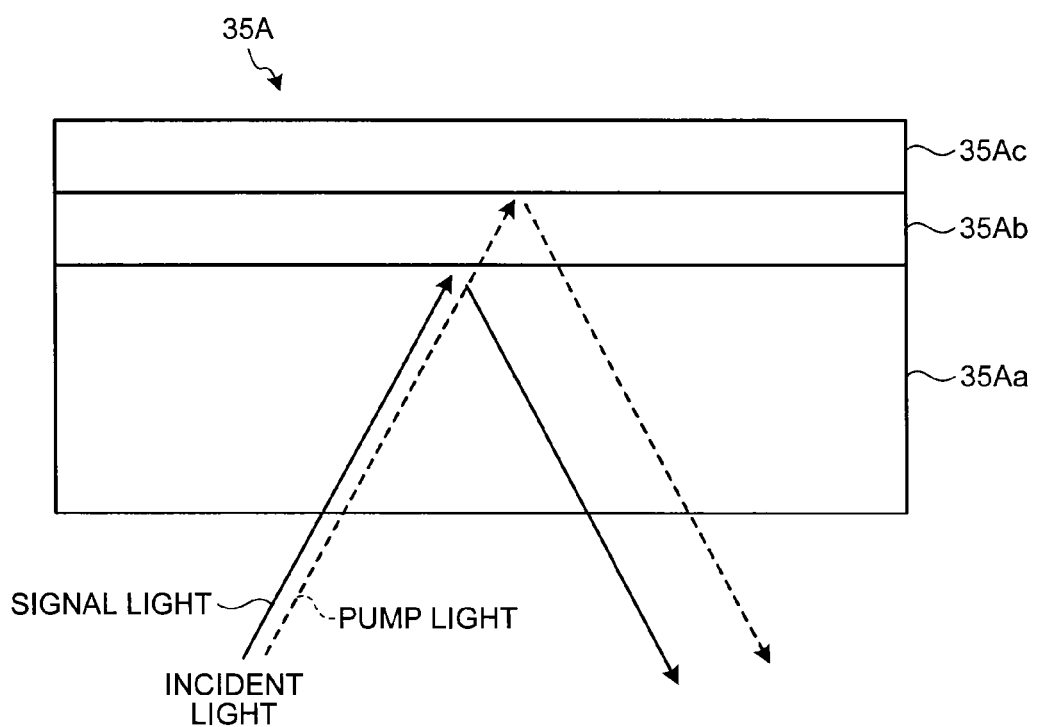

For an all-pass filter having such characteristics, for example, there is an all-pass filter having a configuration shown in FIG. 71. However, the drawings are schematic depictions, and the thickness of each layer differs from actual component. Herein, an all-pass filter 35A is constituted by a band-pass filter (BPF) layer 35Ab constituted by a dielectric multilayer film filter on a glass substrate 35Aa, and a total reflection mirror layer 35Ac formed thereon. As appearing as reflection characteristics in FIG. 70, the BPF layer 35Ab has transmittance from 1560 nm to 1570 nm (substantially 100% of transmittance as far as the BPF layer 35Ab is concerned), and has reflection rate close to substantially 100% at other wavelengths. Also, the total reflection mirror layer 35Ac has reflectance close to substantially 100% at all wavelength range used in an OPA or a PSA according to at least the present embodiment.

That is, as shown in FIG. 71, in this all-pass filter 35A, although incident signal light is reflected at the BPF layer 35Ab, pump light after transmitting through the BPF layer 35Ab is reflected at the total reflection mirror layer 35Ac and transmits through the BPF layer 35Ab again, and finally becomes reflected light from the all-pass filter 35A. In this state, phase difference is given to pump light having transmitted through the BPF layer 35Ab, and as a result, the all-pass filter 35A is supposed to function as a relative phase shifter.

It should be noted that, although the all-pass filter shown in FIG. 70 has approximately 0.2 to 0.3 dB of loss in the vicinity of pumping wavelength, this is a part of transmission characteristics of a BPF layer appearing due to some degree of loss of the total reflection mirror layer. That is, although it is different from the absolute value of transmittance of the BPF layer, it reflects its wavelength profile. This can be reduced to approximately zero substantially by further increasing reflectance of the total reflection mirror layer by increasing etc. the number of layers of the multilayered dielectric film to further reduce reflectance in FIG. 70.

Also, although, in the above described embodiment, the BPF layer is used as a component which gives phase shift, but is not limited to this, and a longer wavelength transmission filter layer or a shorter wavelength transmission filter layer, which gives phase difference in the vicinity of pump light wavelength may be used instead of the BPF layer.

Also, although, in the above described embodiment, a component using an FBG or a component using a dielectric multilayer film filter is disclosed as a gain medium into which a plurality of relative phase shifters are inserted, both a relative phase shifter constituted by an FBG and a relative phase shifter constituted by a dielectric multilayer film filter may be combined and inserted into gain medium.

As described above, gain characteristics having, preferably, flatness equal to or lower than 1 dB can be realized in an OPA or a PSA by an optical gain fiber into which one or more relative phase shifter according to the present invention is inserted.

Preferably, a relative phase shifter is inserted so that relative phase falls within a predetermined range including 0.5π in a lengthwise direction of the optical gain fiber.

Preferably, an optical gain fiber is a highly nonlinear optical fiber of which nonlinear constant is equal to or greater than 10 [1/W/km].

Preferably, dispersion of an optical gain fiber is within a range from −1 [ps/nm/km] to 1 [ps/nm/km] in an amplification band.

Preferably, an absolute value of dispersion slope of the optical gain fiber at zero-dispersion wavelength is equal to or smaller than 0.05 [ps/nm$^2$/km].

Preferably, a relative phase shifter is an optical fiber.

Preferably, relative phase shift value is adjusted based on length of the optical fiber.

Preferably, a relative phase shifter is a dielectric multilayer film filter.

Preferably, relative phase shift value is adjusted based on tilt of the dielectric multilayer film filter.

Preferably, a dielectric multilayer film filter is an all-pass filter which transmits all wavelengths therethrough.

Preferably, a relative phase shifter is a device in which a dielectric multilayer film filter and two optical fibers with collimator lenses corresponding to input and output are assembled.

Preferably, the dielectric multilayer film filter is of a reflection type, light inputted into the optical fiber is collimated by the collimator lens at an end of the optical fiber, outputted to a space, and made incident to the dielectric multilayer film filter, the dielectric multilayer film filter reflects light so that light is incident into another optical fiber with the collimator lens, and light is outputted from another optical fiber with the collimator lens.

Preferably, in a wavelength range of signal light to be amplified and a wavelength range of idler light to be generated corresponding to wavelength of the pump light and the optical signal, dispersion of the optical fiber with the collimator lens used in the device is within a range from −1 [ps/nm/km] to 1 [ps/nm/km].

Preferably, a relative phase shifter is a fiber Bragg grating.

Preferably, relative phase shift value is adjusted based on magnitude of transmission loss or magnitude of reflectance at Bragg wavelength of the fiber Bragg grating.

Preferably, pumping wavelength is set outside a 3 dB wavelength band of transmission loss having a central wavelength at Bragg wavelength of the fiber Bragg grating, and phase of pump light is shifted.

Preferably, wavelength of the pump light is set at a long wavelength side relative to Bragg wavelength of the fiber Bragg grating, and phase of pump light is shifted.

Preferably, in a wavelength range of the signal light to be amplified and a wavelength range of idler light to be generated corresponding to wavelength of the pump light and the signal light, dispersion of the fiber Bragg grating is within a range from −1 [ps/nm/km] to 1 [ps/nm/km].

Preferably, the relative phase shifter is a device which relaxes change, by temperature, in Bragg wavelength of a fiber Bragg grating. By doing this, temperature stability can be realized.

Preferably, a relative phase shifter is a device which has functions of changing Bragg wavelength by stretching or shortening a fiber Bragg grating, and a result of that, adjusting phase-shift value at the pumping wavelength.

Preferably, an optical isolator is disposed at a stage prior to the fiber Bragg grating. By doing this, light reflected from the fiber Bragg grating cannot be propagated to a stage prior thereto. Furthermore, it is possible to prevent the reflected light from being reflected again at a fiber Bragg grating at a stage prior thereto and from being amplified when being propagated in a direction identical with pump light.

Preferably, an optical isolator is disposed at a stage subsequent to the fiber Bragg grating. By doing this, it is possible to prevent the reflected light from a fiber Bragg grating at a stage subsequent thereto from being reflected again and from being propagated to a stage subsequent thereto. Furthermore, it is possible to prevent signal light reflected again from being amplified when being propagated in a direction identical with pump light.

Preferably, in a wavelength range of signal light to be amplified and a wavelength range of idler light to be generated corresponding to wavelength of the pump light and the signal light, dispersion of an optical fiber which constitutes the disposed optical isolator module is within a range from −1 [ps/nm/km] to 1 [ps/nm/km].

Preferably, a relative phase shifter is a PLC.

Preferably, an optical circuit in the PLC is constituted by a circuit separating wavelength of pump light from light of wavelength other than the wavelength of the pump light, a circuit shifting phase of pump light, and a circuit coupling light of wavelength of pump light and light of wavelength other than the wavelength of the pump light.

Preferably, relative phase shift value is adjusted by using thermo optical effect of the PLC.

Preferably, temperature of the PLC is maintained constant by a temperature control element using Peltier element.

Preferably, the PLC is athermilized so that there is not change in operation wavelength by temperature change.

Preferably, a relative phase shifter is a device using a grating of a spatial optical system and an LCOS.

Preferably, phase of the pump light is shifted by making use of a phase-adjusting function of the LCOS so that gain characteristics of the optical amplifier become flat.

Preferably, a relative phase shifter adapted when using a plurality of relative phase shifters is a combination of the above described relative phase shifters.

Preferably, an optical amplification method using an optical gain fiber, into which a relative phase shifter of the present invention is inserted, is provided.

Preferably, an optical gain fiber into which a relative phase shifter is inserted is a polarization-maintaining optical gain fiber, and a polarization independent optical amplifier using this, and a polarization independent optical amplification method are provided.

Preferably, disposition of a component constituting an optical gain fiber applied to a polarization independent optical amplifier has centrosymmetry in a lengthwise direction.

Preferably, zero-dispersion wavelength of an optical gain fiber coincides with wavelength of pump light. By doing this, characteristics can be obtained that a band having flatness of gain in a range of 0.2 dB becomes the broadest and tolerance against deviation of zero-dispersion wavelength or phase-shift value by change etc. in temperature is the maximum.

Preferably, wavelength of pump light is a shorter wave than zero-dispersion wavelength of an optical gain fiber. By doing this, tolerance to environmental temperature for maintaining flatness can be achieved.

Preferably, wavelength of pump light is a longer wave than zero-dispersion wavelength of an optical gain fiber. By doing this, tolerance to environmental temperature for maintaining amplification band can be achieved.

Preferably, a relative phase shifter is inserted into an optical gain fiber periodically. By doing this, it is possible to amplify in a state in which a flat amplification band is maintained constant.

Preferably, regarding a relative phase shifter, a period at which a relative phase shifter is disposed is made longer in a relative phase shifter at a further subsequent stage, fiber length of an optical gain fiber between relative phase shifters is increased, so that lowering of gain ratio due to loss in an optical gain fiber or a relative phase shifter is compensated.

Preferably, by shortening a period at which relative phase shifters are disposed, it is possible to amplify with a greater gain ratio or smaller NF than in a case of being disposed at a period longer than that.

Preferably, a parametric amplifier is configured by setting phase-shift value of the relative phase shifter at a shift value at which a band, in which gain characteristics of the signal light have flatness equal to or lower than 0.5 dB of power fluctuation, becomes the broadest.

Preferably, a wavelength converter is configured by setting phase-shift value of the relative phase shifter at a shift value at which a band, in which conversion power of idler light has flatness equal to or lower than 0.5 dB of power fluctuation, becomes the broadest.

Preferably, an electric signal inputted into a phase modulator phase-modulating the pump light is white noise having a band equal to or greater than 100 MHz. By doing this, generation of SBS can be suppressed from being generated in an optical gain fiber.

Preferably, a pump light source is a Fabry Perot LD. By using an LD having a greater line width similar to that of white light, generation of SBS can be suppressed in an optical gain fiber.

Preferably, an optical amplifying system is configured which obtains greater output by disposing an EDFA at a stage subsequent to an optical amplifier using an optical gain fiber of the present invention.

Preferably, an amplifying system is configured which amplifies signal light, amplified by using Raman effect by an optical amplifier using an optical gain fiber of the present invention. By doing this, amplification with lower noise can be realized than using an EDFA.

Preferably, an optical communication system using an optical amplifier using an optical gain fiber of the present invention is configured. By doing this, since it is possible to amplify with lower noise than a common optical amplifier such as an EDFA etc., transmission distance of large volume transmission signal light can be extended.

The present invention is not limited by the above described embodiments and a configuration by combining the above described structural elements is included in the present invention. Also, further effect and variation can be easily derived by those skilled in the art. Therefore, broader aspects of the present invention is not intended to be limited to the above described embodiments, various changes are possible.

As described above, the present invention is preferable for use in optical communication.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical parametric amplifier comprising:
   two or more optical gain fibers; and
   at least one relative phase shifter being inserted between the optical gain fibers and shifting a phase of a light at and near wavelength of a pump light without substantially shifting a phase of a signal light, both the pump light and the signal light being inputted to the optical parametric amplifier.

2. The optical parametric amplifier according to claim 1, wherein the relative phase shifter is inserted so that relative phase falls within a predetermined range including $0.5\pi$ in a lengthwise direction of the optical gain fibers.

3. The optical parametric amplifier according to claim 1, wherein each of the optical gain fibers is a highly nonlinear optical fiber of which nonlinear constant is equal to or greater than 10 [1/W/km].

4. The optical parametric amplifier according to claim 1, wherein a dispersion of each of the optical gain fibers is within a range from −1 [ps/nm/km] to 1 [ps/nm/km] in an amplification band.

5. The optical parametric amplifier according to claim 1, wherein an absolute value of dispersion slope of each of the optical gain fibers at a zero-dispersion wavelength is equal to or smaller than 0.05 [ps/nm$^2$/km].

6. The optical parametric amplifier according to claim 1, wherein the relative phase shifter is an optical fiber.

7. The optical parametric amplifier according to claim 6, wherein a relative phase shift value is adjusted based on a length of the optical fiber.

8. The optical parametric amplifier according to claim 1, wherein the relative phase shifter is a dielectric multilayer film filter.

9. The optical parametric amplifier according to claim 8, wherein a relative phase shift value is adjusted based on tilt of the dielectric multilayer film filter.

10. The optical parametric amplifier according to claim 8, wherein the dielectric multilayer film filter is an all-pass filter which transmits all wavelengths therethrough.

11. The optical parametric amplifier according to claim 1, wherein the relative phase shifter is a device in which a dielectric multilayer film filter and two optical fibers with collimator lenses corresponding to input and output are assembled.

12. The optical parametric amplifier according to claim 11, wherein the dielectric multilayer film filter is of a reflection type, light inputted into the optical fiber is collimated by the collimator lens at an end of the optical fiber, outputted to a space, and made incident to the dielectric multilayer film filter, the dielectric multilayer film filter reflects light so that light is incident into another optical fiber with the collimator lens, and light is outputted from the another optical fiber with the collimator lens.

13. The optical parametric amplifier according to claim 12, wherein in a wavelength range of the signal light to be amplified and a wavelength range of idler light to be generated corresponding to wavelength of the pump light and the signal light, dispersion of the optical fiber with the collimator lens used in the device is within a range from −1 [ps/nm/km] to 1 [ps/nm/km].

14. The optical parametric amplifier according to claim 1, wherein the relative phase shifter is a fiber Bragg grating.

15. The optical parametric amplifier according to claim 14, wherein relative phase shift value is adjusted based on a magnitude of transmission loss or a magnitude of reflectance at Bragg wavelength of the fiber Bragg grating.

16. The optical parametric amplifier according to claim 14, wherein a pumping wavelength is set outside a 3 dB wavelength band of transmission loss having a central wavelength at Bragg wavelength of the fiber Bragg grating, and phase of the pump light is shifted.

17. The optical parametric amplifier according to claim 16, wherein a wavelength of the pump light is set at a longer wavelength side relative to Bragg wavelength of the fiber Bragg grating, and phase of the pump light is shifted.

18. The optical parametric amplifier according to claim 14, wherein in a wavelength range of a signal light to be amplified and a wavelength range of idler light to be generated corresponding to a wavelength of the pump light and the signal light, dispersion of the fiber Bragg grating is within a range from −1 [ps/nm/km] to 1 [ps/nm/km].

19. The optical parametric amplifier according to claim 1, wherein the relative phase shifter is a device which relaxes change, by temperature, in Bragg wavelength of a fiber Bragg grating.

20. The optical parametric amplifier according to claim 19, wherein the relative phase shifter changes Bragg wavelength by stretching or shortening a fiber Bragg grating and adjusts phase-shift value at pumping wavelength.

21. The optical parametric amplifier according to claim 14, wherein an optical isolator is disposed at a stage prior to the fiber Bragg grating.

22. The optical parametric amplifier according to claim 14, wherein an optical isolator is disposed at a stage subsequent to the fiber Bragg grating.

23. The optical parametric amplifier according to claim 21, wherein in a wavelength range of a signal light to be amplified and a wavelength range of idler light to be generated corresponding to a wavelength of the pump light and the signal light, a dispersion of an optical fiber which constitutes the disposed optical isolator module is within a range from −1 [ps/nm/km] to 1 [ps/nm/km].

24. The optical parametric amplifier according to claim 22, wherein in a wavelength range of a signal light to be amplified and a wavelength range of idler light to be generated corresponding to a wavelength of the pump light and the signal light, a dispersion of an optical fiber which constitutes the disposed optical isolator module is within a range from −1 [ps/nm/km] to 1 [ps/nm/km].

25. The optical parametric amplifier according to claim 1, wherein the relative phase shifter is a PLC.

26. The optical parametric amplifier according to claim 25, wherein an optical circuit in the PLC is constituted by a circuit separating light of wavelength of pump light from light of wavelength other than the wavelength of the pump light, a circuit shifting phase of pump light, and a circuit coupling wavelength of pump light and light of wavelength other than the wavelength of the pump light.

27. The optical parametric amplifier according to claim 25, wherein relative phase shift value is adjusted by using thermooptical effect of the PLC.

28. The optical parametric amplifier according to claim 25, wherein temperature of the PLC is maintained constant by a temperature control element using Peltier element.

29. The optical parametric amplifier according to claim 25, wherein the PLC is athermalized so that there is not change in operation wavelength by temperature change.

30. The optical parametric amplifier according to claim 1, wherein the relative phase shifter is a device using a grating of a spatial optical system and an LCOS.

31. The optical parametric amplifier according to claim 1, wherein the relative phase shifter shifts phase of the pump light by making use of a phase-adjusting function of an LCOS so that gain characteristics of the optical amplifier become flat.

32. The optical parametric amplifier according to claim 1, wherein each of the optical gain fibers is a polarization-maintaining optical gain fiber.

33. The optical parametric amplifier according to claim 1, wherein a component constituted by each of the optical gain fibers and the relative phase shifter has centrosymmetry in a lengthwise direction.

34. The optical parametric amplifier according to claim 1, wherein a zero-dispersion wavelength of each of the optical gain fibers coincides with a wavelength of the pump light.

35. The optical parametric amplifier according to claim 1, wherein a wavelength of the pump light is a shorter wavelength than a zero-dispersion wavelength of each of the optical gain fibers.

36. The optical parametric amplifier according to claim 1, wherein a wavelength of the pump light is a longer wavelength than a zero-dispersion wavelength of each of the optical gain fibers.

37. The optical parametric amplifier according to claim 1, wherein the relative phase shifter is inserted between the optical gain fibers periodically.

38. The optical parametric amplifier according to claim 37, wherein a length of an optical gain fiber at a stage subsequent to the inserted relative phase shifter is longer than a length of another optical gain fiber at a stage prior to the inserted relative phase shifter.

39. The optical parametric amplifier according to claim 1, wherein a phase-shift value of the relative phase shifter is set at a shift value at which a band, in which gain characteristics of a signal light have flatness equal to or lower than 0.5 dB of power fluctuation, becomes the broadest.

40. The optical parametric amplifier according to claim 1, wherein an electric signal inputted into a phase modulator phase-modulating the pump light is white noise having a band equal to or greater than 100 MHz.

41. The optical parametric amplifier according to claim 1, wherein a pump light source for the pump light is a Fabry Perot LD.

42. An optical amplifying system comprising the optical parametric amplifier of claim 41.

43. The optical amplifying system according to claim 42, comprising an optical parametric amplifier being disposed at a stage subsequent to the optical parametric amplifier and making use of an optical absorption and emission.

44. The optical amplifying system according to claim 42, comprising a Raman amplifier disposed at a stage prior to the optical parametric amplifier.

45. An optical communication system comprising the optical parametric amplifier of claim 41.

46. A wavelength converter comprising the optical parametric amplifier of claim 41.

47. The wavelength converter according to claim 46, wherein a phase-shift value of the relative phase shifter is set at a shift value at which a band, in which a conversion power of idler light has flatness equal to or lower than 0.5 dB of power fluctuation, becomes the broadest.

48. An optical amplification method comprising performing an optical amplification by using an optical parametric amplifier which includes two or more optical gain fibers and at least one relative phase shifter being inserted between the optical gain fibers and shifting a phase of a light at and near wavelength of a pump light without substantially shifting a phase of a signal light, both the pump light and the signal light being inputted to the optical parametric amplifier.

* * * * *